United States Patent [19]
Daijogo et al.

[11] Patent Number: 5,622,418
[45] Date of Patent: Apr. 22, 1997

[54] PROJECTION DISPLAY DEVICE

[75] Inventors: Akira Daijogo; Hiroshi Kida; Shinsuke Shikama, all of Nagaokakyo, Japan

[73] Assignee: Mitsubishi Denki Kabuskiki Kaisha, Japan

[21] Appl. No.: 409,822

[22] Filed: Mar. 24, 1995

[30] Foreign Application Priority Data

| Mar. 29, 1994 | [JP] | Japan | 6-059082 |
| Oct. 13, 1994 | [JP] | Japan | 6-248090 |
| Oct. 14, 1994 | [JP] | Japan | 6-249460 |
| Dec. 13, 1994 | [JP] | Japan | 6-309107 |

[51] Int. Cl.$^6$ ............................ G03B 21/14
[52] U.S. Cl. ............................ 353/97; 349/62
[58] Field of Search ............ 353/97, 122; 359/40, 359/48, 49

[56] References Cited

U.S. PATENT DOCUMENTS

| 5,123,729 | 6/1992 | Kondo et al. | 353/99 |
| 5,142,387 | 8/1992 | Shikama et al. | 353/122 |
| 5,321,789 | 6/1994 | Kida et al. | 385/133 |
| 5,379,083 | 1/1995 | Tomita | 353/97 |
| 5,473,393 | 12/1995 | Manabe | 353/97 |
| 5,519,518 | 5/1996 | Watanabe et al. | 359/49 |
| 5,541,679 | 7/1996 | Yang | 353/97 |

FOREIGN PATENT DOCUMENTS

| 329902 | 3/1991 | Japan . |
| 387721 | 4/1991 | Japan . |
| 4127138 | 4/1992 | Japan . |
| 5188345 | 7/1993 | Japan . |

*Primary Examiner*—William Dowling

[57] ABSTRACT

A projection display device comprises: a diaphragm for the illuminating system disposed in the vicinity of a focal point of the light collected by the concave mirror; a collimation lens for rendering parallel the light passing through the aperture of the first diaphragm; a scattering-type liquid crystal light valve for forming forming image on its displaying surface; a field lens for converging the light rendered parallel by the collimation lens; a projection lens having an entrance pupil disposed in the vicinity of a focal point of the light converged by the field lens; and a second diaphragm having an aperture and provided in the projection lens. An aperture varying section of the first diaphragm varies the aperture diameter of the diaphragm of the illuminating system, and the other aperture varying section varies the aperture diameter of the diaphragm of the projection lens, thereby varying the diameter of an entrance pupil.

9 Claims, 49 Drawing Sheets

SCATTERED-LIGHT RECEPTION ANGLE $\theta_2$ (deg)

PROJECTION DISPLAY DEVICE

BACKGROUND OF THE INVENTION

This invention relates to a projection display device that magnifies and projects the image displayed on a scattering-type liquid crystal light valve onto a screen, and to a light source device that is incorporated into the projection display device etc.

The main type of the liquid crystal light valve used in projection light valves has consisted of twisted nematic (TN) liquid crystals sandwiched between two polarizing plates. In such a projection display device, however, since over half of the light emitted by the light source device is lost at the incident-side polarizing plate, and since, to avert thermal degradation of the polarizing plate due to light absorption, it is necessary to limit the light emitted, it was impossible to increase the brightness of the projected image.

A projection display device that dispenses with the polarizing plate and uses a scattering-type liquid crystal light valve is disclosed, for example, in Japanese Patent Kokai Publication No. 188345/1993 (H5-188345). The scattering-type liquid crystal light valve may be, for example, a polymer-dispersed liquid crystal (PDLC), or a dynamic scattering mode (DSM) liquid crystal. FIG. 1A and FIG. 1B are explanatory diagrams showing the principle of the PDLC. In the figures, the PDLC comprises a polymer 205 sealed between transparent substrates 203 and 204, which are respectively provided on the inner surface with electrodes 201 and 202, and liquid crystal 206, which is dispersed therein in the form of droplets. When voltage V is not applied between the electrodes 201 and 202, the liquid crystal molecules 206a within the liquid crystal 206 are oriented in random directions, as shown in FIG. 1A, with the result that a difference in refractive index arises between the polymer 205 and the liquid crystal 206, and incident light 207 becomes scattered light 208. On the other hand, when voltage V is applied between the electrodes 201 and 202, the liquid crystal molecules 206a of the liquid crystal 206 are oriented in the direction of the electric field. Since the refractive index of the liquid crystal 206 and the refractive index of the polymer 205 have been so chosen as to be identical when the liquid crystal molecules 206a are oriented in this way, the incident light 207 passes though in a straight line without being scattered.

However, while a projection display device provided with a scattering-type liquid crystal light valve has the advantage of being able to achieve high brightness of the projected image, it suffers from other problems to be described blow.

The first problem occurs in projection display devices of the type shown in FIG. 2. In such a projection display device, emitted light 214 from a light source device 213 comprising a lamp 211 and a parabolic mirror 212 passes through a scattering-type liquid crystal light valve 215, a field lens 216 and a projection lens 217, so as to magnify and project it onto a screen 220. Then, to increase the contrast of the projected image, the scattered light component of the liquid crystal light valve 215 is removed by varying the aperture diameter of a diaphragm 218 of the projection lens 217 to reduce the diameter of an entrance pupil 219. In the event, however, that the lamp 211 has luminous region with long and narrow shape, such as a metal halide lamp or halogen lamp, rather than luminous region in the shape of dot, such as a xenon lamp, even if the aperture diameter of the diaphragm 218 is varied and the diameter of the entrance pupil 219 is reduced, the brightness of the projected image merely decreases without any adequate increase in contrast.

The second problem occurs in the projection display devices of the type shown in FIG. 3, using dichroic mirrors 35a and 35b and a dichroic prism 38. In such the projection display device, emitted light 100, which was emitted by a light source device 33 comprising a lamp 31 and a parabolic mirror 32 and passed through a filter 34, is separated by the dichroic mirror 35a into red light 100R, which passes through, and green light 100G and blue light 100B, which are reflected, and the reflected green and blue light is separated by the dichroic mirror 35b into the green light 100G, which is reflected, and the blue light 100B, which passes through. The red, green and blue homogeneous light 100R, 100G and 100B then pass through liquid crystal light valves 37R, 37G and 37B respectively, and impinge from each incident surface for homogeneous light onto the dichroic prism 38. Composite light consisting of the red, green and blue homogeneous light 100R, 100G and 100B impinges on a projection lens 39, and is magnified and projected on the screen 12.

In terms of the transmittance T, the dichroic mirror 35a has a wider transmission band of p-polarized light component than s-polarized light component, as shown in FIG. 4A. In terms of the reflectivity R, the dichroic prism 38 has a wider reflectivity band of s-polarized light component than p-polarized light component, as shown in FIG. 4B. Thus with respect to red light, s-polarized light component is limited by the dichroic mirror 35a, while p-polarized light component is limited by the dichroic prism 38. As shown in FIG. 4C, the integrated spectral characteristic T×R becomes narrower for both p-polarized light component and s-polarized light component, so that the efficiency of light utilization is low.

The third problem occurs in the projection display devices using dichroic mirrors 85a, 85b, 85c and 85d, as shown in FIG. 5. In such the projection display device, light 100, which was emitted by a light source device 63 comprising a lamp 61 and a parabolic mirror 62 and passed through a filter 64, is separated by the dichroic mirror 85a into red light 100R and green light 100G, which pass through, and blue light 100B, which is reflected. The red and green light are separated by the dichroic mirror 85b into red light 100R, which is reflected, and green light 100G, which passes through. The blue light 100B passes through a liquid crystal light valve 87B and a field lens 88B, then passes through the color-synthesizing dichroic mirrors 85c and 85d, and impinges on the projection lens 69. The red light 100R passes through a liquid crystal light valve 87R and a field lens 88R, is reflected by the color-synthesizing dichroic mirror 85c, passes through the color-synthesizing dichroic mirror 85d, and impinges on the projection lens 69. The green light 100G passes through a liquid crystal light valve 87G and a field lens 88G, is reflected by a reflecting mirror 86b and the color-synthesizing dichroic mirror 85d, and impinges on the projection lens 69. Thus homogeneous light impinged on the projection lens 69 becomes a single composite light, and the composite light is magnified and projected on the screen 12.

For example, with regard to the blue light, the dichroic mirror 85a has the reflectivity R shown in FIG. 6A, and the reflected blue light is partially polarized in such a way that s-polarized light component is a wider band than p-polarized light component. The dichroic mirror 85d, which has the function of allowing the blue light to pass through, has the transmittance T shown in FIG. 6B, and the transmitted blue light is partially polarized in such a way that p-polarized light component is a wider band than s-polarized light component. Thus the integrated spectral characteristic R×T of the dichroic mirrors 85a and 85d, are as is shown in FIG. 6C. Thus, with respect to the blue light, the s-polarized light component is limited by the dichroic mirror 85d, while p-polarized light component is limited by the dichroic mirror 85a, so the efficiency of light utilization is low.

Further, there is a trend away from the use of halogen lamps as the light source device in the projection display devices and toward the use high-voltage discharge lamps such as short-arc type compact metal halide lamps, which offer greater light output, higher luminous efficiency, and longer lamp life, along with outstanding color rendition. FIG. 7 is a perspective view showing the structure of a light source device having a high-voltage discharge lamp which was proposed in Japanese Utility Model Kokai Publication No. 29902/1991 (H3-29902). This light source device comprises a concave surface of revolution, which may be a spherical, parabolic, elliptical or other surface, and which has a notched reflecting mirror 101, a metal halide lamp 102, a mouth piece 103 to hold the lamp 102, and a mounting piece 104 to hold the mouth piece 103 on the reflecting mirror 101. Thus, the flow of air in the direction of the arrows in the figure is improved by the notch, thereby increasing cooling efficiency. In addition, FIG. 8 is a cross-sectional view showing a light source device provided with an air duct 117, which is disclosed in Japanese Patent Kokai Publication No. 127138/1992 (H4-127138). In this light source device, an air stream is delivered from the duct 117 in the direction shown by the arrows using a fan (not shown), and cooling air is delivered at the inner side of the reflecting mirror 101.

The light source devices of FIG. 7 and FIG. 8, however, suffer from the problem that air cannot be delivered equally at the periphery of the lamp 102 so that, as a result of irregularity in the surface temperature of the lamp 102, emission distribution becomes uneven. Further, the light source device in FIG. 8 has the problem that the device is larger.

SUMMARY OF THE INVENTION

An object of this invention is to provide a projection display device capable of displaying an image of high brightness and high contrast.

Another object of this invention is to provide a compact light source device in which the surface of the lamp call be cooled comparatively evenly.

According to one aspect of the present invention, a projection display device comprises: a lamp for emitting white light; a concave mirror for collecting the light emitted by the lamp; a first diaphragm having an aperture through which the light emitted by the lamp passes and disposed in the vicinity of a focal point of the light collected by the concave mirror; a collimation lens for rendering parallel the light passing through the aperture of the first diaphragm; a scattering-type liquid crystal light valve for forming a transmitting-state region that transmits the light rendered parallel by the collimation lens and a scattering-state region that scatters the light rendered parallel by the collimation lens, thereby forming image on the liquid crystal light valve; a field lens for converging the light rendered parallel by the collimation lens; a projection lens having an entrance pupil disposed in the vicinity of a focal point of the light converged by the field lens, and magnifying and projecting the image on the liquid crystal light valve onto a screen; a second diaphragm having an aperture and provided in the projection lens; a first means for varying the aperture diameter of the first diaphragm; and a second means for varying the aperture diameter of the second diaphragm, thereby varying the diameter of an entrance pupil of the projection lens.

According to another aspect of the present invention, a projection display device comprises: a light source means for emitting substantially parallel light; a color-separation means for separating the light from the light source means into red, green and blue light; scattering-type liquid crystal light valves for red, green and blue light, for forming a transmitting-state region that transmits the light emitted by the light source means and a scattering-state region that scatters the light emitted by the light source means, thereby forming images on the liquid crystal light valves; halfwave plates for red, green and blue light each disposed in the path of the light transmitted through the liquid crystal light valves for red, green and blue light, and capable of rotating a plane of vibration of an arbitrary polarized light by a predetermined angle; a dichroic prism for synthesizing the red, green and blue light that respectively passed through the liquid crystal light valves; and a projection lens for magnifying and projecting the light emitted by the dichroic prism onto a screen.

According to a still another aspect of the present invention, a projection display device comprises: a light source means for emitting substantially parallel light; a color-separation means for separating the light from the light source means into red, green and blue light, the color-separating means having wideband transmission property with respect to either p-polarized light component or s-polarized light component of each of the red, green and blue light, and narrowband transmission property with respect to the other component; scattering-type liquid crystal light valves for the red, green and blue light, for forming a transmitting-state region that transmits the light and a scattering-state region that scatters the light, thereby forming images on the liquid crystal light valves; a light-synthesizing means for synthesizing the red, green and blue light, each of which passed through the liquid crystal light valves, the light-synthesizing means having wideband transmission property with respect to either the p-polarized light component or s-polarized light component of each of the red, green and blue light, and narrowband transmission property with respect to the other component; and a projection lens for magnifying and projecting the light emitted by the color-synthesizing means onto a screen. Further, a kind of the polarized light component having wideband transmission property in the color-separation means is identical with a kind of the polarized light component having the wideband transmission property in the color-synthesizing means with respect to each of the red, green and blue light.

According to a further aspect of the present invention, a light source device comprises: a reflecting mirror having a light-reflecting surface in the form of a concave surface of revolution; an aperture in the reflecting mirror formed in the vicinity of an axis of revolution of the light-reflecting surface; a lamp provided within the reflecting mirror; a holding piece for holding the lamp on the axis of revolution of the light-reflecting surface; a first clamp member for clamping the holding piece in the vicinity of the aperture of the reflecting mirror; a second clamp member for clamping the lamp to the holding piece; and a ventilating means disposed behind the reflecting mirror and ventilating an inside of the reflecting mirror. The aperture is partially covered by the light source and the holding piece and functions as a passage through which the air around the lamp flows.

BRIEF DESCRIPTION OF THE DRAWINGS

FIG. 15 is a graph showing the contrast characteristics of a projection display device in a darkroom and in a bright room when the room light is turned on;

DETAILED DESCRIPTION OF THE INVENTION

Following is an explanation of the preferred embodiments of this invention.

First Embodiment

Figure 9:
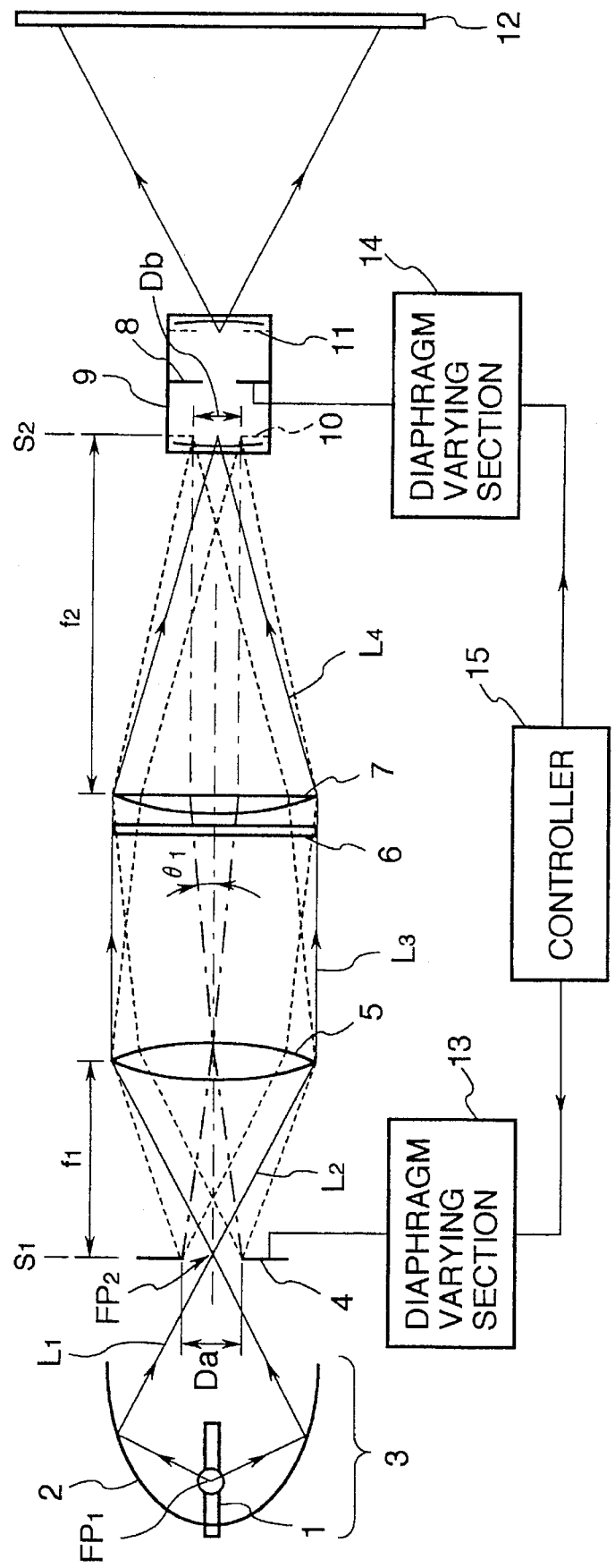
FIG. 9 is a structural diagram showing the optical system of a projection display device in accordance with the first embodiment of this invention.
Figure 10:
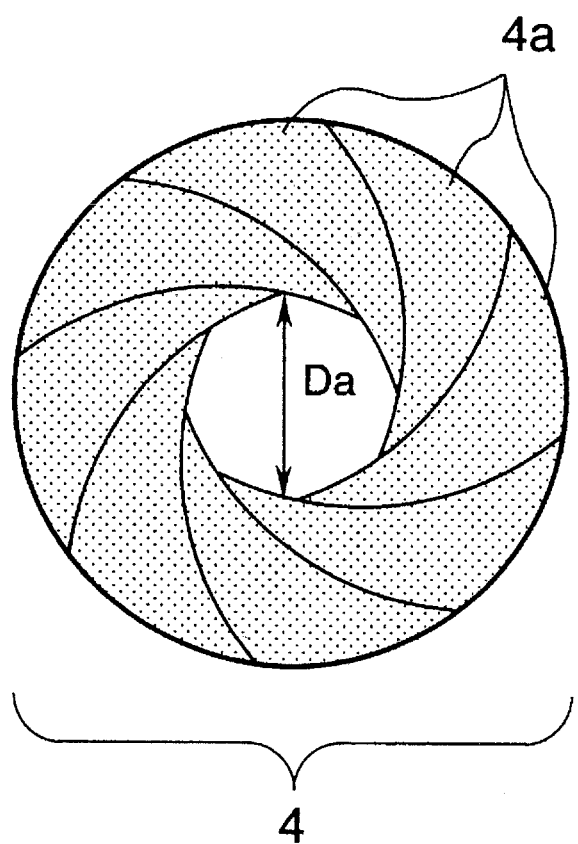
FIG. 10 is a front view of the diaphragm 4 of an illuminating system.

FIG. 9 shows the optical system of a projection display device in accordance with a first embodiment of this invention. In FIG. 9, the projection display device comprises a light source device 3 which includes a lamp 1 such as a metal halide lamp and an elliptical mirror 2, a diaphragm 4 for an illuminating system, the aperture diameter $D_a$ of which can be varied, and a collimation lens 5 which renders the light passing through parallel. The lamp 1 is so disposed that its center is in the vicinity of a first focal point $FP_1$ of the elliptical mirror 2. Thus, light emitted from the lamp 1 is first reflected by the elliptical mirror 2, and then the reflected light $L_1$ is condensed in the vicinity of a second focal point $FP_2$ of the elliptical mirror 2. The diaphragm 4 comprises, as shown in FIG. 10, a plurality of movable vanes 4a, thereby allowing the aperture diameter $D_a$ to be varied manually or by a motor (not shown in the figure). The diaphragm 4 is so disposed that its aperture is in the vicinity of the second focal point $FP_2$ of the elliptical mirror 2, thereby limiting the spot diameter of the collected light $L_1$. The focal length of the collimation lens 5 is $f_1$, and the collimation lens 5 is so disposed that it is at a distance from the diaphragm 4 that is substantially equal to the focal length $f_1$. Thus, light $L_2$ passing through the aperture of the diaphragm 4 will, by passing through the collimation lens 5, will become the substantially parallel light $L_3$. The degree of parallelization of the light $L_3$ passing through the collimation lens 5 and impinging on the light valve 6 is determined by the aperture diameter $D_a$ of the diaphragm 4 and the focal length $f_1$ of the collimation lens 5. The angle of divergence $\theta_1$ of the light $L_3$, shown in FIG. 9, can be obtained using Equation (1) below.

The projection display device of the first embodiment is further provided with a scattering-type liquid crystal light valve 6 such as a PDLC and a DSM liquid crystal, which displays images by a combination of a transmitting-state region that permits the passage of the incident light and a scattering-state region that scatters the incident light, a field lens 7, which is disposed in the vicinity of the liquid crystal light valve 6 and condenses the light passing through the liquid crystal light valve 6, and a projection lens 9 provided with a diaphragm 8, the aperture of which can be varied. Further in FIG. 9, a reference numeral 10 designates an entrance pupil of the projection lens 9, which acts to remove a portion of the light scattered at the liquid crystal light valve 6 and reduce the brightness of the black portion (i.e., black level) of the projected image, thereby increasing the contrast of the projected image. A reference numeral 11 designates the exit pupil of the projection lens 9. The focal length of the field lens 7 is $f_2$, and the distance between the field lens 7 and the entrance pupil 10 (a plane $S_2$) is set to be substantially equal to the focal length $f_2$. The field lens 7 has the function of condensing the light passing through the liquid crystal light valve 6 and irradiating the condensed light $L_4$ with high efficiency into the entrance pupil 10 of the projection lens 9. The diaphragm 8 of the projection lens 9 has the same structure as the diaphragm 4 of the illuminating system shown in FIG. 10.

The projection display device of the first embodiment is further provided with an aperture varying section 13 that varies the aperture diameter of the diaphragm 4 for the illuminating system, an aperture varying section 14 that varies the aperture diameter of the diaphragm 8 in order to vary the diameter $D_b$ of the entrance pupil 10, and a controller 15 for controlling the aperture varying sections 13 and 14. The controller 15 controls the aperture varying sections 13 and 14 in such a way that a prescribed relationship is maintained between the aperture diameter $D_a$ of the diaphragm 4 and the diameter $D_b$ of the entrance pupil 10. If, for example, the user issues an instruction to change either the aperture diameter $D_a$ of the diaphragm 4 or the diameter $D_b$ of the entrance pupil 10, the other diameter will be set by means of a control signal from the controller 15 to a value such that the appropriate contrast will be obtained.

Figure 11A:
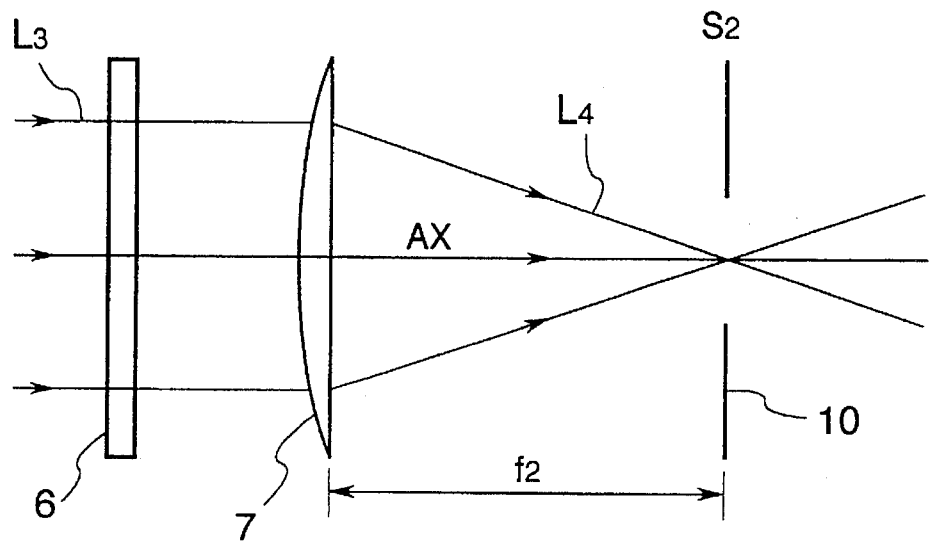
FIG. 11A and FIG. 11B are explanatory diagrams showing the relationship between a scattering-type liquid crystal light valve and the entrance pupil 10 of the projection lens.
Figure 11B:
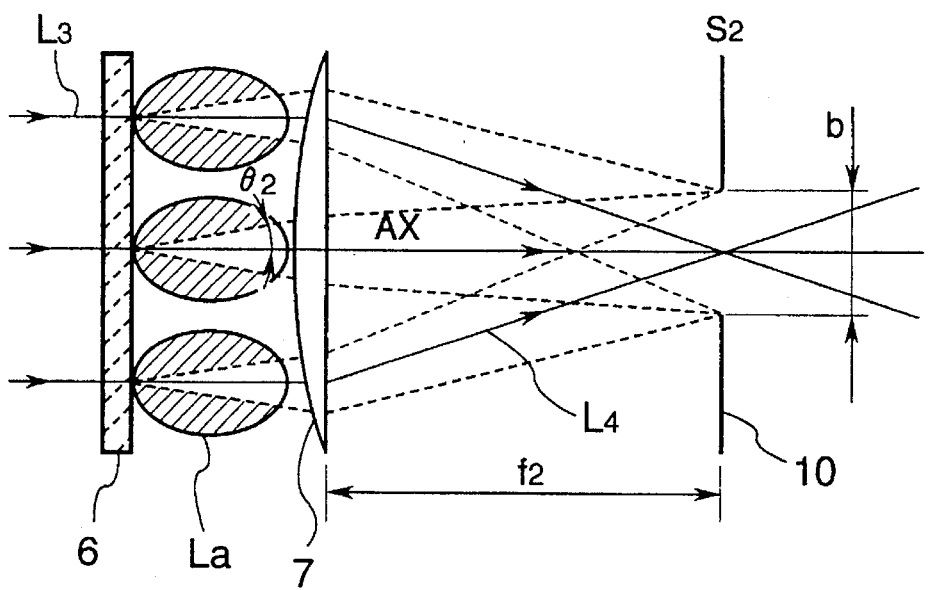

FIG. 11A shows the way in which light advances when the liquid crystal light valve 6 is in the transmitting state, and FIG. 11B shows the way in which light advances when the liquid crystal light valve 6 is in the scattering state. As shown in FIG. 11A, in the transmitting state, the incident light $L_3$ enters the liquid crystal light valve 6 in a straight line, passes through the field lens 7, and is focused at the position of the entrance pupil 10, passing through the entrance pupil 10 without hindrance. As shown in FIG. 11B, on the other hand, in the scattering state, the portion of scattered light $L_a$ that has passed through the liquid crystal light valve 6 and is advancing in the direction shown by the hatched portions, passes through the field lens 7 and is blocked by the entrance pupil 10. Further the portion of scattered light $L_a$ that is advancing in the direction between the hatched portions (i.e., the white portion in the figure) passes through the field lens 7 and then through the entrance pupil 10. The scattered-light reception angle $\theta_2$ is defined as a maximum angle between a direction of the incident light $L_3$ (i.e., a direction of the optical axis AX) and a direction of the scattered light that is able to pass through the entrance pupil 10 (i.e., the most outward luminous flux of the scattered light) and may be obtained by Equation (2) below.

$$\tan \theta_1 = D_a/(2 \cdot f_1) \quad (1)$$

$$\tan \theta_2 = D_b/(2 \cdot f_2) \quad (2)$$

As will be appreciated from Equation (2), the smaller entrance pupil diameter $D_b$ becomes, the smaller will be scattered-light reception angle $\theta_2$, and the amount of scattered light $L_a$ that is removed by the entrance pupil 10 will increase. Thus if the entrance pupil diameter $D_b$ is reduced, the black level of the projected image will be lowered, and a projected image of higher contrast CR can be obtained. Taking the white level luminous flux passing through the entrance pupil 10 as $\Phi_t$ and the black level luminous flux that is blocked by the entrance pupil 10 as $\Phi_d$, the contrast CR may be obtained by Equation (3) below.

$$CR = \Phi_t / \Phi_d \qquad (3)$$

Figure 12:
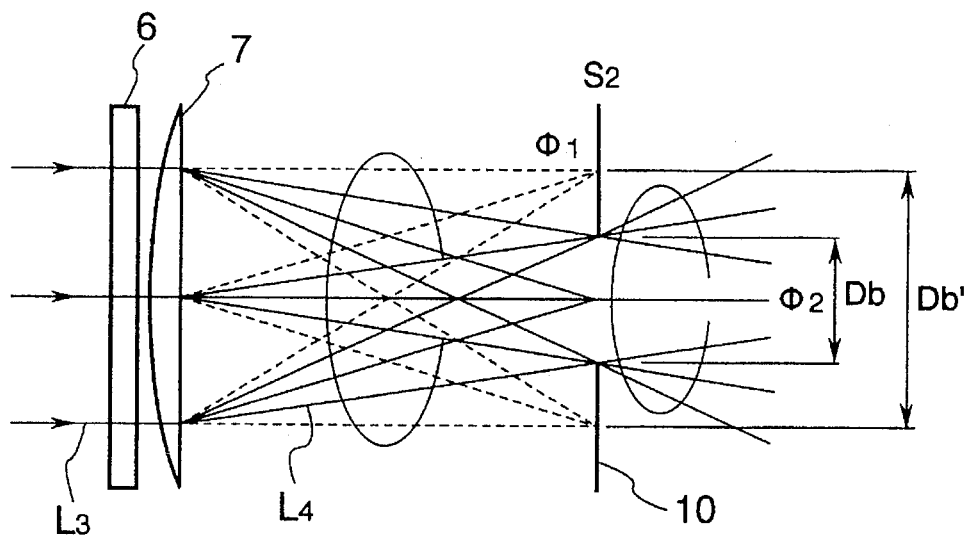
FIG. 12 is a explanatory diagram for the purpose of explaining the contrast of a projection display device when the entrance pupil diameter $D_b$ is smaller than the light source image diameter $D_b'$ at the position of the entrance pupil 10.

FIG. 12 is a diagram for the purpose of explaining the contrast when the entrance pupil diameter $D_b$ is smaller than the light source image diameter $D_b'$ at the position $S_2$ of the entrance pupil 10. In FIG. 12, the broken lines indicate the component of the light from the liquid crystal light valve 6 that diverges, and the solid lines indicate the component of the light that passes though. The luminous flux that passes through the field lens 7 is designated as $\Phi_1$ when an image having the diameter $D_b'$ (that is to say, an image of the diaphragm 4 of the illuminating system) is formed at the position $S_2$ of the entrance pupil 10, and the luminous flux passing through the entrance pupil 10 is designated as $\Phi_2$ when the entrance pupil diameter $D_b$ is smaller than the light source image having a diameter of $D_b'$ ($D_b < D_b'$), that is to say, the white-level projected luminous flux. The following relationship is satisfied:

$$\Phi_2 < \Phi_1 \qquad (4)$$

When the liquid crystal light valve 6 is in the scattering state, the black-level luminous flux is represented, from Equation (3), by $\Phi_1/CR$. Since white-level luminous flux is limited by the entrance pupil 10, the black-level luminous flux will be $\Phi_2/CR$, if the aperture diameter $D_a$ of the diaphragm 4 is set in such a way that the light source image formed at the position $S_2$ of the entrance pupil 10 is substantially the same as the entrance pupil diameter $D_b$.

Figure 13:
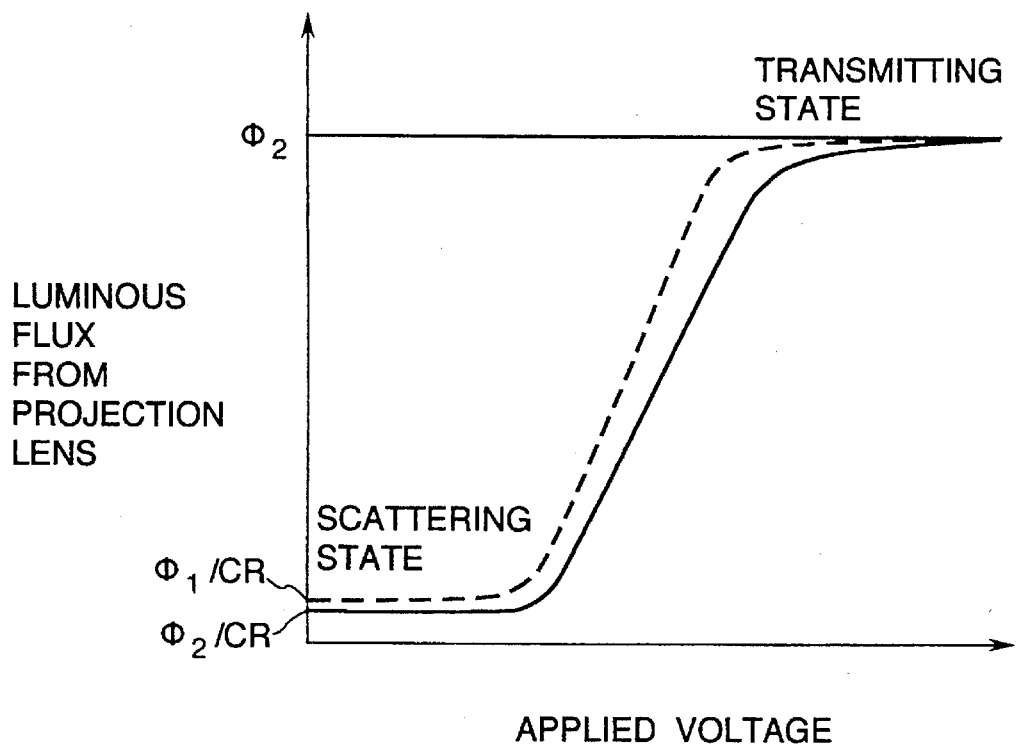
FIG. 13 is a graph of showing the relationship between the voltage applied to the liquid crystal light valve and the luminous flux emitted from the projection lens.

FIG. 13 is a graph showing the relationship between the voltage applied to the PDLC and the luminous flux projected, when liquid crystal light valve is a PDLC. In the figure, the solid line indicates the characteristics when aperture diameter $D_a$ of the diaphragm 4 is set so that the diameter $D_b'$ of the light source image formed on the entrance pupil 10 of the projection lens 9 is coincident with the entrance pupil diameter $D_b$ ($D_b = D_b'$). The broken line indicates the characteristics when the aperture diameter $D_a$ of the diaphragm 4 is set so that the diameter $D_b'$ of the light source image formed on the entrance pupil 10 of the projection lens 9 is slightly larger than the entrance pupil diameter $D_b$ ($D_b < D_b'$). The black-level luminous flux when $D_b = D_b'$ is $\Phi_1/CR$, and the black-level luminous flux when $D_b < D_b'$ is $\Phi_2/CR$. From Equation (4), these luminous fluxes are related in a manner shown by Equation (5) below.

$$(\Phi_2/CR) < (\Phi_1/CR) \qquad (5)$$

White-level luminous flux is $\Phi_2$, irrespective of whether $D_b = D_b'$ or $D_b < D_b'$, and when the size of diaphragm 4 of the illuminating system and the entrance pupil diameter $D_b$ are coincident, maximum contrast can be obtained without sacrificing the white level.

However the plane $S_1$, which is disposed in the diaphragm of the illuminating system and the plane $S_2$ which is placed on the entrance pupil 10 are conjugate, and a light source having the same configuration as the diaphragm 4 of the illuminating system forms an image at the position of the entrance pupil 10. Thus, the relationship between the aperture diameter $D_a$ of the diaphragm 4 and the light source image diameter $D_b'$ is as shown in Equation (6) below.

$$D_a/D_b' = f_1/f_2 \qquad (6)$$

White-level brightness loss is minimized and at the same time the contrast of the projected image is maximized, when light source image diameter $D_b$ and entrance pupil $D_b'$ are coincident. Thus, if the values of $D_a$ and $D_b$ are set in such a way that the relationship among the aperture diameter $D_a$ of the diaphragm 4, the diameter $D_b$ of the entrance pupil 10, the focal length $f_1$ of the collimation lens 5, and the focal length $f_2$ of the field lens 7 is as shown in Equation (7) below, contrast can be maximized.

$$D_a = D_b \cdot (f_1/f_2) \qquad (7)$$

Again, in order to make the diameter $D_b'$ of the light source image at the position $s_2$ of the entrance pupil 10 somewhat larger (approximately 10% larger) than diameter $D_b$ of the entrance pupil, $D_a$ and $D_b$ may be set to satisfy the relationship in Equation (8) below.

$$D_a > D_b \cdot (f_1/f_2) \qquad (8)$$

When Equation (8) is satisfied, contrast will be lower than in Equation (7), but there are advantages to be realized in the relaxation of limitations on the configuration of the illuminating system and the accuracy of the disposing of the projection lens 9, and in ease of construction.

Figure 14:
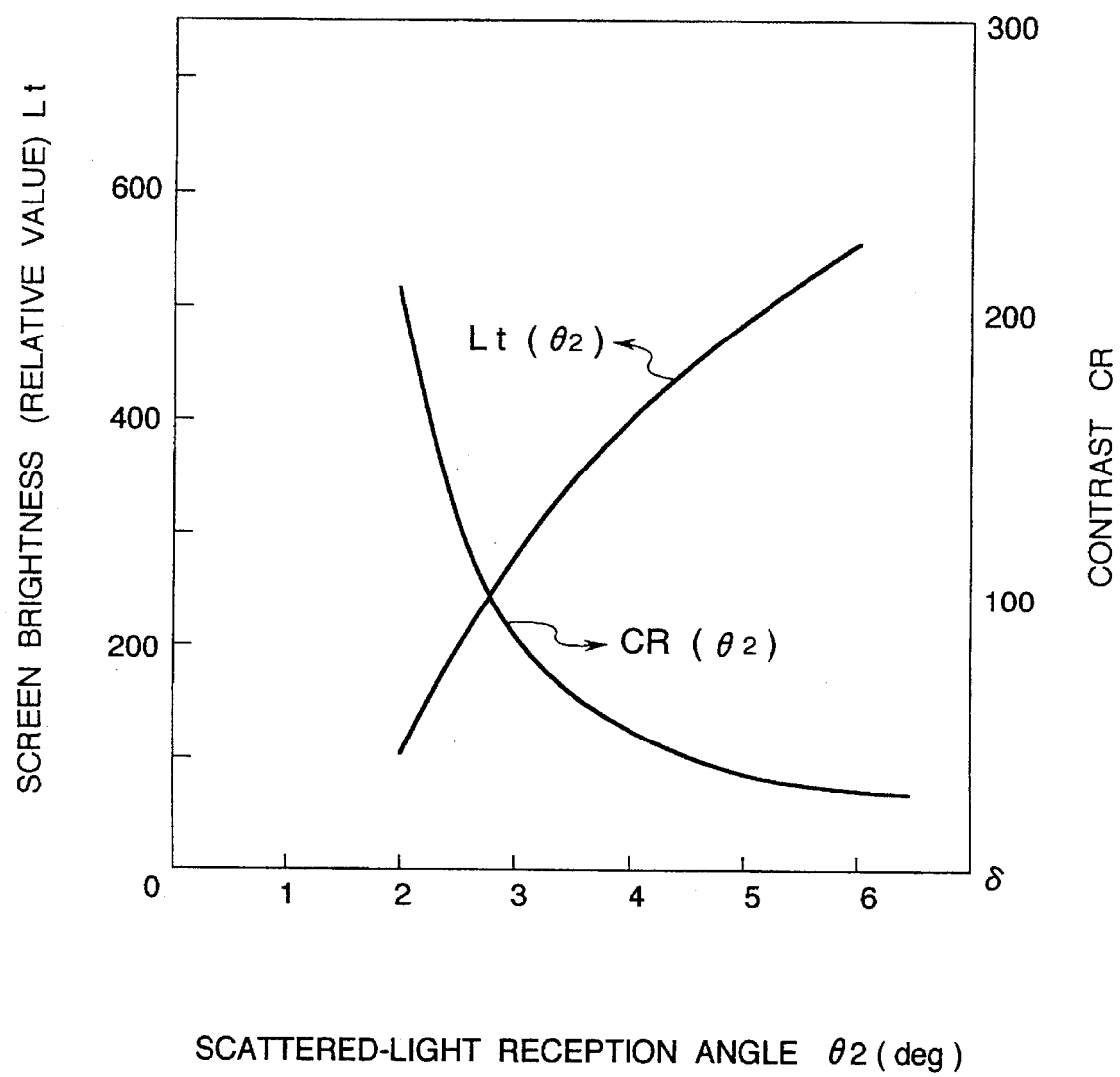
FIG. 14 is a graph showing the screen brightness characteristics and contrast characteristics.

FIG. 14 is a graph of the screen brightness $L_t(\theta_2)$ and contrast $CR(\theta_2)$ characteristics. As will be appreciated from the figure, the contrast $CR(\theta_2)$ will improve, the smaller the scattered-light reception angle $\theta_2$ of the projection lens 9 becomes. If, however, the scattered-light reception angle $\theta_2$ is decreased, the amount of the light component blocked by the diaphragm 4 of the illuminating system and the entrance pupil 10 of the projection lens 9 will increase, thereby decreasing screen brightness $L_t(\theta_2)$. Thus, when the emphasis is to be placed on the contrast of the projected image, the aperture diameter of diaphragm 8 of projection lens 9 should be decreased as should be the aperture diameter $D_a$ of illuminating system diaphragm 4. When, on the other hand, emphasis is to be placed on the brightness of the projected image, the aperture diameter of diaphragm 8 of projection lens 9 should be increased, as should be aperture diameter $D_a$ of illuminating system diaphragm 4.

Figure 15:
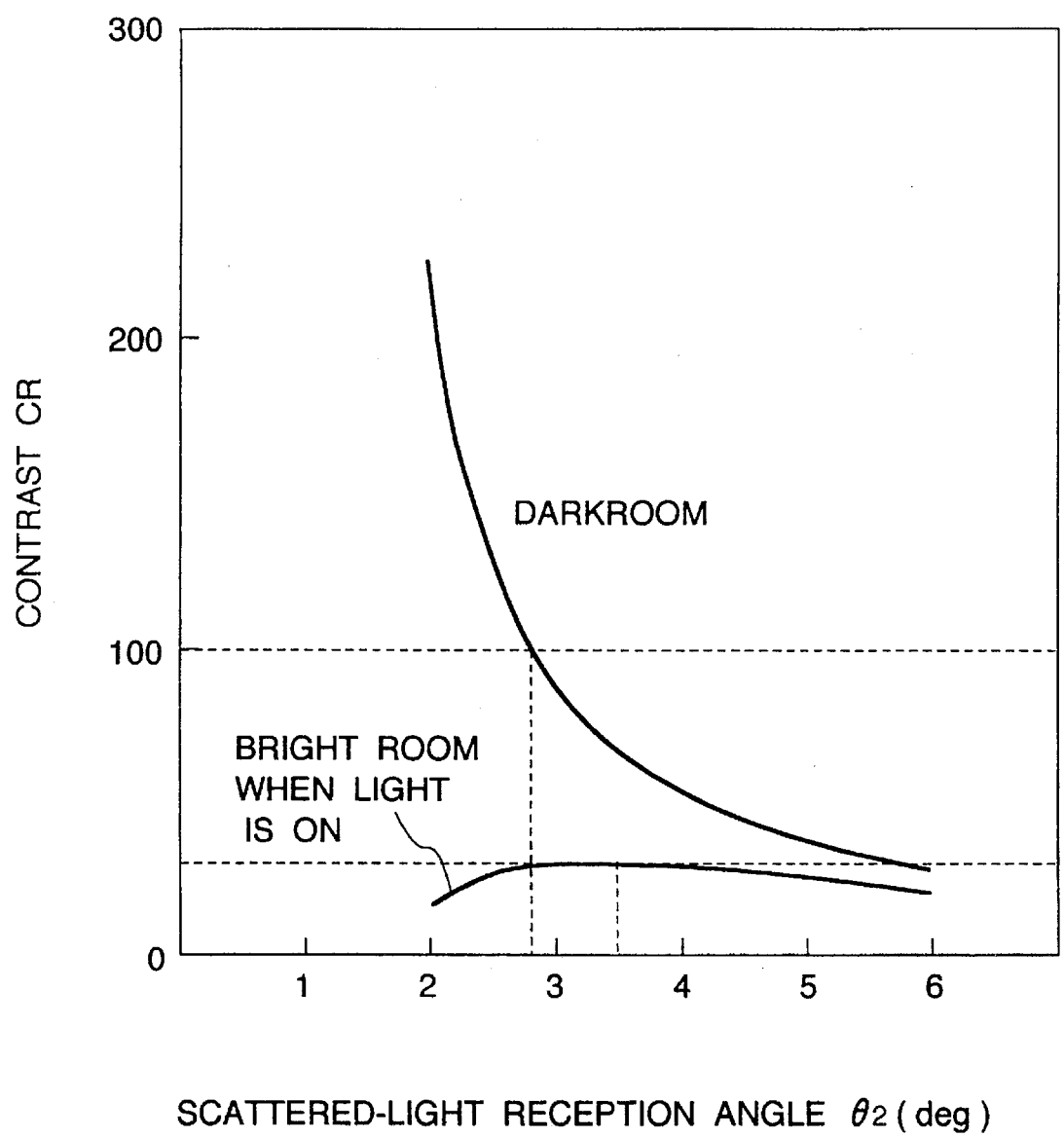

FIG. 15 is a graph showing the scattered-light reception angle $\theta_2$ vs. contrast CR characteristics of a projection display device in a darkroom when the light is off and in a bright room when the light is on. When the scattered-light reception angle $\theta_2$ is 2.8 degrees, contrast CR in the darkroom is 100. In the bright room, the illuminating light illuminates the screen 12 and raises black level brightness, with the result that contrast CR drops to 30 as shown in FIG. 15. Even if the scattered-light reception angle $\theta_2$ and the aperture diameter $D_a$ of the diaphragm 4 are increased, thereby increasing the degree of the parallelization of the illuminating light from 2.8 degrees to 3.5 degrees, there is no effect on contrast CR and an image of apparently greater brightness, equivalent to a approximately 40% improvement in white-level brightness, can be obtained.

Thus it is possible, by controlling the aperture diameter of the diaphragm 4 and the aperture diameter of diaphragm 8 of the projection lens 9 in accordance with the conditions of illumination in the area in which the image is to be viewed, a projected image of appropriate contrast and high brightness can be obtained.

It should be noted that while the above description concerned the projection display device using a single liquid crystal light valve, it is possible to realize the projection display device using a separating section that divides white light into red, green and blue light, three monochrome liquid crystal light valves for red, green and blue light, and a synthesizing section that synthesizes the red, green and blue light.

It may further be noted that while the above description concerned a case in which the field lens 7 was disposed on the downstream of the liquid crystal light valve 6, the field lens 7 may equally well be disposed on the upstream of the light valve 6.

Second Embodiment

Figure 16:
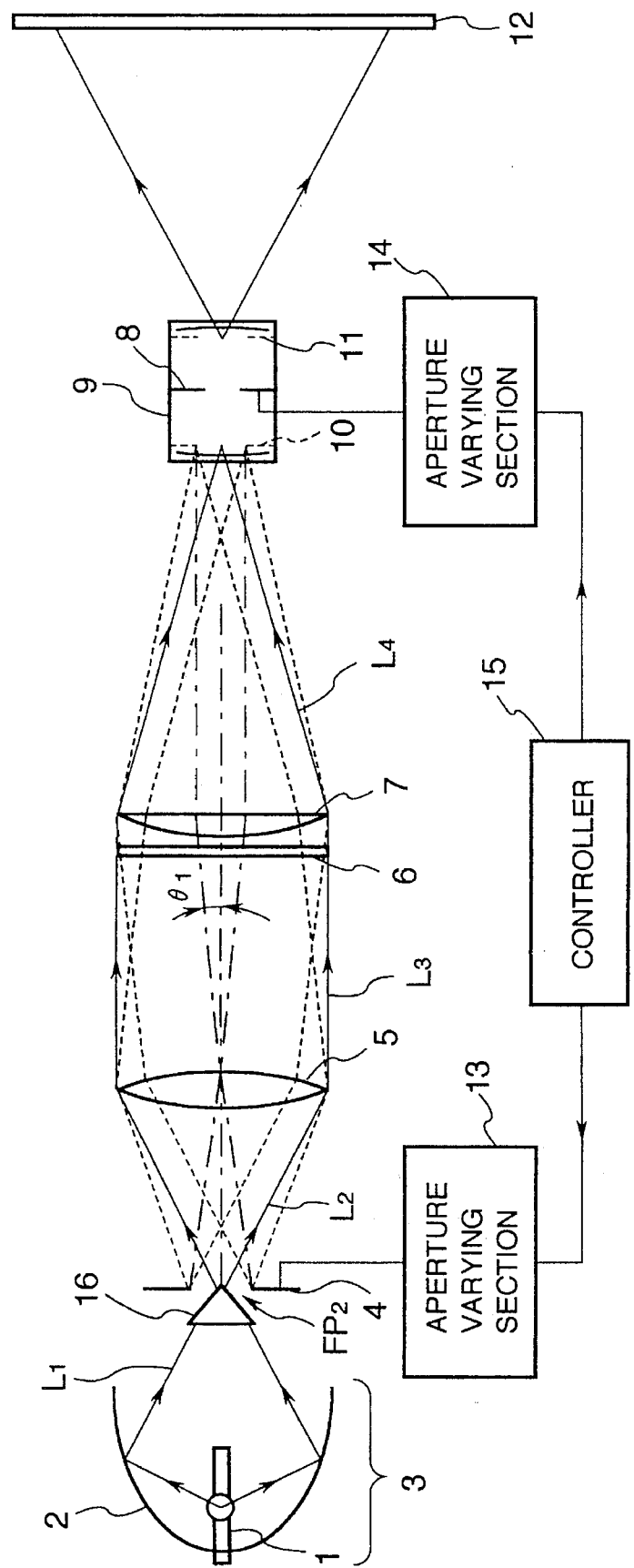
FIG. 16 is a structural diagram showing the optical system of a projection display device in accordance with the second embodiment of this invention.

FIG. 16 shows the optical system of a projection display device in accordance with a second embodiment of this invention. As shown in FIG. 16, the projection display device of the second embodiment differs from the device of the first embodiment described above only in the one respect that it is provided with a conical or pyramidal lens 16 that is disposed in the vicinity of the aperture of the diaphragm 4 of the illuminating system and of the second focal point $FP_2$ of the elliptical mirror 2.

Figure 17:
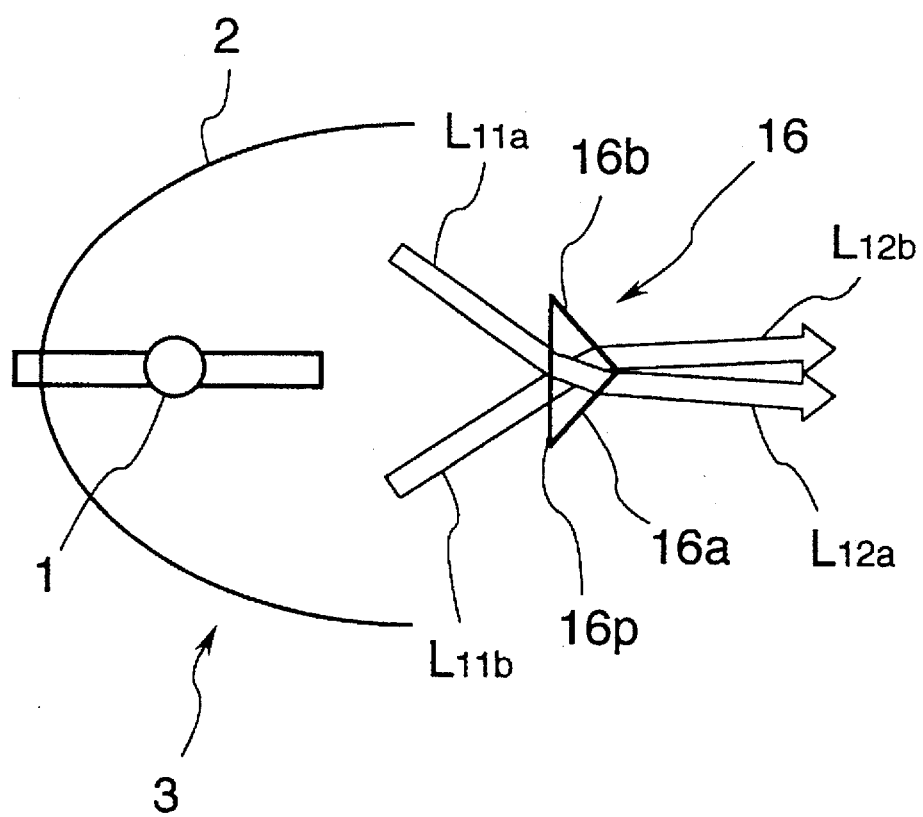
FIG. 17 is an explanatory diagram showing the operation of a conical or pyramidal lens 16.

FIG. 17 is an explanatory diagram showing the function of the conical or pyramidal lens 16. As shown in FIG. 17, focused light beam $L_{11a}$ from the elliptical mirror 2 is refracted at a plane face 16p and an inclined face 16a of the conical or pyramidal lens 16. On the other hand, focused light beam $L_{11b}$ is refracted at a the plane face 16p and an inclined face 16b of the conical or pyramidal lens 16. Therefore, the light beam $L_{12a}$ emitted from the inclined face 16a and the light beam $L_{12b}$ emitted from the inclined face 16b are substantially superimposed.

Figure 18A:
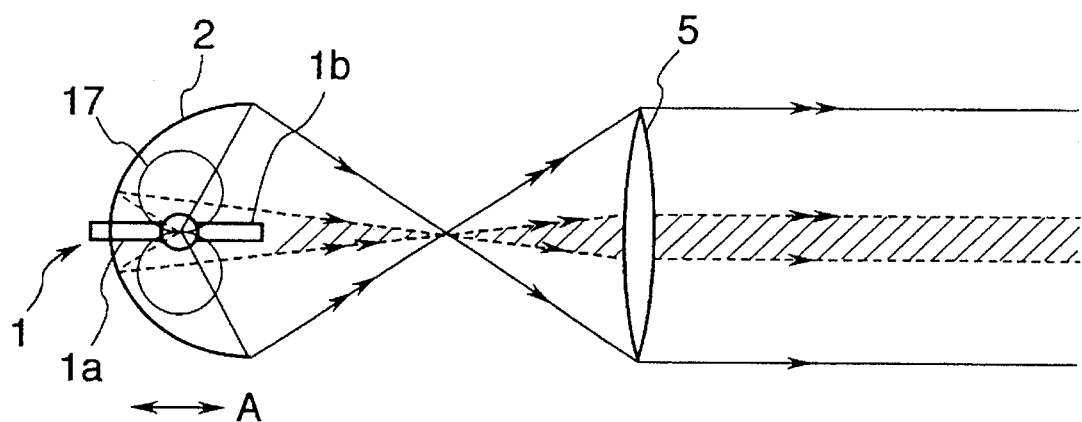
FIG. 18A and FIG. 18B are explanatory diagrams showing the principle by which the distribution of the luminous flux from a conical or pyramidal lens 16 is made uniform.
Figure 18B:
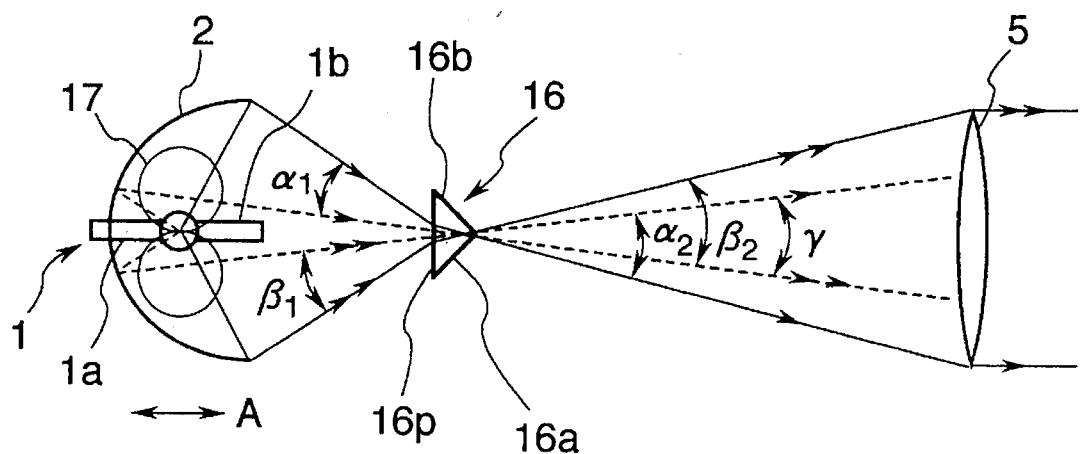

FIG. 18A and FIG. 18B are diagrams for the purpose of explaining the distribution of the light emitted from a metal halide lamp 1 in which long electrodes 1a and 1b extend in a direction A of the center axis of revolution of the elliptical mirror 2. FIG. 18A shows the case in which the conical or pyramidal lens 16 is not provided, and FIG. 18B shows the case in which the conical or pyramidal lens 16 is provided. As shown in FIG. 18A, when the electrodes 1a and 1b of the metal halide lamp 1 are disposed on the axis of revolution of the elliptical mirror 2, the light emitted in a direction at a right angle with the electrodes 1a and 1b (upward and downward in the figure) is the strongest (see light quantity distribution curve 17 in FIG. 18A), and the strength of the light emitted in a direction A (the hatched portion in FIG. 18A) is decreased. As shown in FIG. 18B, by disposing the conical or pyramidal lens 16 in the vicinity of the second focal point of the elliptical mirror 2, the light injected within the range of $\alpha_1$ becomes the light emitted around $\alpha_2$, and the light injected within the range of $\beta_1$ becomes the light emitted around $\beta_2$. Thus, the emitted light is superimposed within the range of $\gamma$, the distribution of the light passing through the conical or pyramidal lens 16 is made uniform, making it possible to eliminate the dark region (the hatched portion) in FIG. 18A. By this means the liquid crystal light valve 6 is uniformly illuminated, and a projected image having high peripheral quantity of light and highly uniform brightness can be obtained. The other structures of the projection display device of FIG. 16 are identical to the structures bearing the same numerals in FIG. 9.

Third Embodiment

Figure 19:
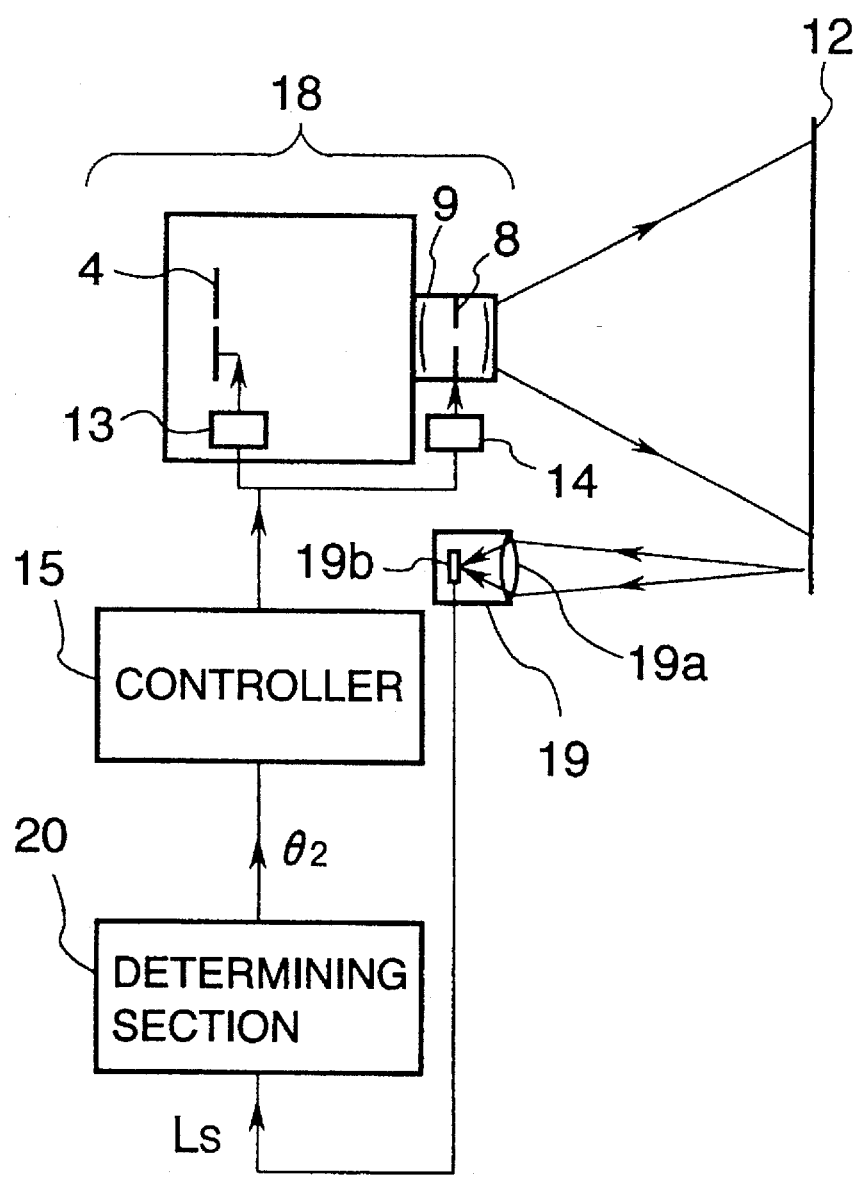
FIG. 19 is a diagram showing the configuration of a projection display device in accordance with the third embodiment of this invention.

FIG. 19 shows the configuration of a projection display device in accordance with a third embodiment of this invention. In FIG. 19, a reference numeral 18 designates the projection display device shown in FIG. 9 or FIG. 16. The projection display device of the third embodiment is also provided with a brightness detection section 19 that detects the brightness at a predetermined area on the screen 12 (i.e., dark-level brightness $L_s$), and a scattered-light reception angle determining section 20 that determines the scattered-light reception angle $\theta_2$ on the basis of the brightness signal output from the brightness detection section 19. The brightness detection section 19 comprises an image formation lens 19a and a photodetector 19b, and is set by means of the image formation lens 19a so that the screen 12 and the photodetector 19b are in a conjugate relationship.

The black-level brightness $L_d(\theta_2)$ at the scattered-light reception angle $\theta_2$ when the dark-level brightness $L_s$ is 0 may be expressed by the following Equation (9) using the white-level brightness $L_t(\theta_2)$ and the contrast $CR(\theta_2)$ shown in FIG. 14.

$$L_d(\theta_2)=L_t(\theta_2)/CR(\theta_2) \qquad (9)$$

The white-level brightness $L_t'(\theta_2)$ and the contrast $CR'(\theta_2)$, when the dark-level brightness $L_s$ is not equal to 0, may then be expressed, respectively, by $$L_t'(\theta_2)=L_t(\theta_2)+L_s \qquad (10)$$

$$CR'(\theta_2)=\{L_t(\theta_2)+L_s\}/\{L_d(\theta_2)+L_s\} \qquad (11)$$

Using data of the dark-level brightness $L_s$ on the screen 12, the scattered-light reception angle determining section 20 calculates the value of $\theta_2$ when $L_t'(\theta_2)$ and $CR'(\theta_2)$ in Equations (10) and (11) are maximized. Using the controller 15 and the aperture varying sections 13 and 14, the aperture diameter $D_a$ of the diaphragm 4 and the aperture diameter of the diaphragm 8 of the projection lens 9 can be changed to the optimum values.

Since, in the third embodiment, the aperture diameter $D_a$ of the diaphragm 4 and the aperture diameter of the diaphragm 8 of the projection lens 9 are set in accordance with time result of monitoring the brightness of the screen 12, a projected image of the best brightness and contrast can be obtained in accordance with the illumination condition.

Further, in the third embodiment, a projected image of outstanding brightness and contrast can be obtained in accordance with the illumination condition in which the projected image is viewed.

Note that, in order to detect the dark-level brightness, the brightness detection section 19 detects the brightness at a peripheral area of the screen 12 on which an image is not projected. But it is equally possible to detect the brightness level of the area of the screen 12 on which an image is projected, by providing a structure that momentarily interrupts the projected light.

It is also possible to determine the scattered-light reception angle by converting the color image to monochrome image and directly detecting both brightnesses, and if, further, contrast is measured directly by displaying a lattice pattern, it is possible to determine the scattered-light reception more rapidly. This structure is effective for the projection display devices in which a reflective-type screen is used and the brightness level of the image varies depending on the screen type.

Fourth Embodiment

Figure 20:
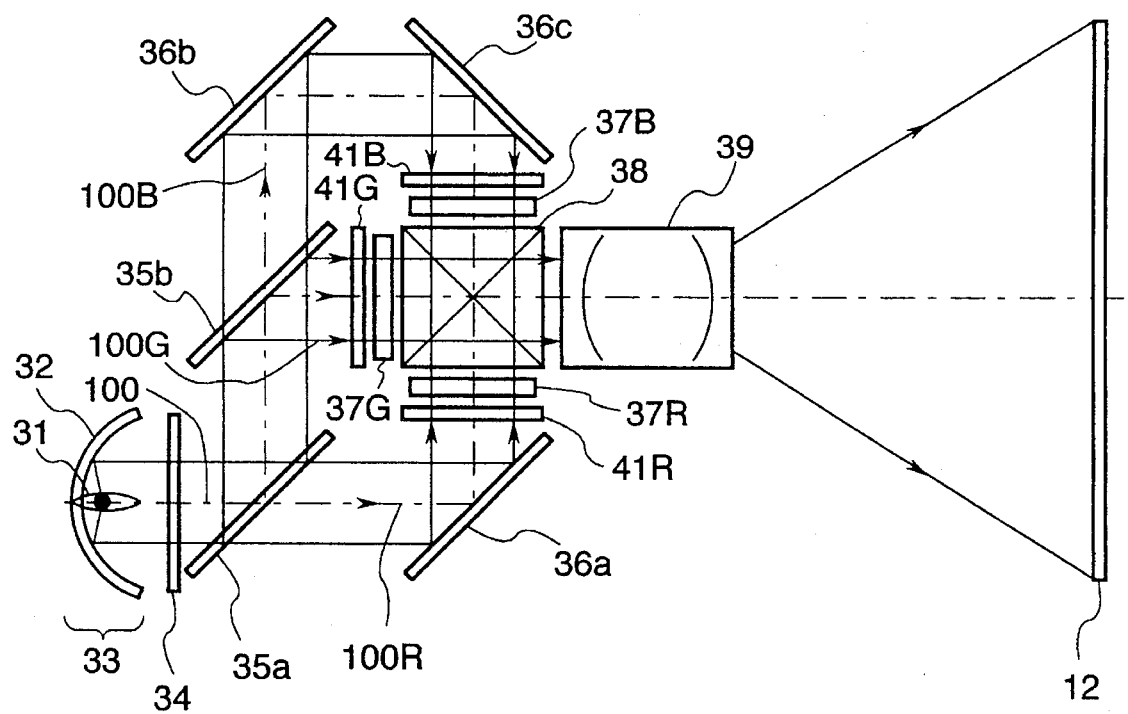
FIG. 20 is a structural diagram showing the optical system of a projection display device in accordance with the fourth embodiment of this invention.
Figure 21:
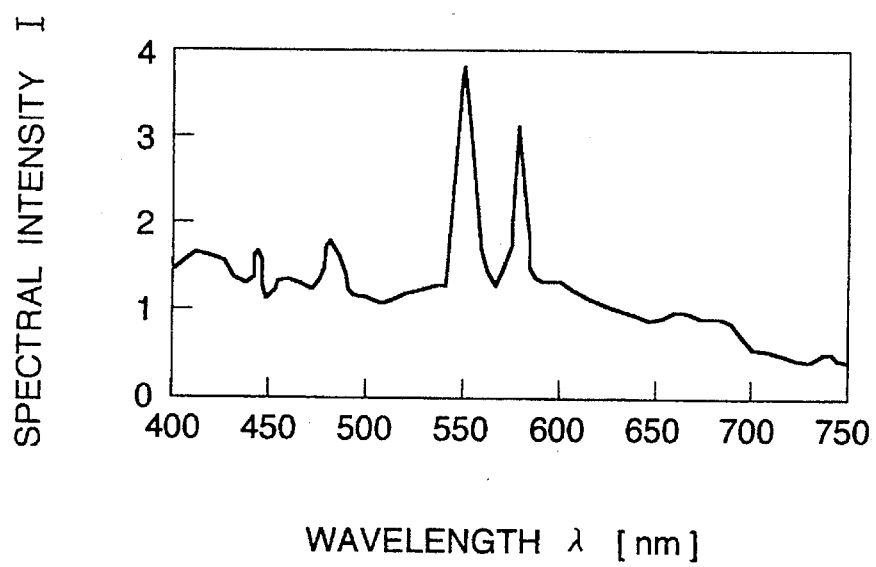
FIG. 21 is a graph showing the spectral characteristics of a metal halide lamp.

FIG. 20 shows the optical system of a projection display device in accordance with a fourth embodiment of this invention. As shown in FIG. 20, the projection display device of the fourth embodiment comprises an light source device 33 including a lamp 31 and a parabolic mirror 32, and a filter 34 such that the illuminating light emitted from the light source device 33 that is in the visible region (i.e., light with a wavelength of 400–700 [nm]) can pass through. The lamp 31 is a white light source such as a metal halide lamp, a xenon lamp and a halogen lamp. For example, the metal halide lamp has a spectral characteristics such as is shown in FIG. 21. The lamp 31 is disposed in such a way the center of emission of the lamp 31 is in the vicinity of the focal point of the parabolic mirror 32. Again, the reflective surface of the parabolic mirror 32 may, if necessary, be treated with a coating that permits the passage of infrared light (light the wavelength of which is greater than 700 [nm]), thereby reducing the heat radiated toward liquid crystal light valves. The luminous flux emitted by the lamp 31 and then reflected from the parabolic mirror 32 becomes parallel light 100 and is injected into the filter 34.

Figure 22:
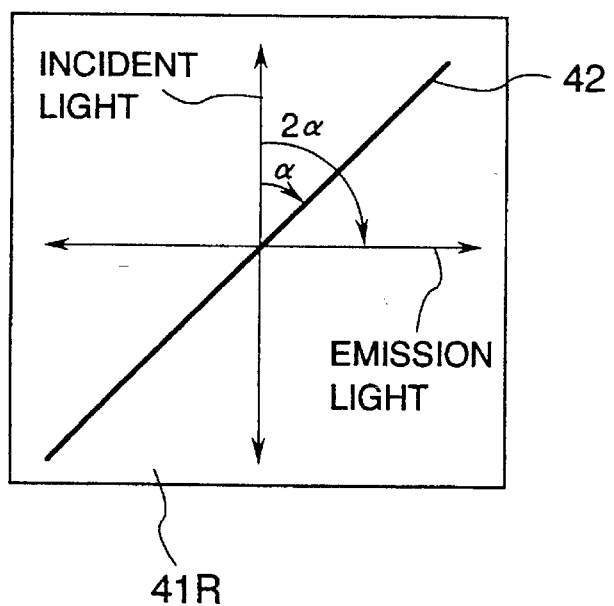
FIG. 22 is an explanatory diagram showing the function of a halfwave plate.

Further, the projection display device according to the fourth embodiment comprises dichroic mirrors 35a, 35b and 35c, halfwave plates 41R, 41G and 41B, liquid crystal light valves 37R, 37G and 37B, dichroic prism 38 for color synthesis, and a projection lens 39. The relationships between the optic axis 42 of the halfwave plate 41R and the incident light and between the optic axis 42 and the emission light of the halfwave plate 41R are shown in FIG. 22. Taking the angle between the plane of vibration of arbitrary polarized light (i.e., natural light injected into the halfwave plate) and the optic axis 42 as α, the emission light is polarized so as to rotate the plane of vibration at an angle of 2 α with the respect to the plane of vibration of the arbitrary polarized light of the incident light. In the fourth embodiment, by setting the angles α between the planes of vibration of both s-polarized light and p-polarized light with the optic axis 42 of the halfwave plate to 45°, angle 2 α was made to be 90°. Thus, the s-polarized light component of the incident light is changed to p-polarized light component by passing through the halfwave plate 41R. In the same way, the p-polarized light component is changed to the s-polarized light component by passing through the halfwave plate 41R. The halfwave plates 41G and 41B have analogous functions.

Figure 23:
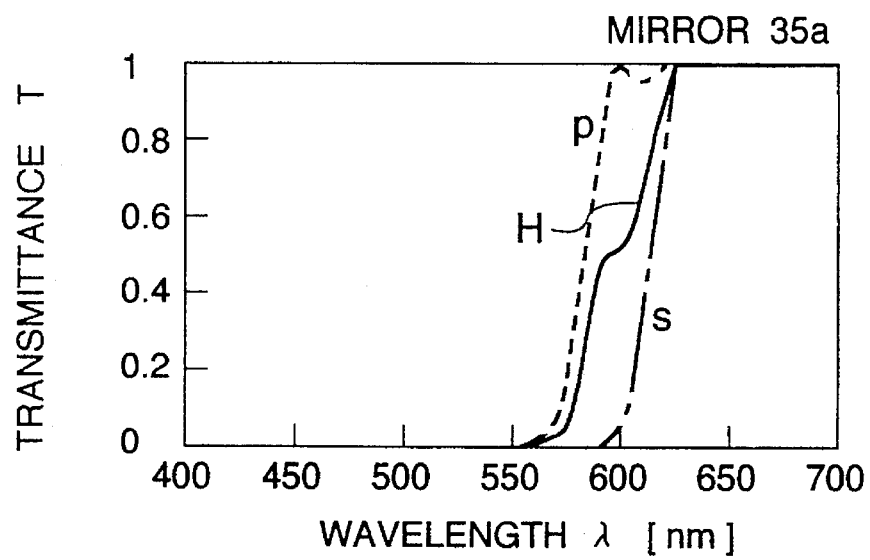
FIG. 23 is a graph showing the spectral transmittance characteristics of the red-transmitting dichroic mirror 35a in FIG. 20.
Figure 24:
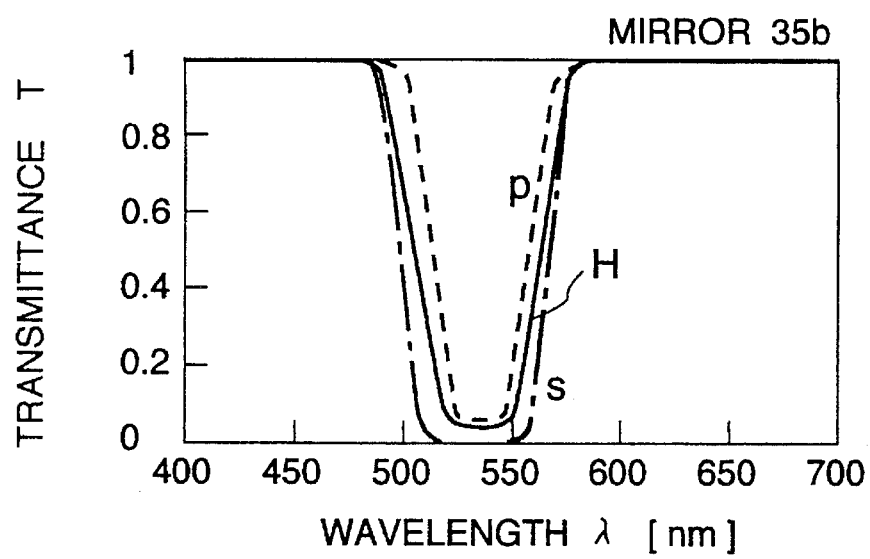
FIG. 24 is a graph showing the spectral transmittance characteristics of the blue-transmitting dichroic mirror 35b in FIG. 20.

The dichroic mirror 35a reflects green light 100G and blue light 100B, passes red light 100R, and has spectral transmittance characteristics shown in FIG. 23. The dichroic mirror 35b reflects green light 100G, passes blue light 100B, and has spectral transmittance characteristics shown in FIG. 24. The dichroic prism 38 synthesizes red right 100R, green light 100G and blue light 100B, which have been injected from the respective planes of incidence, and outputs a flux of synthesized light toward the projection lens 39. The dichroic prism 38 has spectral reflectivity characteristics shown in FIG. 25A with respect to the red-reflecting surface, spectral transmittance characteristics shown in FIG. 25B with respect to green light, and spectral reflectivity characteristics shown in FIG. 25C with respect to the blue-reflecting surface.

In the device of the fourth embodiment having the structure described above, light 100, which is output from the light source device 33 and passes through the filter 34 is separated by the dichroic mirror 35a into red light 100R, which passes though, and green and blue light 100G and 100B, which are reflected. The path of red light 100R is bent by the reflecting mirror 36a so that it passes through the halfwave plate 41R and the liquid crystal light valve 37R and impinges on the dichroic prism 38. Green and blue light 100G and 100B, which were reflected by the dichroic mirror 35a, are separated by the dichroic mirror 35b into blue light 100B, which passes through, and green light 100G, which is reflected. Green light 100G passes through the halfwave plate 41G and the liquid crystal light valve 37G and impinges on the dichroic prism 38. The path of blue light 100B is bent by the reflecting mirrors 36b and 36c, to pass through the halfwave plate 41B and the liquid crystal light valve 37B and impinge on the dichroic prism 38. Thus by passing green light 100 through and reflecting red light 100R and blue light 100B, the dichroic prism 38 ejects a synthesized light toward the projection lens 39 so that a magnified image is projected on the screen 12.

Figure 1A:
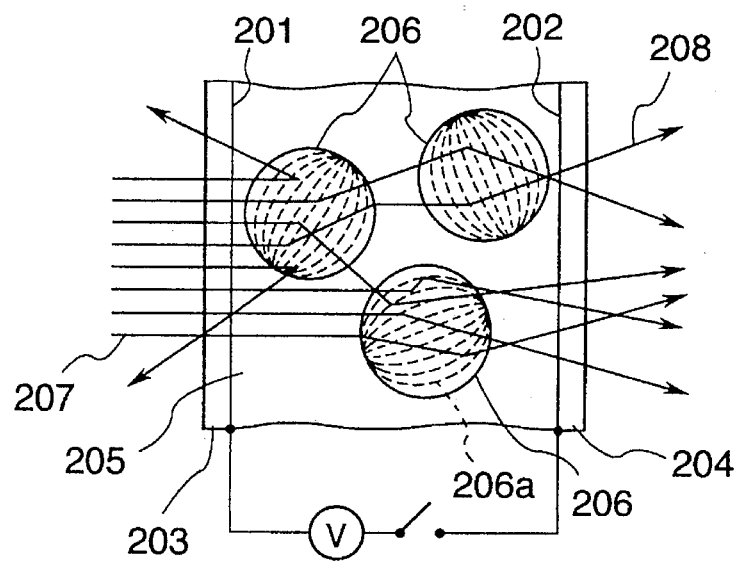
FIG. 1A and FIG. 1B are explanatory diagrams showing the principle of the PDLC.
Figure 1B:
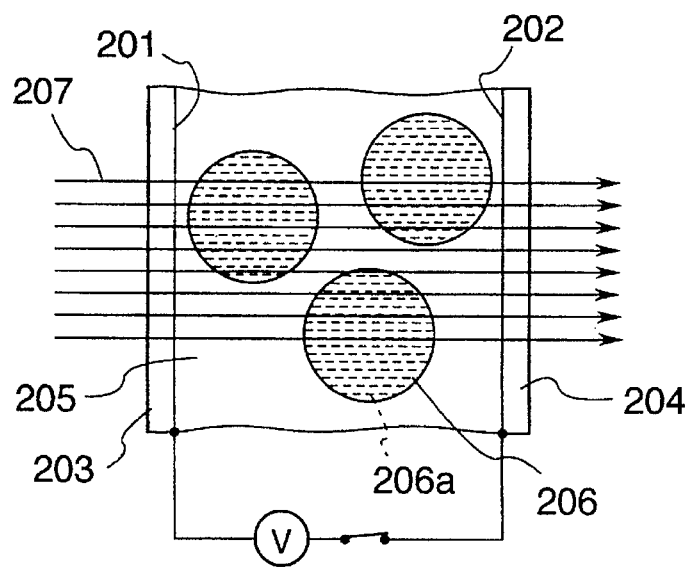
Figure 2:
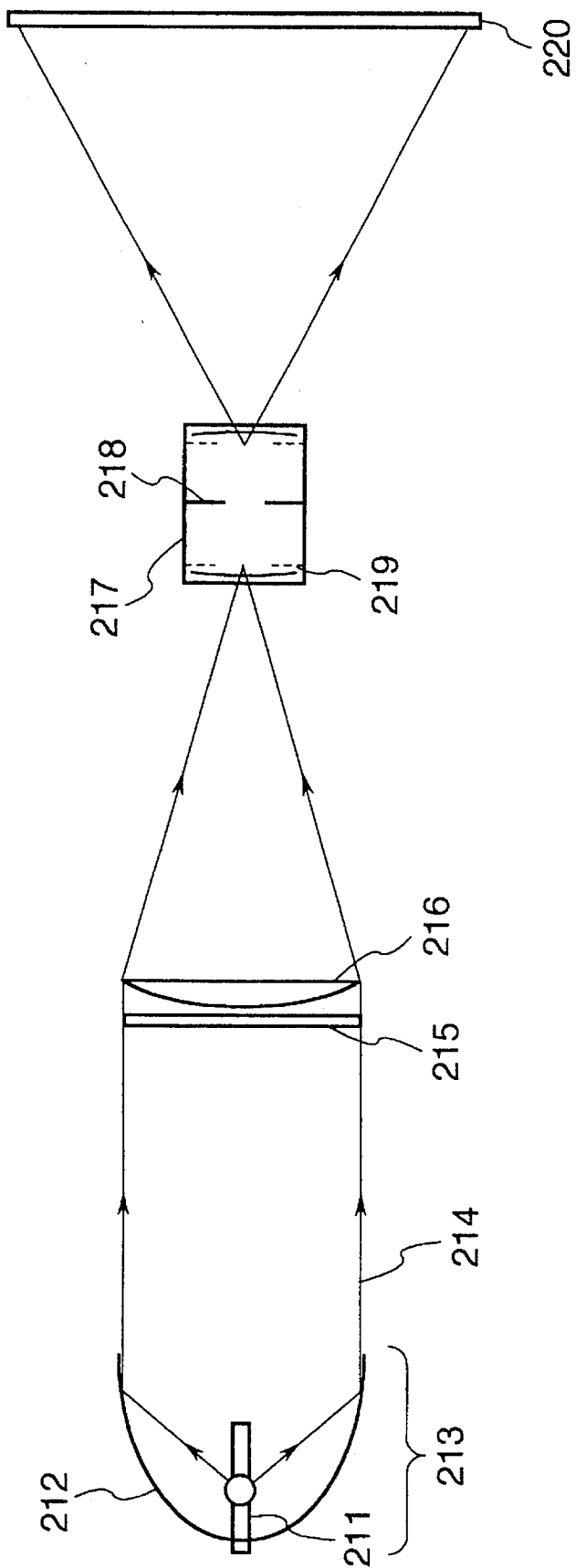
FIG. 2 is a structural diagram showing the optical system of a projection display device in accordance with prior art.
Figure 3:
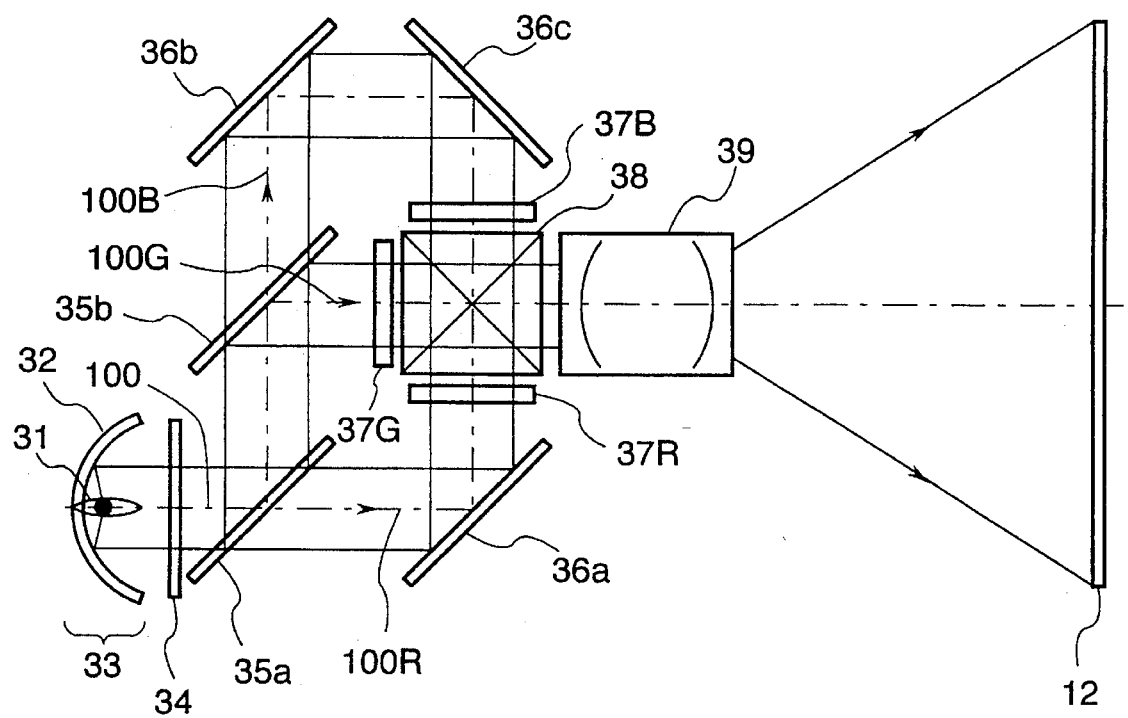
FIG. 3 is a structural diagram showing the optical system of another projection display device in accordance with prior art.
Figure 4A:
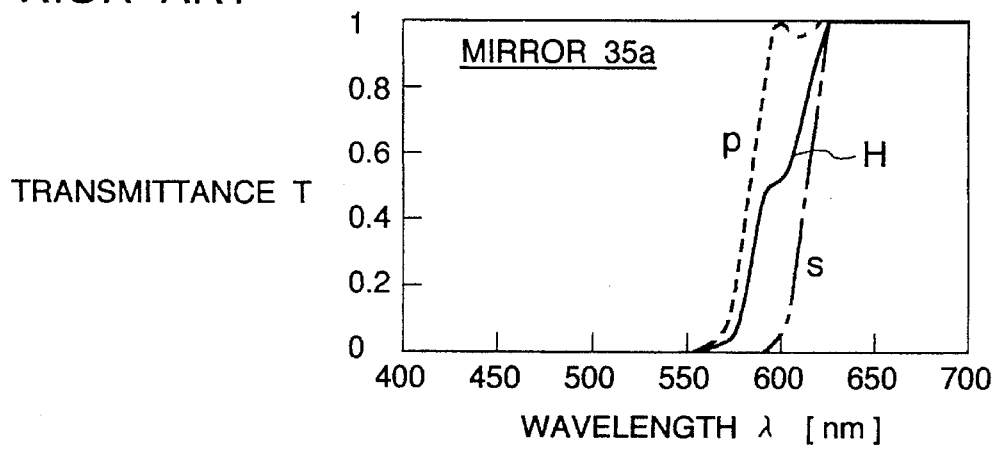
FIG. 4A is a diagram showing the spectral characteristics of the dichroic mirror 35a in the device of FIG. 3.
Figure 4B:
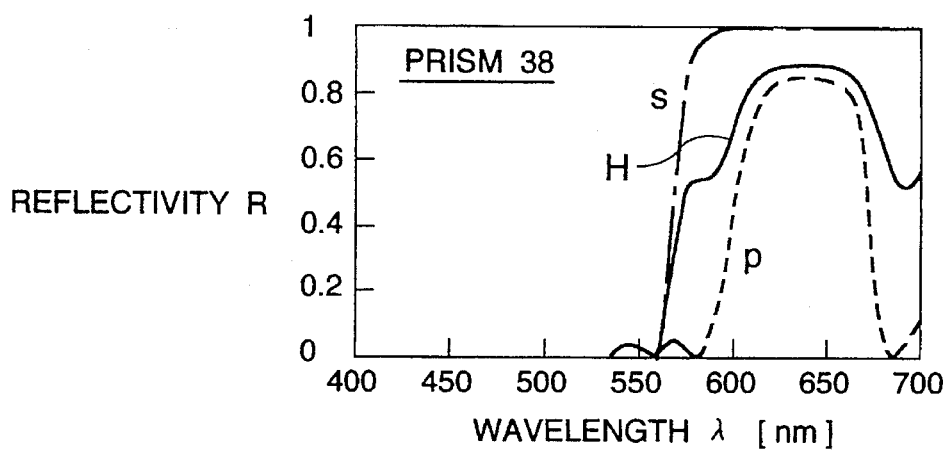
FIG. 4B ia a diagram showing the spectral characteristics of the dichroic prism 38 in the device of FIG. 3.
Figure 4C:
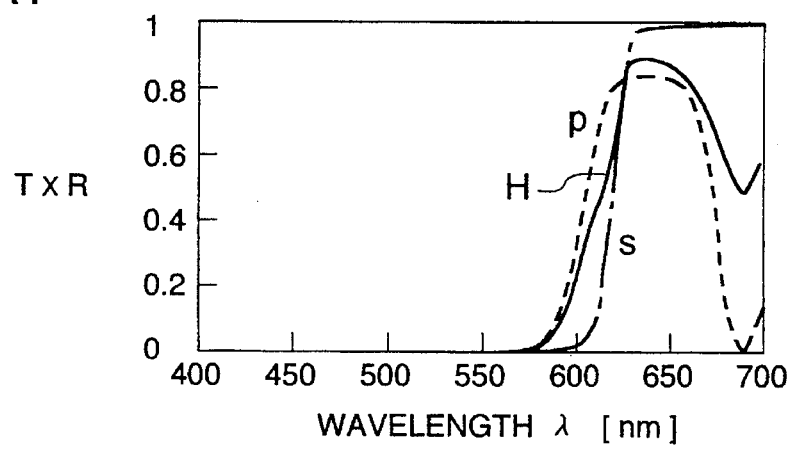
FIG. 4C is a diagram showing the integrated spectral characteristics of the dichroic mirror 35a and the dichroic prism 38 in the device of FIG. 3.
Figure 25A:
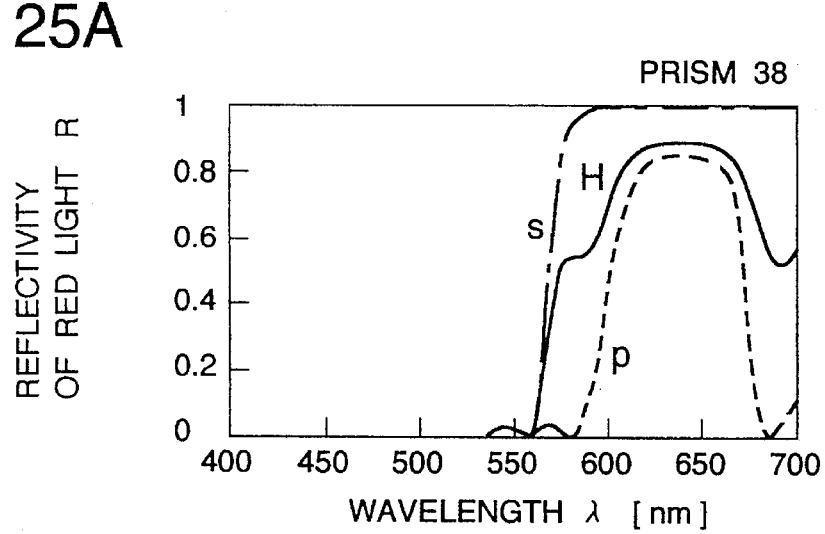
FIG. 25A is a graph showing the spectral reflectivity characteristics of the red-reflecting surface of the dichroic prism in FIG. 20.

In FIG. 20, the color-separation system contributing to (i.e., influencing) the hue of the red projected light is red-transmitting dichroic mirror 35a. Since, as shown in FIG. 23, the dichroic mirror 35a has a wider transmission band for the p-polarized light component than for the s-polarized light component, red light 100R is partially polarized with the p-polarized light component stronger than the s-polarized light component. Since red light 100R passes through the halfwave plate 41R, the polarization characteristics of the p-polarized and s-polarized light components are interchanged, thereby resulting in partially polarized light in which the s-polarized light component is stronger than the p-polarized light component. The converted red light 100R impinges via the liquid crystal light valve 37R onto the dichroic prism 38. Since the dichroic prism 38 has the function of reflecting red light 100R toward the projection lens 39, the spectral reflectivity characteristics of the red-reflecting surface, as shown in FIG. 25A, have a reflection band that is wider for the s-polarized light component than for the p-polarized light component. Accordingly, the red light is emitted from the projection lens 39 with a strong s-polarized light component and a weak p-polarized light component. Thus, in comparison with the example of prior art shown in FIG. 3, the red light reflecting surface of the dichroic prism 38 can efficiently reflect both the s-polarized and the p-polarized light components of the red light 100R toward the projection lens 39, so a stronger red illumination can be obtained.

Figure 25B:
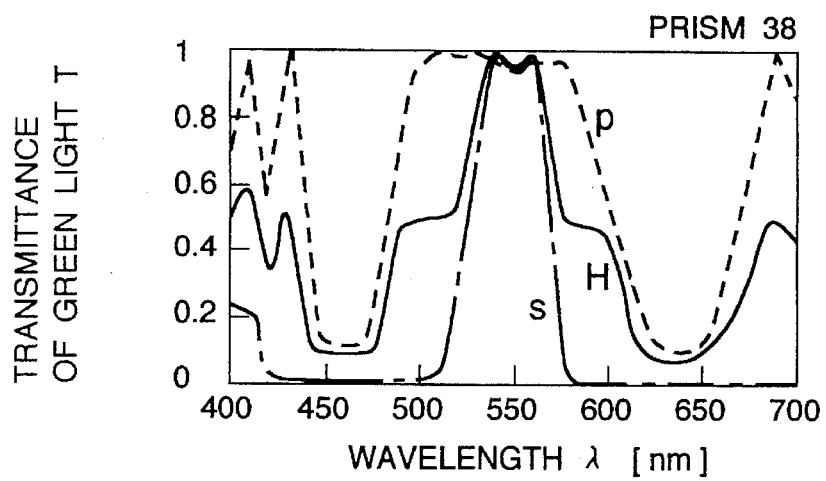
FIG. 25B is a graph showing the spectral transmittance characteristics of the green-transmitting surface of the dichroic prism in FIG. 20.
Figure 25C:
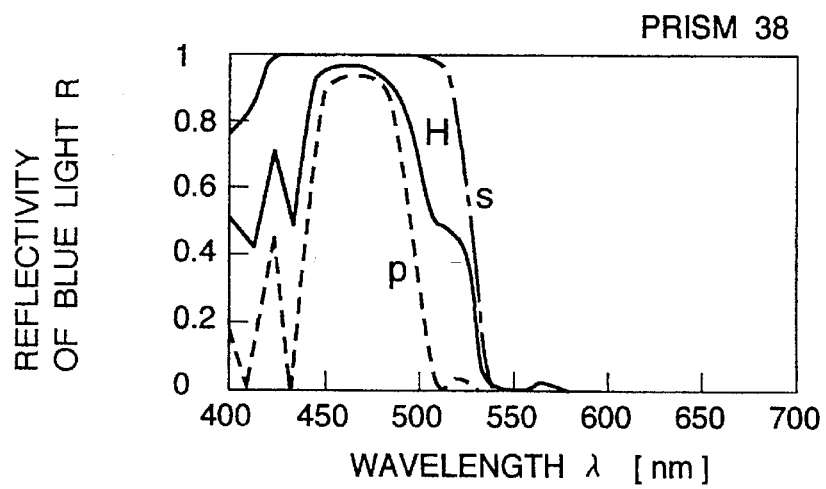
FIG. 25C is a graph showing the spectral reflectivity characteristics of the blue-reflecting surface of the dichroic prism in FIG. 20.

The color-separation system contributing to the hue of the green projected light is the green-reflecting dichroic mirror 35b. Since, as shown FIG. 24, the dichroic mirror 35b has a wider transmission band for the p-polarized light component than for the s-polarized light component (that is to say, has a wider reflection band for the s-polarized light component than for the p-polarized light component), green light 100G is partially polarized with the s-polarized light component stronger than the p-polarized light component. Since green light 100G passes through the halfwave plate 41G, the polarization characteristics of the p-polarized and s-polarized light components are interchanged, thereby resulting in partially polarized light in which the p-polarized light component is stronger than the s-polarized light component. The converted green light 100G impinges via the liquid crystal light valve 37G onto the dichroic prism 38. The dichroic prism 38 has the function of passing green light 100G through and ejecting green light 100G toward the projection lens 39. As shown in FIG. 25B, the dichroic prism 38 has spectral characteristics such that the transmission band is wider for the p-polarized than for the s-polarized light component. Accordingly, the green light is emitted from the projection lens 39 with a strong p-polarized light component and a weak s-polarized light component. Thus, in comparison with the example of prior art shown in FIG. 3, the dichroic prism 38 can efficiently cause both the s-polarized and the p-polarized light components of the green light 100G to pass through and emit toward the projection lens 39, so a stronger green illumination can be obtained.

The color-separation system contributing to the hue of the blue projected light is the blue-transmitting dichroic mirror 35b. Since, as shown in FIG. 24, the dichroic mirror 35b has a wider transmission band for the p-polarized light component than for the s-polarized light component, blue light 100B is partially polarized with the p-polarized light component stronger than the s-polarized light component. Since blue light 100B passes through the halfwave plate 41B, the polarization characteristics of the p-polarized and s-polarized light components are interchanged, thereby resulting in partially polarized light in which the s-polarized light component is stronger than the p-polarized light component. The converted blue light 100B impinges via the liquid crystal light valve 37G onto the dichroic prism 38. The dichroic prism 38 has the function of reflecting blue light 100B towards the projection lens 39. As shown in FIG. 25B, the blue-reflecting surface has spectral characteristics such that the reflection band is wider for the s-polarized light component than for the s-polarized light component. Accordingly, the blue light is emitted from the projection lens 39 with a strong s-polarized light component and a weak p-polarized light component. Thus, in comparison with the example of prior art shown in FIG. 3, the blue light reflecting surface of the dichroic prism 38 can efficiently reflect both the s-polarized and the p-polarized light components of the blue light 100B toward the projection lens 39, so a stronger blue illumination can be obtained.

As has been explained above, in this fourth embodiment, by disposing the halfwave plates 41R, 41G and 41B in front of the liquid crystal light valves 37R, 37G and 37B, to interchange the spectral characteristics of the p-polarized light component and the spectral characteristics of the s-polarized light component, it is possible to match the relationship of the p-polarized and s-polarized cutoff wavelengths in the spectral characteristics of the color-separation system with the relationship of the p-polarized and s-polarized cutoff wavelengths in the spectral characteristics of the color-synthesizing system. This makes it possible to reduce illuminating light loss, and to increase the brightness of the projected image.

Note, however, that the halfwave plates 41R, 41G and 41B do not act as shown in FIG. 22 at all wavelengths. When natural light including an arbitrarily polarized light component is injected into the halfwave plate, the plane of polarization of the transmitted light will vary with the wavelength depending on the wavelength dependence of the phase difference. Taking the arbitrarily polarized light component injected into the halfwave plate as $\phi_0$, and taking the specific polarized light component that can be converted to the desired polarized light as $\phi$, the following equation (12) is satisfied:

$$\phi = \phi_0 \cdot (\sin \delta)^2 \qquad (12)$$

where $\delta = \pi \cdot R/\lambda$ $R = \lambda_0/2$

R: retardation of the halfwave plate $\lambda$: wavelength $\lambda_0$: designed central wavelength Further, the phase difference $\Delta$ produced by the halfwave plate may be found using the following equation $$\Delta = 2 \cdot \pi \cdot R/\lambda \qquad (13)$$

Figure 26:
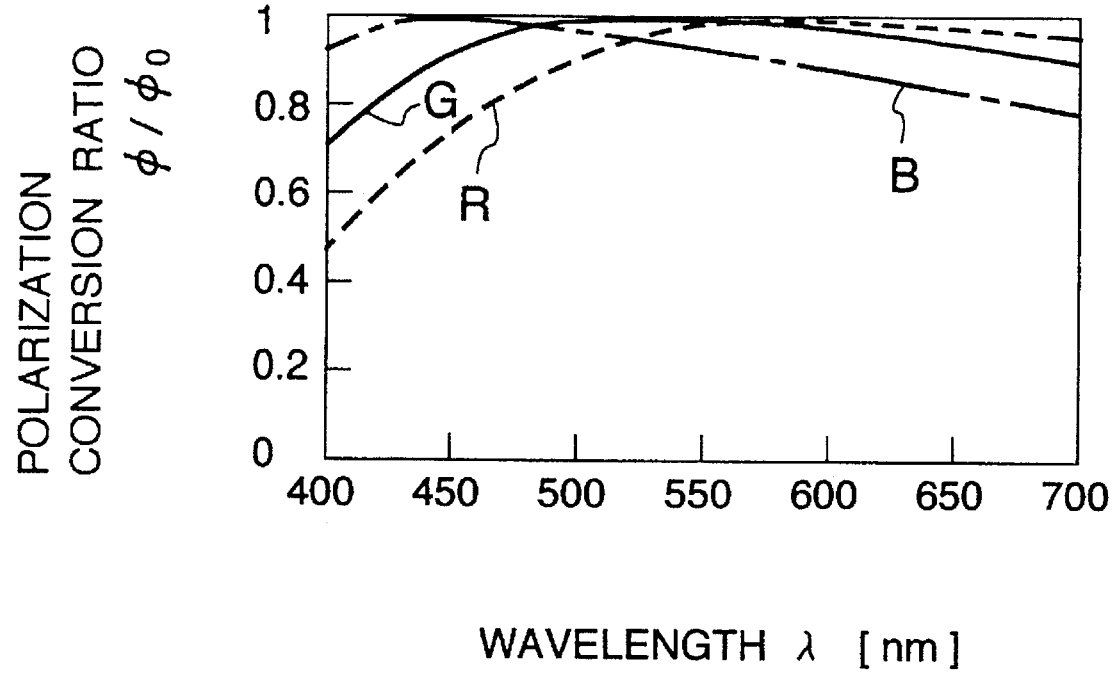
FIG. 26 is a graph for the purpose of explaining the wavelength-dependence of a halfwave plate performance.

That is to say, a wavelength $\lambda$ diverges from double the value of the retardation of the halfwave plate, polarization conversion ratio $\phi/\phi_0$ drops. The illuminating light injected into the halfwave plate, however, is homogeneous light of either red, green or blue color, and if the center wavelength of each of these homogeneous light is made to be 610 [nm], 540 [nm] and 470 [nm] respectively, it is possible, by setting the retardation of the halfwave plates for each of the light paths to 305 [nm], 270 [nm] and 235 [nm], respectively, to minimize the drop in the polarization conversion ratio due to the wavelength dependence of the phase difference. FIG. 26 shows the results of calculations for the polarization conversion ratio at this time. It was found that even at a divergence of ±50 [nm] from the center wavelength, the polarization conversion ratio was 95% or more for the halfwave plates for each of the homogeneous light, a value which presents no problem.

Further, nonreflective coatings (transmitting wavelength bands of, for example, 600–700 [nm] for red, 500–600 [nm] for green, and 400–500 [nm] for blue) consisting of multi-layer dielectric films may, if necessary, be applied to one or both of the light injection and light emitting surfaces of the halfwave plates 41R, 41G and 41B. This makes it possible to improve to some extent the transmittance of the halfwave plate. In addition, since the light injected into and passing through the halfwave plate are substantially parallel, the dependence of the spectral characteristics on the incident angle is great, and no problem is presented. Thus the coating can be composed of a multi-layer thin film, thereby making it possible to reduce to a minimum Fresnel reflection at the surface.

Fifth Embodiment

Figure 27:
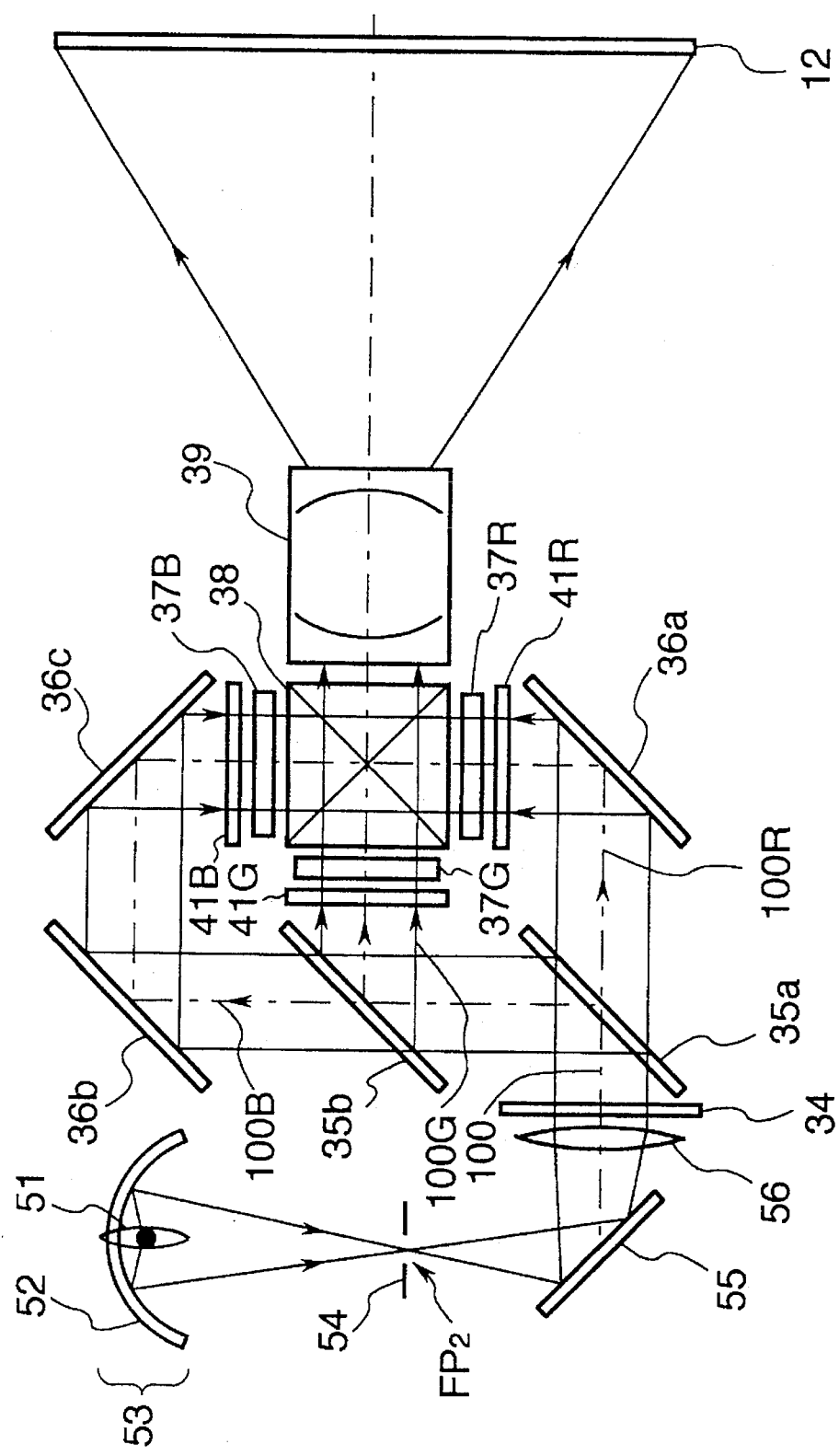
FIG. 27 is a structural diagram showing the optical system of a projection display device in accordance with the fifth embodiment of this invention.

FIG. 27 shows the optical system of a projection display device in accordance with a fifth embodiment of this invention. As is shown in FIG. 27, the projection display device of the fifth embodiment differs from the device in the fourth embodiment shown in FIG. 20 solely in that, in place of the light source device 33, it is provided with a light source device 53 comprising a lamp 51 and an elliptical mirror 52, an illuminating system diaphragm 54, a reflective mirror 55 and a collimation lens 56. The lamp 51 is so located that the center of its point of luminescence is at the position of the first focal point of the elliptical mirror 52, so that the portion of the light emitted by the lamp 51 that is reflected by the elliptical mirror 52 is focused the second focal point of the elliptical mirror 52 to form a secondary light source. If a xenon lamp or similar light source that is substantially dot-shaped luminescent is used as the lamp 51, it is possible to obtain an extremely small focal spot at the second focal point $FP_2$ of the elliptical mirror 52. But if a metal halide lamp or similar light source that is substantially line-shaped luminescent is used, the diameter of the focal spot obtained will be larger, with the result that focal spot diameter is limited by the positioning of the diaphragm 54. The collimation lens 56 having a focal length of $f_1$ is so disposed that it is separated by a distance along the light path from the secondary focal point $FP_2$ of the elliptical mirror 52 that is substantially equal to the focal length $f_1$, so that the light diverged from the vicinity of the of the second focal point and reflected by the mirror 55 will be substantially parallel. In all respects other than those described above, it is identical to the device of the fourth embodiment.

Note that the reflective mirror 55 may be a cold mirror that transmits infrared light (light with a wavelength of 700 [nm] or longer), in which case the heating of the liquid crystal light valves is prevented.

It is further possible in the fifth embodiment, by providing the same relationship between aperture diameter $D_a$ of the illuminating system diaphragm 54 and the the diameter of entrance pupil $D_b$ of the projection lens 39 as has already been described for the first embodiment shown in FIG. 9, a projected image of high brightness and contrast can be obtained.

Sixth Embodiment

Figure 28:
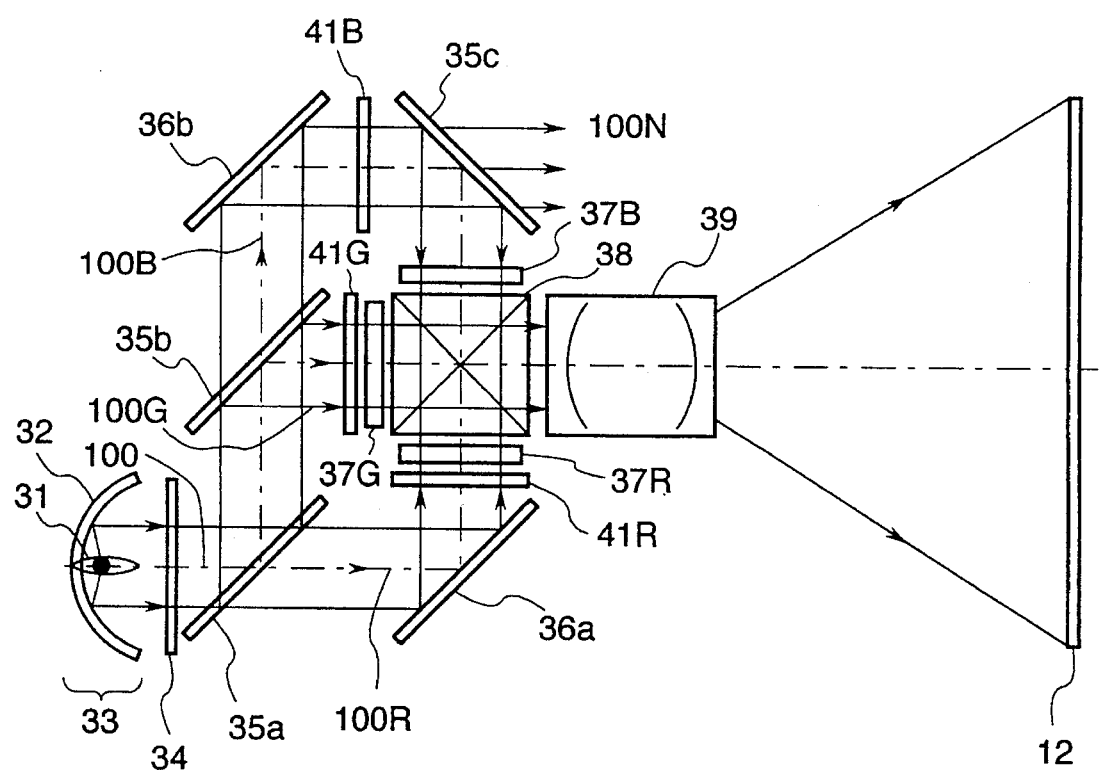
FIG. 28 is a structural diagram showing the optical system of a projection display device in accordance with the sixth embodiment of this invention.
Figure 29:
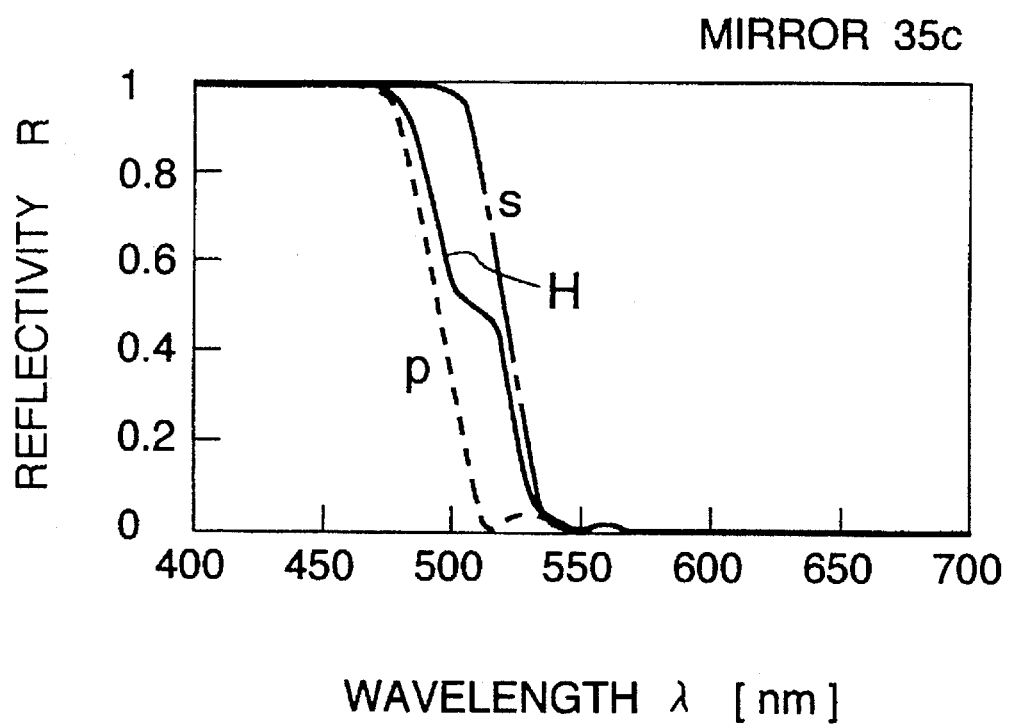
FIG. 29 is a graph showing the spectral reflectivity characteristics of the green-reflecting dichroic mirror 35c in FIG. 28.

FIG. 28 shows the optical system of a projection display device in accordance with a sixth embodiment of this invention. The projection display device of the sixth embodiment differs from the device in the fourth embodiment shown in FIG. 20 solely in that, in place of the reflecting mirror 36c, it is provided with a dichroic mirror 35c having spectral reflectivity, shown in FIG. 29, such that undesired light 100N passes through.

As is shown in FIG. 21, the light emission spectrum of the metal halide lamp 31 has a strong peak spectrum in the vicinity of 580 [nm]. If the peak spectrum is included in red or green homogeneous light, the red light or green light become an orangish red light or a yellow-greenish green light. Therefore, the peak spectrum is undesired spectral component, i.e., undesired light, with regard to assuring satisfactory hue for each of the red, green and blue homogeneous light, that is to say, with regard to broadening the color reproduction range of the projected light.

This undesired light 100N emitted by the metal halide lamp 31 is reflected by the parabolic mirror 32, passes through the filter 34, is reflected by the dichroic mirror 35a, passes through time dichroic mirror 35b, and, together with blue light 100B, impinges on the dichroic mirror 35c. Undesired light 100N is removed from the optical system after passing through the dichroic mirror 35c and only blue light 100B is reflected, bending the light path and illuminating the liquid crystal light valve 37B.

Since the reflective band of the dichroic mirror 35c, like that of the blue reflection surface of the dichroic prism 38, is wider for the s-polarized light component than for the p-polarized light component, disposing halfwave plate 41B in front of the dichroic mirror 35c makes it possible to prevent blue light loss at the dichroic mirror 35c. Further, since the blue light and the undesired light are not spectrally adjacent, the undesired light can be satisfactorily removed with ease.

It should be noted that while the above description concerned a case in which undesired light 100N is removed using the blue-reflecting dichroic mirror 35c, this invention is not thus limited, and undesired light 100N may equally be removed using a dichroic filter, disposed in front of the liquid crystal light valve 37B, which selectively passes only the blue light.

It is also possible to incorporate the structure for removing of undesired light in the sixth embodiment, as shown in FIG. 26, into the structure shown in FIG. 27.

In this sixth embodiment, the light of undesired spectrum does not impinge on the color-synthesizing system, making it possible to minimize a return light, thereby decreasing the adverse effect on the operating characteristics of the liquid crystal light valve and realizing a projection display device having good color reproduction.

Seventh Embodiment

Figure 30:
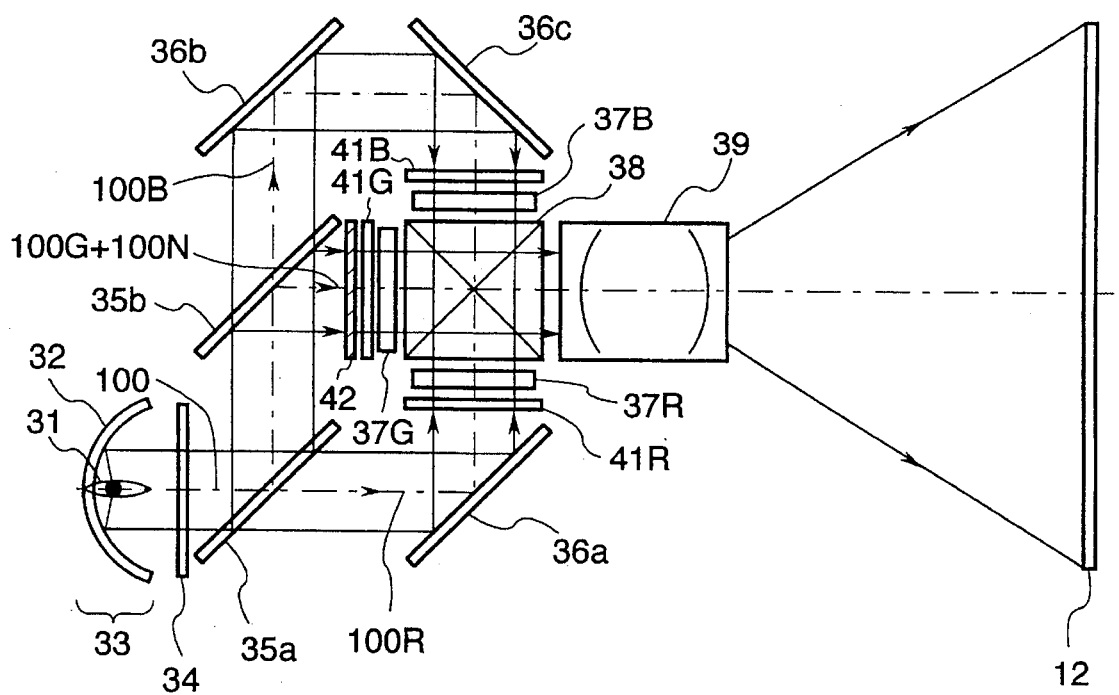
FIG. 30 is a structural diagram showing the optical system of a projection display device in accordance with the seventh embodiment of this invention.
Figure 31:
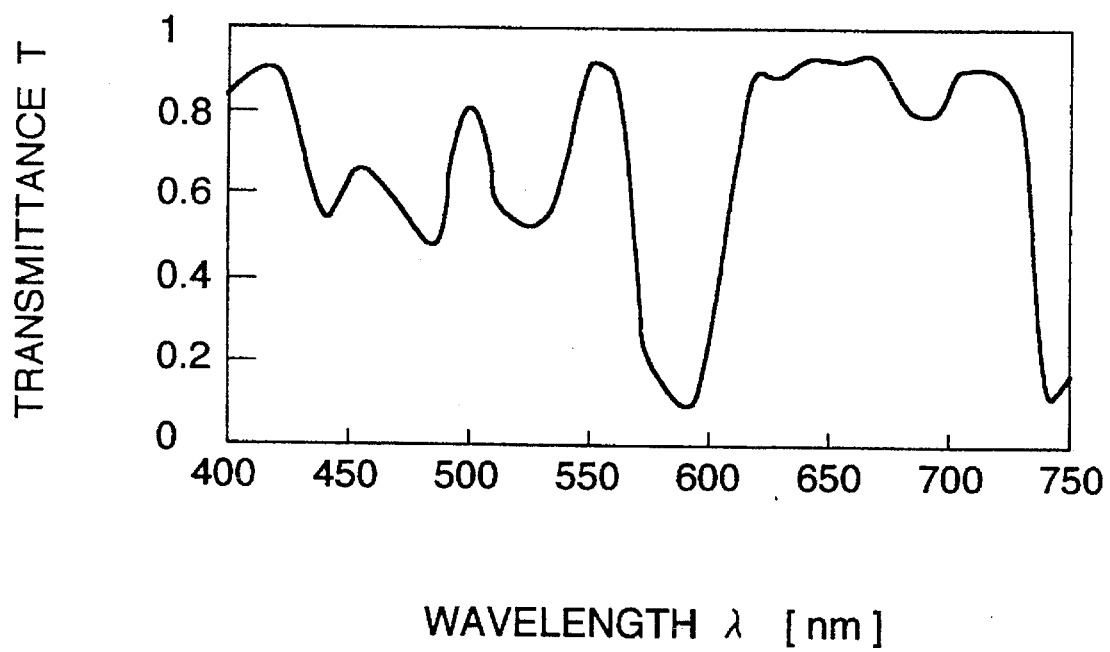
FIG. 31 is a graph showing the spectral transmittance characteristics of neodymium glass.

FIG. 30 shows the optical system of a projection display device in accordance with a seventh embodiment of this invention. As is shown in FIG. 30, the projection display device of the seventh embodiment differs from the device in the fourth embodiment shown in FIG. 20 solely in that it is provided with a neodymium glass 42 (e.g., product number V-10 from HOYA Corporation) disposed in front of the halfwave plate 41G. The neodymium glass 42 has spectral transmittance characteristics shown in FIG. 31, and has the property of selectively absorbing the spectrum in the vicinity of 580 [nm].

The neodymium glass 42 also absorbs other spectral light in the visible region (and particularly in the blue range), in addition to light in the vicinity of 580 [nm], but in this seventh embodiment the neodymium glass 42 is disposed in the path of the green light, so that it has no effect on the projected image and acts as a narrow-band green-transmitting filter that passes light of 535–565 [nm], thereby rendering satisfactory the hue of the green light. Similarly, if the neodymium glass is placed in the path of the red light, a similar effect will be obtained.

In accordance with this seventh embodiment, undesired spectral light from the light source does not impinge on the color-synthesizing system, making it possible to minimize the return light, thereby decreasing the adverse effect on the operating characteristics of the liquid crystal light valve and rendering the hue satisfactory.

It should be noted that if the neodymium glass described above is incorporated into the device of the fifth embodiment, shown in FIG. 27, a similar effect will be obtained.

Eighth Embodiment

Figure 32:
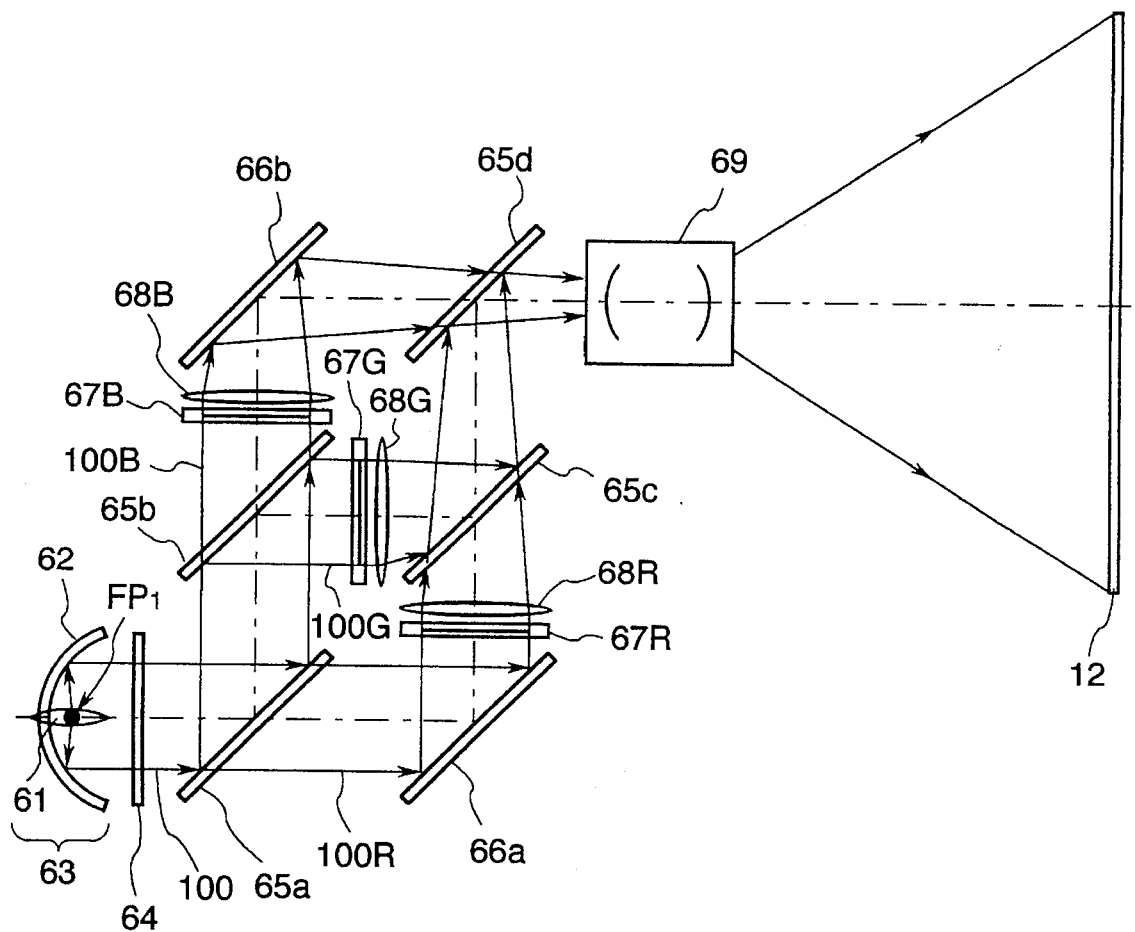
FIG. 32 is a structural diagram showing the optical system of a projection display device in accordance with the eighth embodiment of this invention.

FIG. 32 shows the optical system of a projection display device in accordance with the eighth embodiment of this invention. As is shown in FIG. 32, the projection display device of the eighth embodiment has a light source device 63 including a lamp 61 and a parabolic mirror 62, and a filter 64 such only light emitted from the light source device 63 in the visible range passes through. A white light source such as a metal halide lamp, xenon lamp or halogen lamp is used as the lamp 61, and the metal halide lamp has spectral characteristics such as are shown, for example, in FIG. 21. The lamp 61 is so located that the its center of luminescence is at the position of the first focal point $FP_1$ of the elliptical mirror 62. Again, the reflective surface of the parabolic mirror 62 may, if necessary, be treated with a coating that permits the passage of infrared light (light the wavelength of which is greater than 700 [nm]), reducing the proportion of heat radiated toward the liquid crystal light valve. That portion of the luminous flux emitted by the lamp 31 that is reflected from the parabolic mirror 62 becomes parallel light 100 and is injected into the filter 34.

Further, the projection display device according to the eighth embodiment comprises dichroic mirrors 65a, 65b, 65c and 65d, reflective mirrors 66a and 66b, liquid crystal light valves 67R, 67G and 67B, field lenses 68R, 68G and 68B, and projection lens 69.

Figure 33:
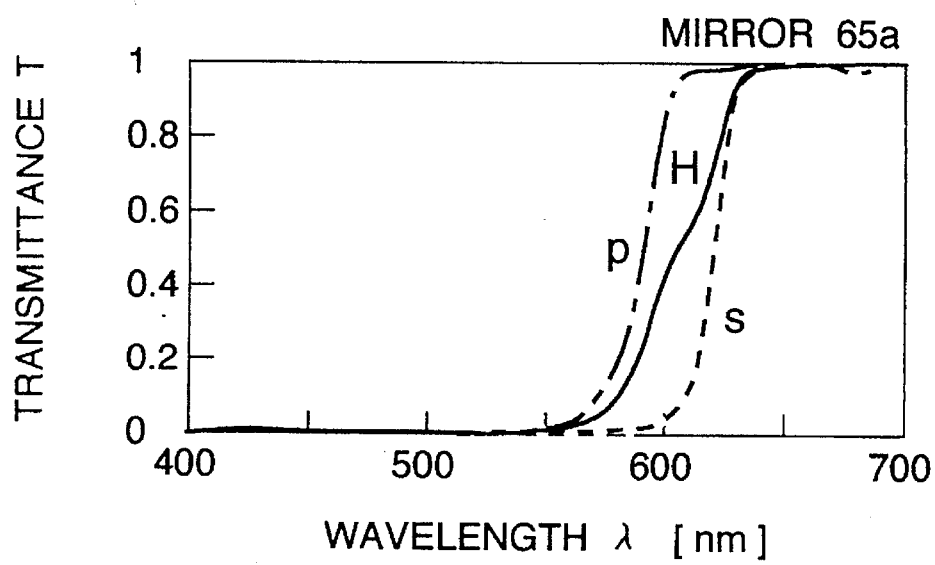
FIG. 33 through FIG. 36 are graphs showing the spectral transmittance characteristics of the dichroic mirrors 65a, 65b, 65c and 65d, respectively.

The dichroic mirror 65a reflects green light 100G and blue light 100B and passes red light 100R, and has spectral transmittance characteristics shown in FIG. 33. The dichroic mirror 65b reflects green light 100G and passes blue light 100B, and has spectral transmittance characteristics shown in FIG. 34. The dichroic mirror 65c reflects green light 100G and passes red light 100R, and has spectral transmittance characteristics shown in FIG. 35. The dichroic mirror 65d reflects red light 100R and green light 100G and passes blue light 100B, and has spectral transmittance characteristics shown in FIG. 36.

In this eighth embodiment, having the structure described above, light 100, which is output from light source device 63 and passes through filter 64, is separated by the dichroic mirror 65a into red light 100R, which passes though, and green light 100G and blue light 100B, which are reflected. The path of red light 100R is bent by the reflecting mirror 66a so that it passes through liquid crystal light valve 67R, field lens 68R and dichroic mirror 65c, is reflected by dichroic mirror 65d and impinges on projection lens 69. Green and blue light 100G and 100B, which were reflected by dichroic mirror 65a, are separated by dichroic mirror 65b into blue light 100B, which passes through, and green light 100G, which is reflected. Green light 100G passes through liquid crystal light valve 67G and field lens 68G, is reflected by dichroic mirrors 65c and 65d and impinges on projection lens 69. Blue light 100B that has passed through the dichroic mirror 65b passes through liquid crystal light valve 67B and field lens 68B, is reflected by the reflecting mirror 66b, and, after passing through the dichroic mirror 65d, impinges on the projection lens 69. The red, green and blue light impinging on projection lens 69 is synthesized, and is magnified and projected onto the screen 12.

In FIG. 32, the color-separation system contributing to the hue of the red projected light is the red-transmitting dichroic mirror 65a, and since, as shown in FIG. 33, the dichroic mirror 65a has a wider transmission band for the p-polarized light component than for the s-polarized light component, red light 100R is partially polarized with the p-polarized light component stronger than the s-polarized light component.

Figure 5:
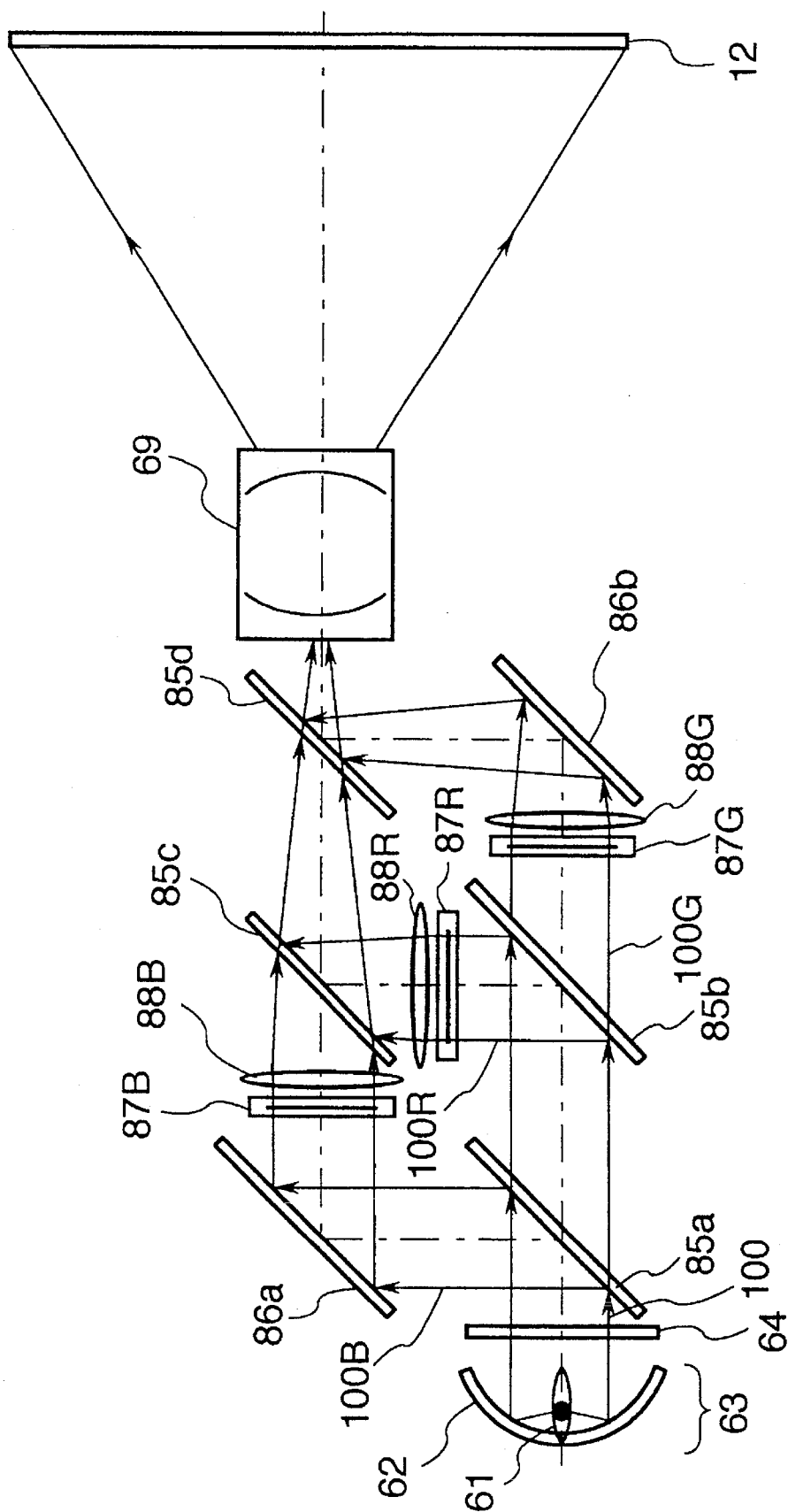
FIG. 5 is a structural diagram showing time optical system of yet another projection display device in accordance with prior art.
Figure 6A:
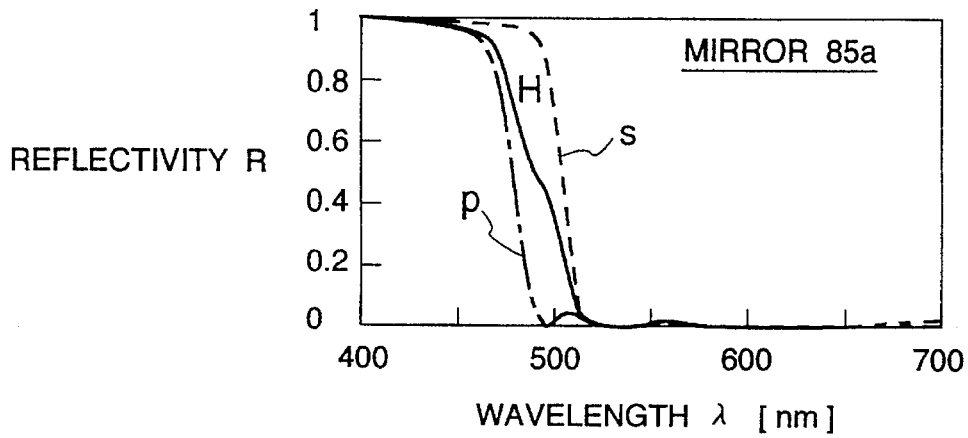
FIG. 6A is a diagram showing the spectral characteristics of the dichroic mirror 85a in the device of FIG. 5.
Figure 6B:
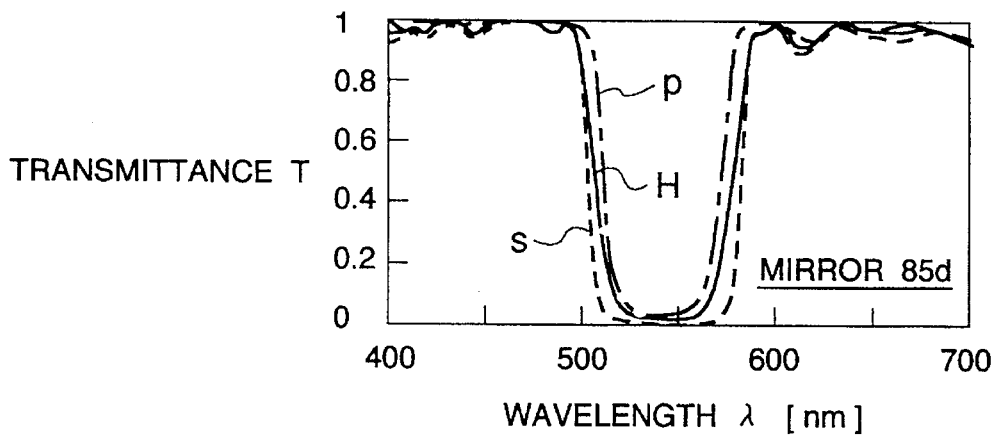
FIG. 6B ia a diagram showing the spectral characteristics of the dichroic mirror 85d in the device of FIG. 5.
Figure 6C:
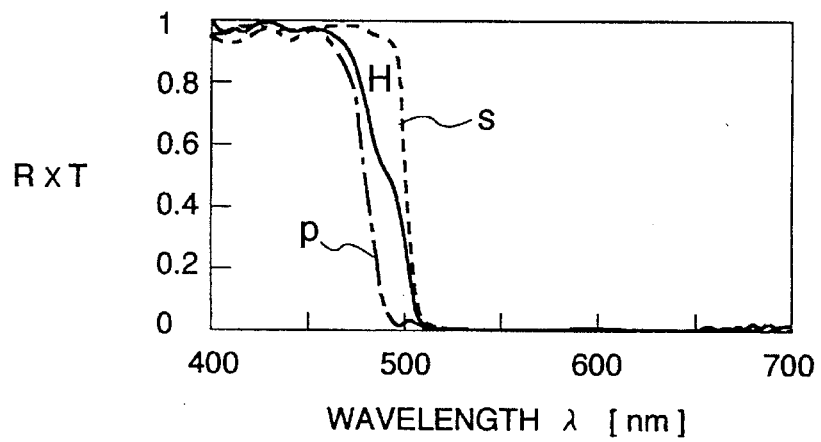
FIG. 6C is a diagram showing the integrated spectral characteristics of the dichroic mirrors 85a and 85d in the device of FIG. 5.
Figure 7:
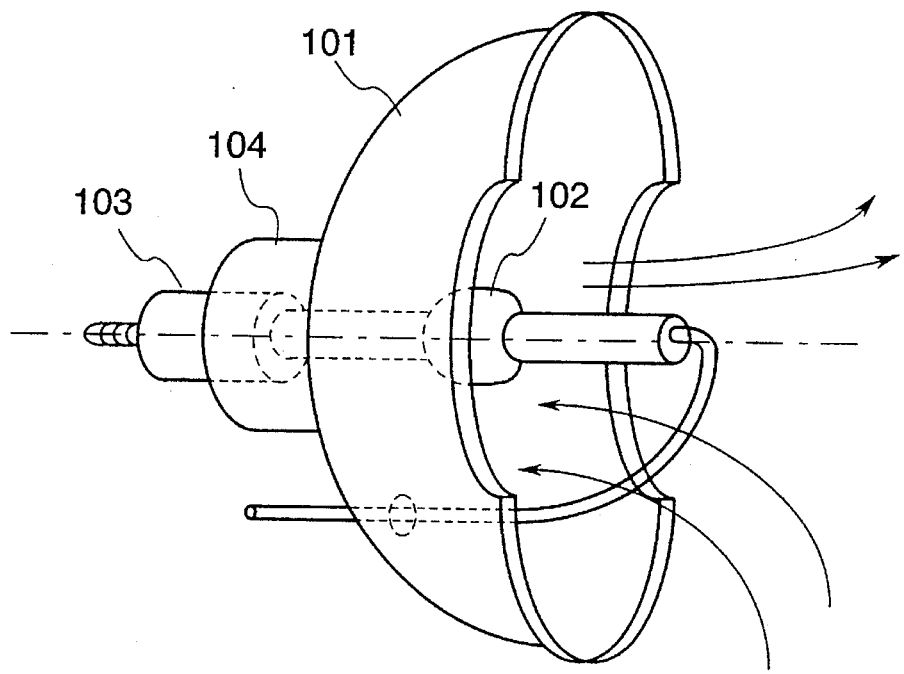
FIG. 7 is a perspective view showing a light source device in accordance with prior art.
Figure 8:
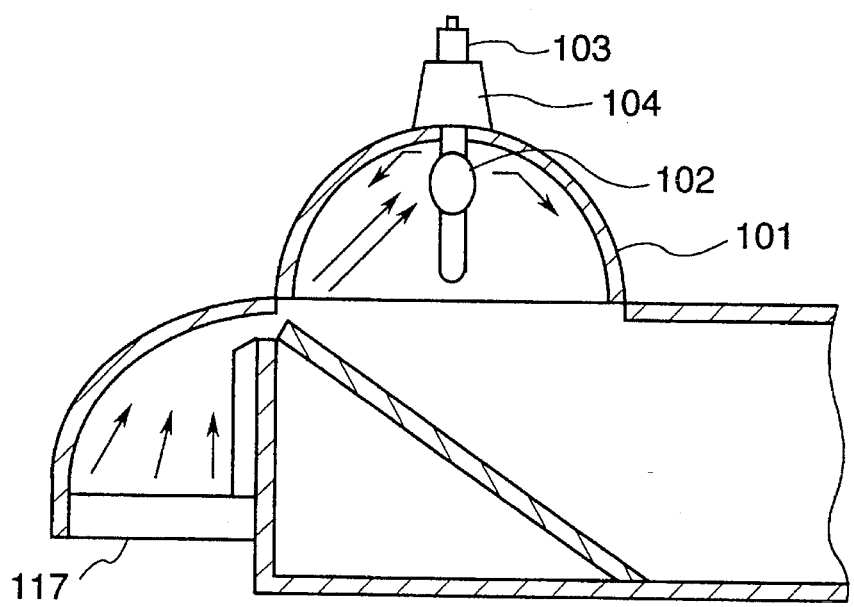
FIG. 8 is a cross-sectional view showing another light source device in accordance with prior art.
Figure 35:
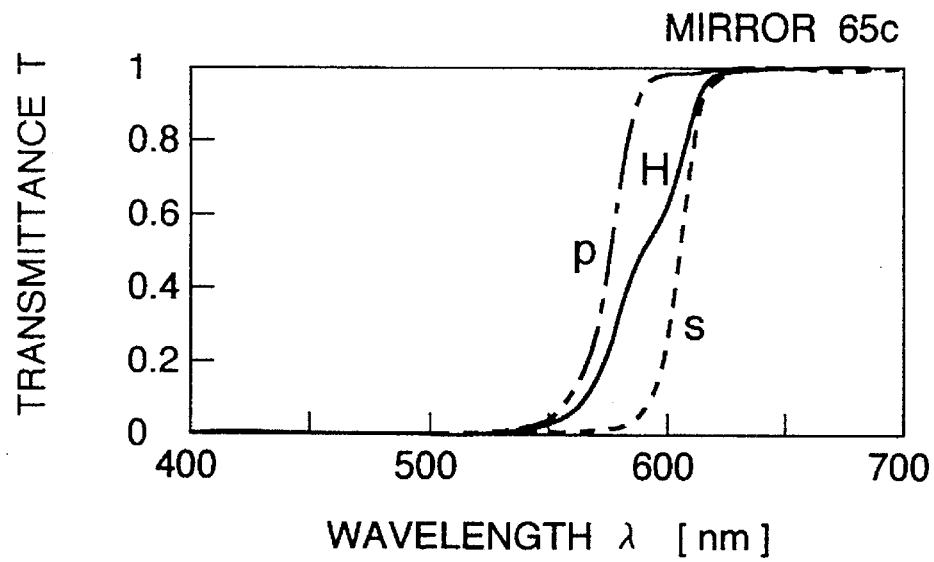

Again, the color-synthesizing system contributing to the hue of the red projected light is the red-transmitting dichroic mirror 65c, and, as shown in FIG. 35, this dichroic mirror 65c has a wider transmission band for the p-polarized light component than for the s-polarized light component. Accordingly, the red light is emitted from projection lens 69 as a projected light with a weak s-polarized light component and a strong p-polarized light component. Thus, in comparison with the example of prior art shown in FIG. 5, both the s-polarized and the p-polarized light components of the red light 100R can effectively pass through the dichroic mirror 65c, so a stronger red illumination can be obtained.

Figure 34:
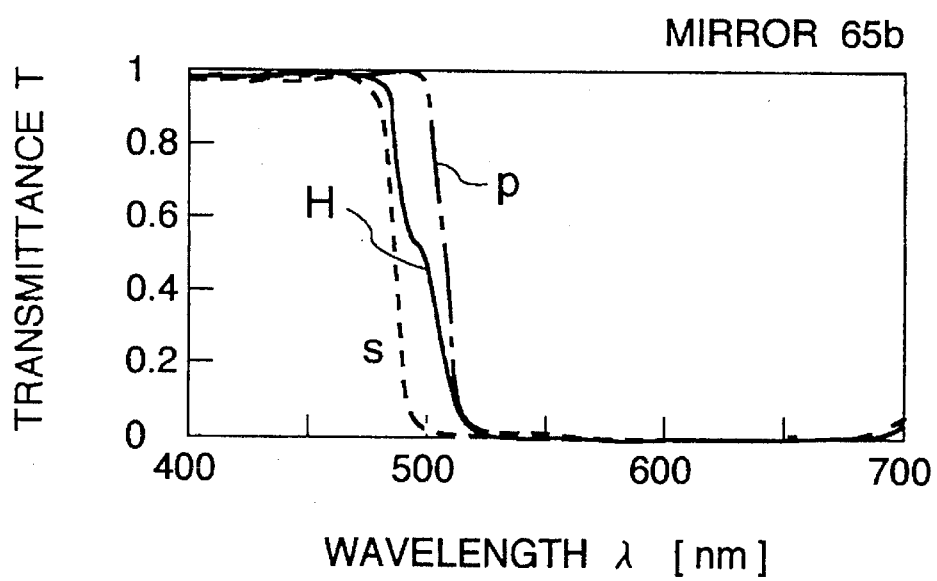
Figure 36:
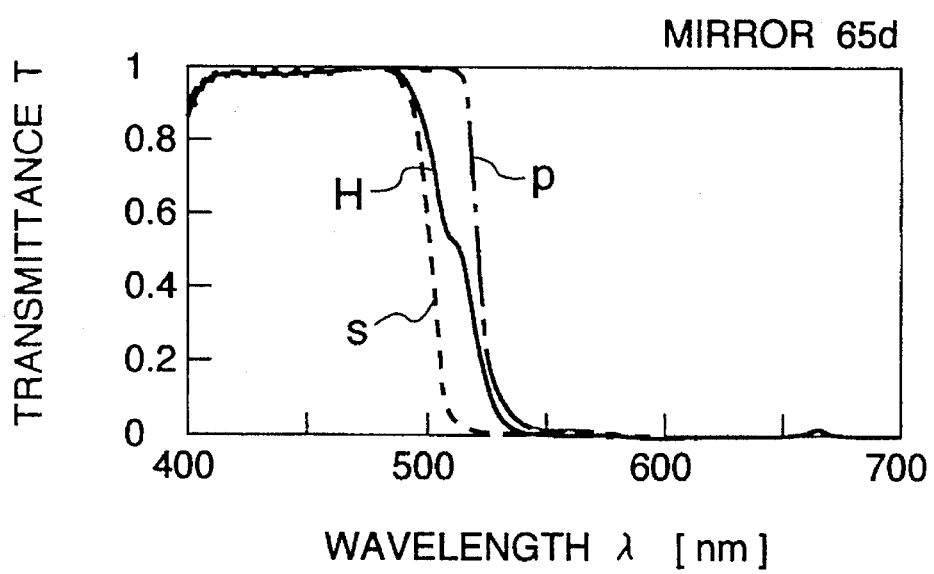

The color-separation system contributing to the hue of the green projected light in FIG. 32 is, for longer wavelengths, the green-reflecting dichroic mirror 65a, and for shorter wavelengths, the green-reflecting dichroic mirror 65b. Since, as shown in FIG. 33 and FIG. 34 respectively, the dichroic mirrors 65a and 65b have a wider transmission band for the p-polarized light component than for the s-polarized light component, the reflection band is wider for the s-polarized light component than for the p-polarized light component, so that green light 100G is partially polarized with the s-polarized light component stronger than the p-polarized light component. Again, the color-synthesizing system contributing to the hue of the green projected light is for longer wavelengths, green-reflecting dichroic mirror 65c, and, for shorter wavelengths, is green-reflecting dichroic mirror 65d. As is shown in FIG. 35, the dichroic mirror 65c has wider spectral transmission band for the p-polarized light component than for the s-polarized light component, so that the reflection band is rays wider for the s-polarized light component than for the p-polarized light component. Again, as shown in FIG. 36, the green-reflecting dichroic mirror 65d has wider spectral transmission band for the p-polarized light component than for the s-polarized light component, so that the reflection band is wider for the s-polarized light component than for the p-polarized light component. Accordingly, the green light is emitted from the projection lens 69 with a strong s-polarized light component and a weak p-polarized light component. Thus, in comparison with the example from prior art shown in FIG. 5, both the s-polarized and the p-polarized light components of the green light 100G can be effectively reflected by the dichroic mirrors 65c and 65d, so a stronger green illumination can be obtained.

The color-separation system contributing to the hue of the blue projected light in FIG. 32 is the blue-transmitting dichroic mirror 65b, and since, as shown in FIG. 34, this dichroic mirror 65b has a wider transmission band for the p-polarized light component than for the s-polarized light component, the reflection band is wider for the s-polarized light component than for the p-polarized light component, so that blue light 100B is partially polarized with the p-polarized light component stronger than the s-polarized light component. Again, the color-synthesizing system contributing to the hue of the blue projected light is the blue-transmitting dichroic mirror 65d, and as shown in FIG. 36, this dichroic mirror 65d has wider spectral transmission band for the p-polarized light component than for the s-polarized light component. Accordingly, the blue light is emitted from projection lens 69 with a weak s-polarized light component and a strong p-polarized light component. Thus, in comparison with the example of prior art shown in FIG. 5, both the s-polarized and the p-polarized light components of the blue light 100B can effectively pass through the dichroic mirror 65d, so a stronger blue illumination can be obtained.

As has been explained above, the configuration is such that in the light paths of the red, green and blue illuminating systems, the light either passes through both a color-separation dichroic mirror and a color-synthesizing dichroic mirror that contribute to the hue of each of the primary colors, or is reflected by both a color-separation dichroic mirror and a color-synthesizing dichroic mirror that contribute to the hue of each of the primary colors, so that the magnitude relationship between the p-polarization and the s-polarization of the color-separation dichroic mirror that contributes to the hue of each of the primary colors can be made identical with the magnitude relationship between the p-polarization and the s-polarization of the color-synthesizing dichroic mirror. Thus, in comparison with the example from prior art shown in FIG. 5, the red, green and blue light components can effectively impinge the projection lens 69, an image of higher brightness can be displayed on the screen 12.

Ninth Embodiment

Figure 37:
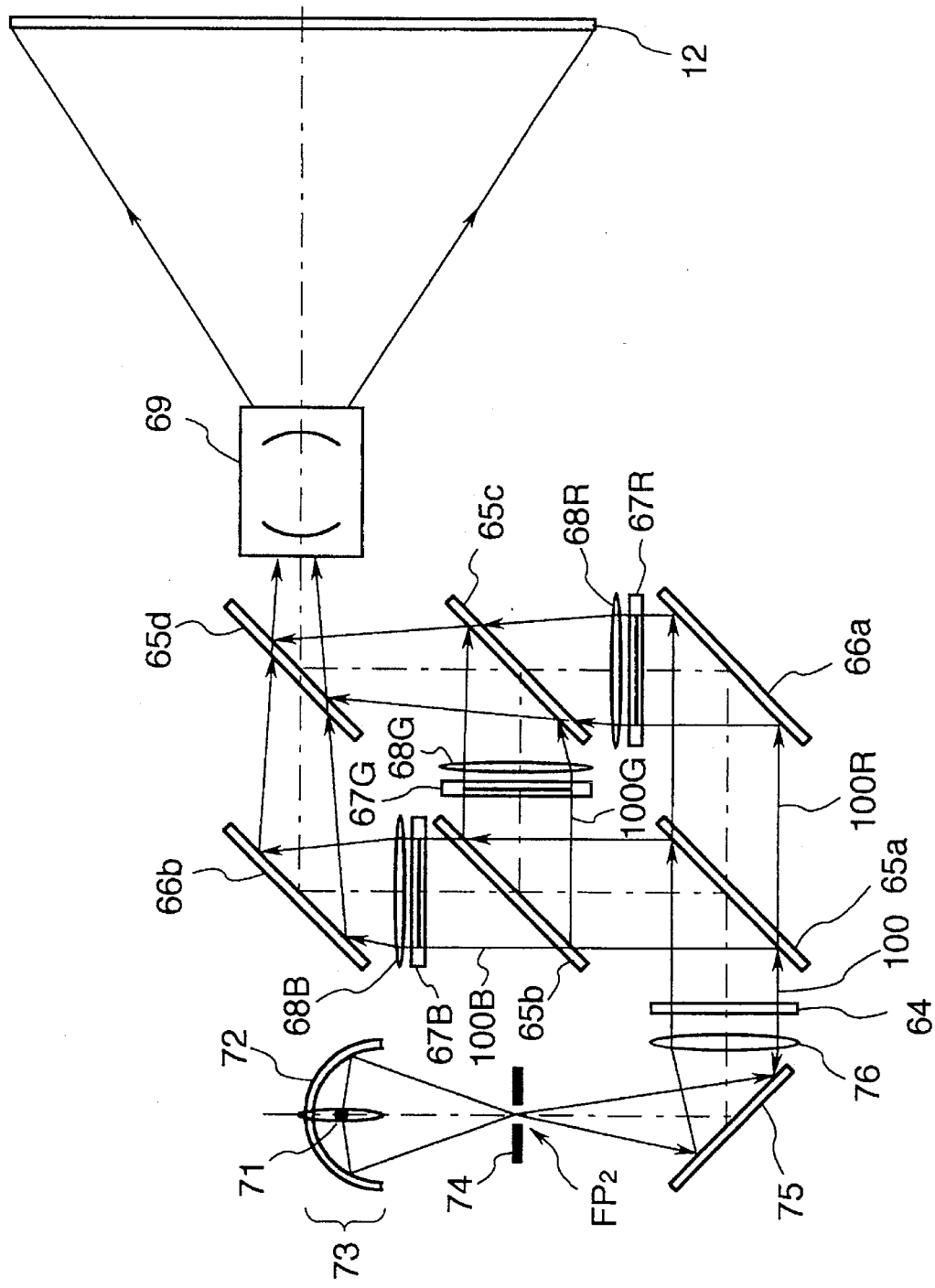
FIG. 37 is a structural diagram showing the optical system of a projection display device in accordance with the ninth embodiment of this invention.

FIG. 37 shows the optical system of a projection display device in accordance with a ninth embodiment of this invention. As is shown in FIG. 37, the projection display device of the ninth embodiment differs from the device in the eighth embodiment solely in that, in place of light source device 63, it is provided with a light source device 73 comprising a lamp 71 and elliptical mirror 72, an illuminating system diaphragm 74, a reflective mirror 75 and a collimation lens 76. The elliptical mirror 72 has a first focal point positioned in the vicinity of the central point of luminescence of the lamp 71, so that the portion of the light emitted by the lamp 71 that is reflected by the elliptical mirror 72 is focused at the second focal point $fp_2$ of the elliptical mirror 72 to form a secondary light source. If a xenon lamp or similar light source that is substantially dot-shaped luminescent is used as the lamp 71, it is possible to obtain an extremely small focal spot at the second focal point $FP_2$ of the elliptical mirror 72, but if a metal halide lamp or similar light source that is substantially line-luminescent is used, the diameter of the focal spot obtained will be larger, with the result that focal spot diameter is limited by the positioning of the diaphragm 74. The collimation lens 76 having a focal length $f_1$ is so disposed that it is separated along the light path from secondary focal point $FP_2$ of the elliptical mirror 52 by a distance that is substantially equal to the focal length $f_1$, so that the light diverged from the vicinity of the second focal point $FP_2$ and reflected by the mirror 75 will be substantially parallel. In all respects other than those described above, it is identical to the device of the eighth embodiment.

Note that the reflective mirror 75 may be a cold mirror that transmits infrared light (light with a wavelength of 700 [nm] or longer), in which case the heating of the liquid crystal light valve is prevented.

It is further possible in the ninth embodiment, by providing the same relationship between aperture diameter $D_a$ of the illuminating system diaphragm 74 and the diameter of entrance pupil $D_b$ of the projection lens 69 that is shown in Equations (7) and (8), as has already been described for the first embodiment shown in FIG. 9, a projected image of high brightness and contrast can be obtained.

Tenth Embodiment

Figure 38:
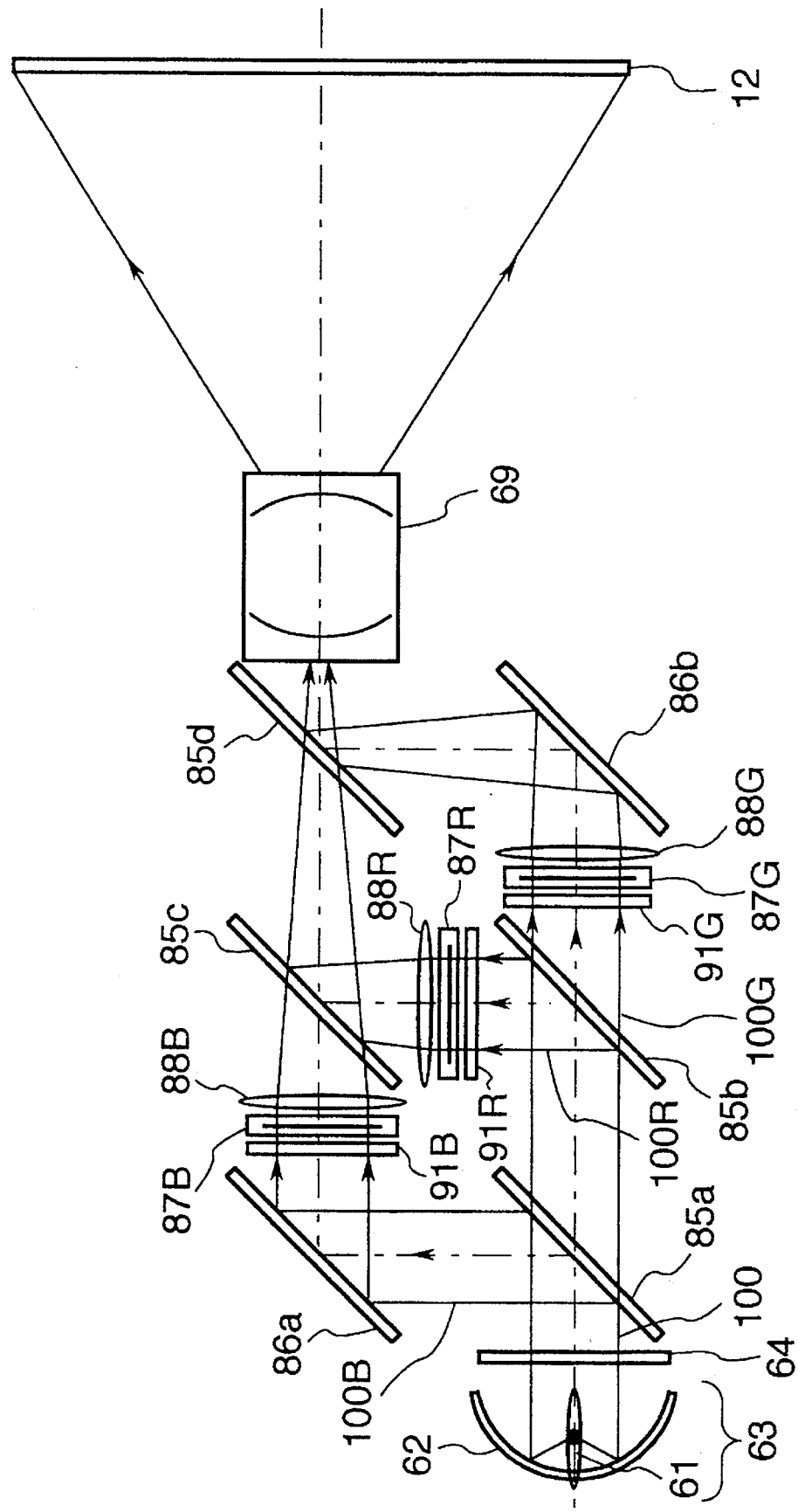
FIG. 38 is a structural diagram showing the optical system of a projection display device in accordance with the tenth embodiment of tills invention.

FIG. 38 shows the optical system of a projection display device in accordance with a tenth embodiment of this invention. As is shown in FIG. 38, the projection display device according to the tenth embodiment comprises, as in the device shown in FIG. 32, has a light source device 63 including a lamp 61 and a parabolic mirror 62, and a filter 64 through which only the illuminating light emitted from light source device 63 in the visible range passes. The projection display device of the tenth embodiment also comprises dichroic mirrors 85a, 85b, 85c and 85d, reflective mirrors 86a and 86b, halfwave plates 91R, 91G and 91B, liquid crystal light valves 87R, 87G and 87B, field lenses 88R, 88G and 88B, and projection lens 69.

The relationships between optic axis 42 of the halfwave plate 91R and the incident light and between the injection light and the emission light of the halfwave plate 91R are the same as that shown in FIG. 22. Taking the angle formed by the plane of vibration of arbitrary polarized light (when natural light is injected into the halfwave plate) with the optic axis 42 of the halfwave plate as α, the emission light will be polarized with the plane of vibration at an angle of 2 α with the respect to the plane of vibration of the arbitrary polarized light of the incident light. In this tenth embodiment, by setting the angles α formed by the planes of vibration of both s-polarized light and p-polarized light with the optic axis 42 of the halfwave plate to 45°, angle 2 α was made to be 90°. Thus, the s-polarized light component of the incident light, by passing through the halfwave plate 91R, is emitted as light having the plane of vibration of p-polarized light, and in the same way, the p-polarized light component is emitted as light having the plane of vibration of s-polarized light. Halfwave plates 91G and 91B have analogous functions.

Figure 39:
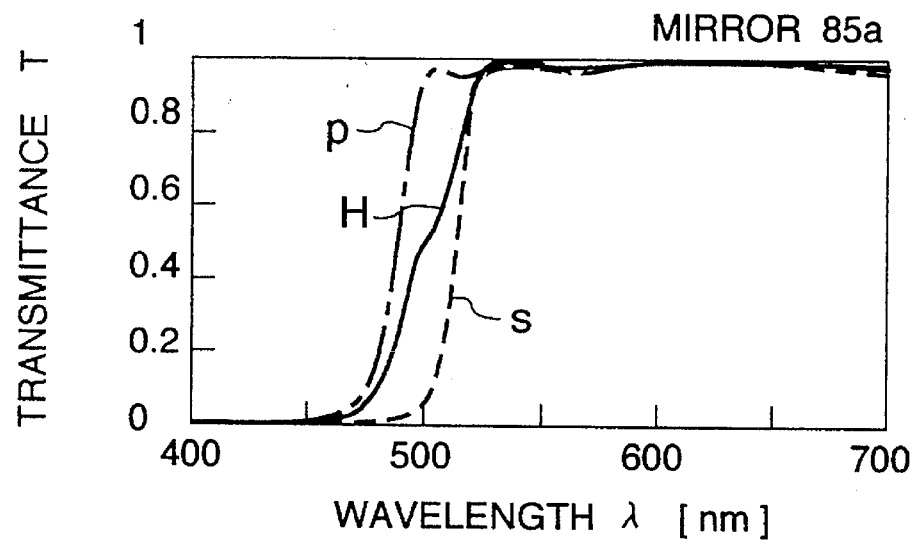
FIG. 39 through FIG. 42 are graphs showing the spectral transmittance characteristics of the dichroic mirrors 85a, 85b, 85c and 85d, respectively.

The dichroic mirror 85a reflects blue light 100B and passes red light 100R and green light 100G, and has spectral transmittance characteristics shown in FIG. 39. The dichroic mirror 85b reflects red light 100R and passes green light 100G, and has spectral transmittance characteristics shown in FIG. 40. The dichroic mirror 85c reflects red light 100R and passes blue light 100B, and has spectral transmittance characteristics shown in FIG. 41. The dichroic mirror 85d reflects green light 100G and passes blue light 100B and red light 100R, and has spectral transmittance characteristics shown in FIG. 42.

In this tenth embodiment, having the structure described above, light 100, which is output from the light source device 63 and passes through the filter 64, is separated by the dichroic mirror 85a into the red light and green light 100R and 100G, which pass though, and blue light 100B, which is reflected. The path of blue light 100B is bent by the reflecting mirror 86a so that it passes through the halfwave plate 91B, the liquid crystal light valve 87B, the field lens 88B and the dichroic mirrors 85c and 85d, and impinges on the projection lens 69. Red and green light 100R and 100G, which passed through the dichroic mirror 65a, are separated by the dichroic mirror 85b into green light 100G, which passes through, and red light 100R, which is reflected. Red light 100R passes through the halfwave plate 91R, the liquid crystal light valve 87R and the field lens 88R, is reflected by the dichroic mirror 85c, passes through the dichroic mirror 85d and impinges on the projection lens 69. Green light 100G, which has passed through the dichroic mirror 85b, passes through the halfwave plate 91G, the liquid crystal light valve 87G and field lens 88G, is reflected by the reflecting mirror 86b, and, after being reflected by the dichroic mirror 85d, impinges on the projection lens 69. The red, green and blue light impinging on the projection lens 69 is synthesized, and is magnified and projected onto the screen 12.

Figure 42:
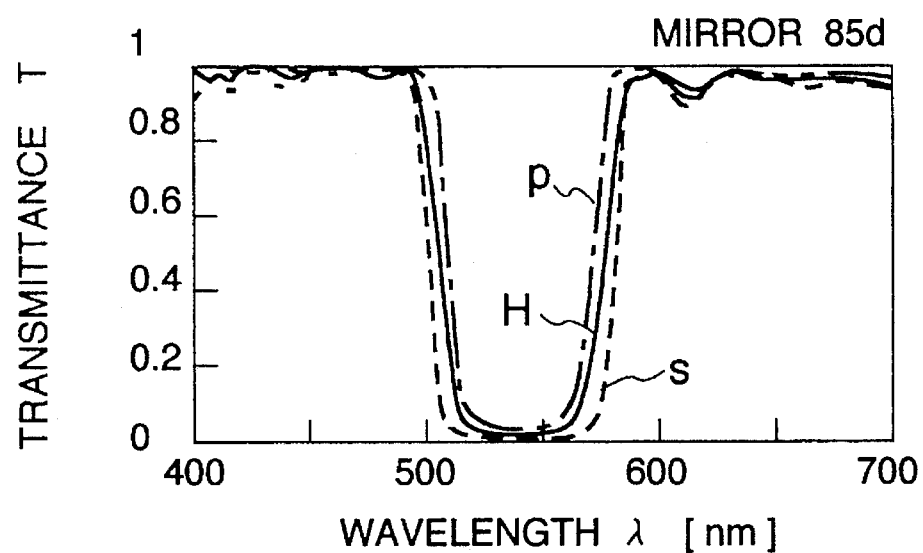

In FIG. 38, the color-separation system contributing to the hue of the blue projected light is the blue-reflecting dichroic mirror 85a, and since, as shown in FIG. 39, the dichroic mirror 85a has a wider transmission band for the p-polarized light component than for the s-polarized light component, the reflection band is wider for the s-polarized light component than for the p-polarized light component, and blue light 100B is partially polarized with the s-polarized light component stronger than the p-polarized light component. By passing through the halfwave plate 91B, this blue light is partially polarized with the p-polarized light component stronger than the s-polarized light component. Again, the color-synthesizing system contributing to the hue of the blue projected light is the red-transmitting dichroic mirror 85d, and, as shown in FIG. 42, this dichroic mirror 85d has a wider transmission band for the p-polarized light component than for the s-polarized light component.

Accordingly, the blue light is emitted from the projection lens 69 with a strong p-polarized light component and a weak s-polarized light component. Thus, in comparison with the example of prior art shown in FIG. 5, both the s-polarized and the p-polarized light components of the blue light 100B can effectively pass through the dichroic mirror 85d, so a stronger blue illumination earl be obtained.

Figure 40:
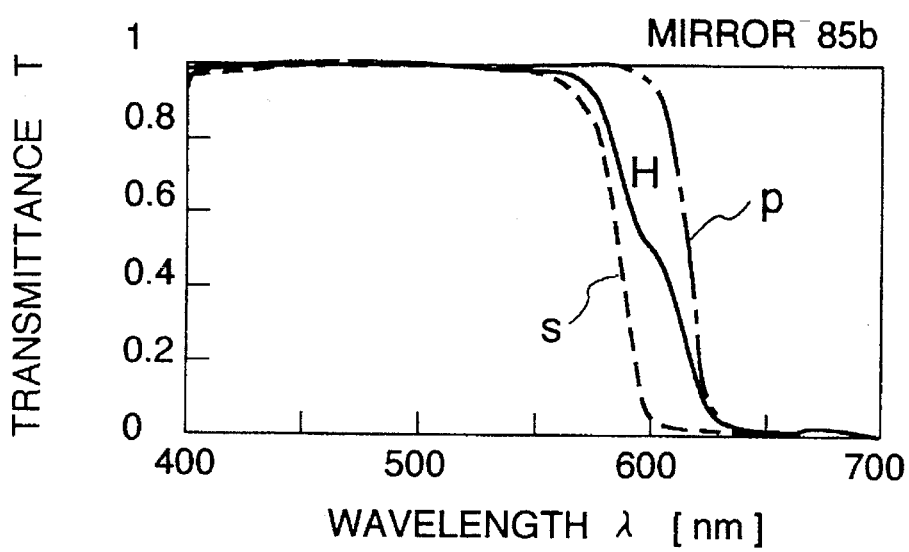
Figure 41:
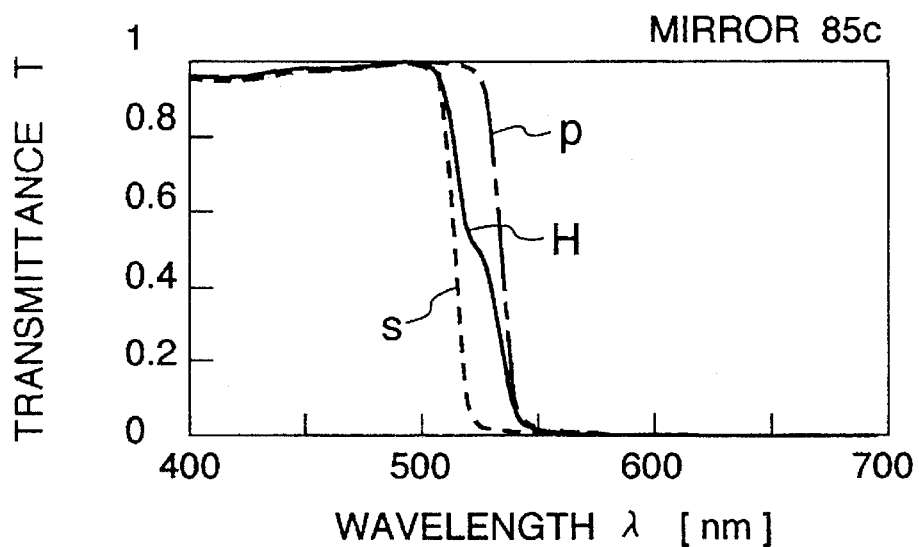

The color-separation system contributing to the hue of the red projected light in FIG. 38 is red-reflecting dichroic mirror 85b, and since, as shown in FIG. 40, this dichroic mirror 85b has a wider transmission band for the p-polarized light component than for the s-polarized light component, the reflection band is wider for the s-polarized light component than for the p-polarized light component, so that red light 100R is partially polarized with the p-polarized light component stronger than the s-polarized light component. By passing through the halfwave plate 91R, this red light is partially polarized with the p-polarized light component stronger than the s-polarized light component. Again, the color-synthesizing system contributing to the hue of the red projected light is red-transmitting dichroic mirror 85d, and as shown in FIG. 42, this dichroic mirror 85d has wider spectral transmission band for the p-polarized light component than for the s-polarized light component. Accordingly, in the structure shown in FIG. 38, the red light is emitted from projection lens 69 with a strong p-polarized light component and a weak s-polarized light component. Thus, in comparison with the example of prior art shown in FIG. 5, both the s-polarized and the p-polarized light components of the red light 100R can effectively pass through the dichroic mirror 85d, so a stronger red illumination can be obtained.

The color-separation system contributing to the hue of the green projected light in FIG. 38 is, for shorter wavelengths, the green-transmitting dichroic mirror 85a, and for longer wavelengths, the green-transmitting dichroic mirror 85b. Since, as shown in FIG. 39 and FIG. 40 respectively, the dichroic mirrors 85a and 85b have a wider transmission band for the p-polarized light component than for the s-polarized light component, green light 100G is partially polarized with the p-polarized light component stronger than the s-polarized light component. By passing through the halfwave plate 91G, this green light is partially polarized with s-polarized light component stronger than the p-polarized light component. Again, the color-synthesizing system contributing to the hue of the green projected light is the green-transmitting dichroic mirror 85d, and as shown in FIG. 42, this dichroic mirror 85d has a wider spectral transmission band for the p-polarized light component than for the s-polarized light component, so that the reflection band is wider for the s-polarized light component than for the p-polarized light component. Accordingly, in the structure shown in FIG. 38, the green light is emitted from projection lens 69 with a strong s-polarized light component and a weak p-polarized light component. Thus, in comparison with the example of prior art shown in FIG. 5, both the s-polarized and the p-polarized light components of the green light 100G can be effectively reflected by the dichroic mirror 85d, so a stronger green illumination can be obtained.

As has been explained above, the configuration is such that in the light paths of the red, green and blue illuminating systems, the light either passes through both a color-separation dichroic mirror and a color-synthesizing dichroic mirror that contribute to the hue off each of the primary colors, or is reflected by both a color-separation dichroic mirror and a color-synthesizing dichroic mirror that contribute to the hue of each of the primary colors. Therefore, the magnitude relationship between the p-polarization and the s-polarization of the color-separation dichroic mirror that contributes to the hue of each of the primary colors can be made identical with the magnitude relationship between the p-polarization and the s-polarization of the color-synthesizing dichroic mirror. Accordingly, in comparison with the example from prior art shown in FIG. 5, an image of higher brightness can be displayed.

Eleventh Embodiment

Figure 43:
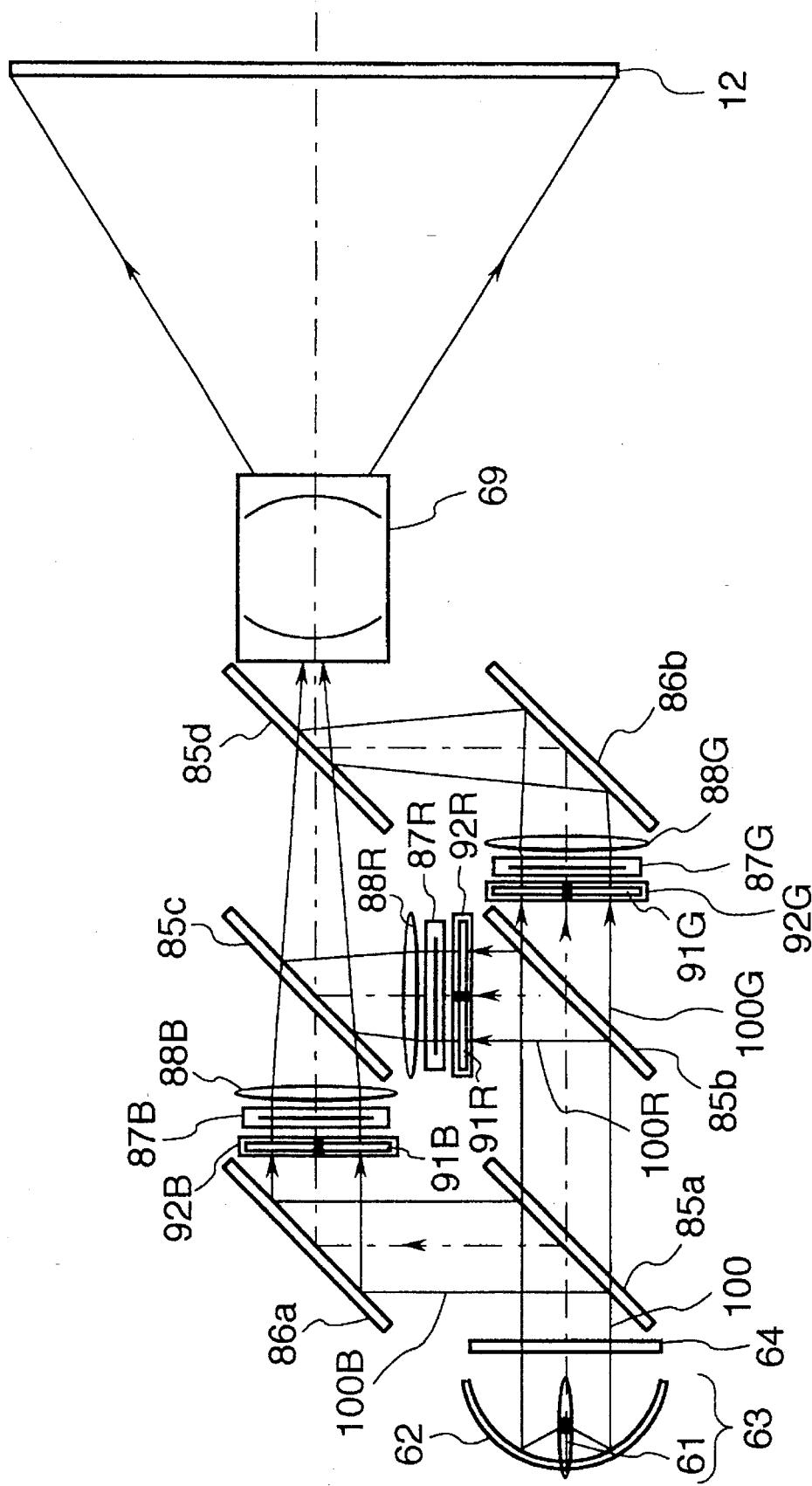
FIG. 43 is a structural diagram showing the optical system of a projection display device in accordance with the eleventh embodiment of this invention.

FIG. 43 shows the optical system of a projection display device in accordance with all eleventh embodiment of this invention. The projection display device of the eleventh embodiment differs from the device in the tenth embodiment shown in FIG. 38 solely in that it is provided with rotation mechanisms 92R, 92G and 92B, which effect the revolution of the halfwave plates 91R, 91G and 91B. The rotation mechanisms 92R, 92G and 92B have the function of effecting the revolution of the halfwave plates 91R, 91G and 91B, respectively, around the optical axis AX.

Figure 44:
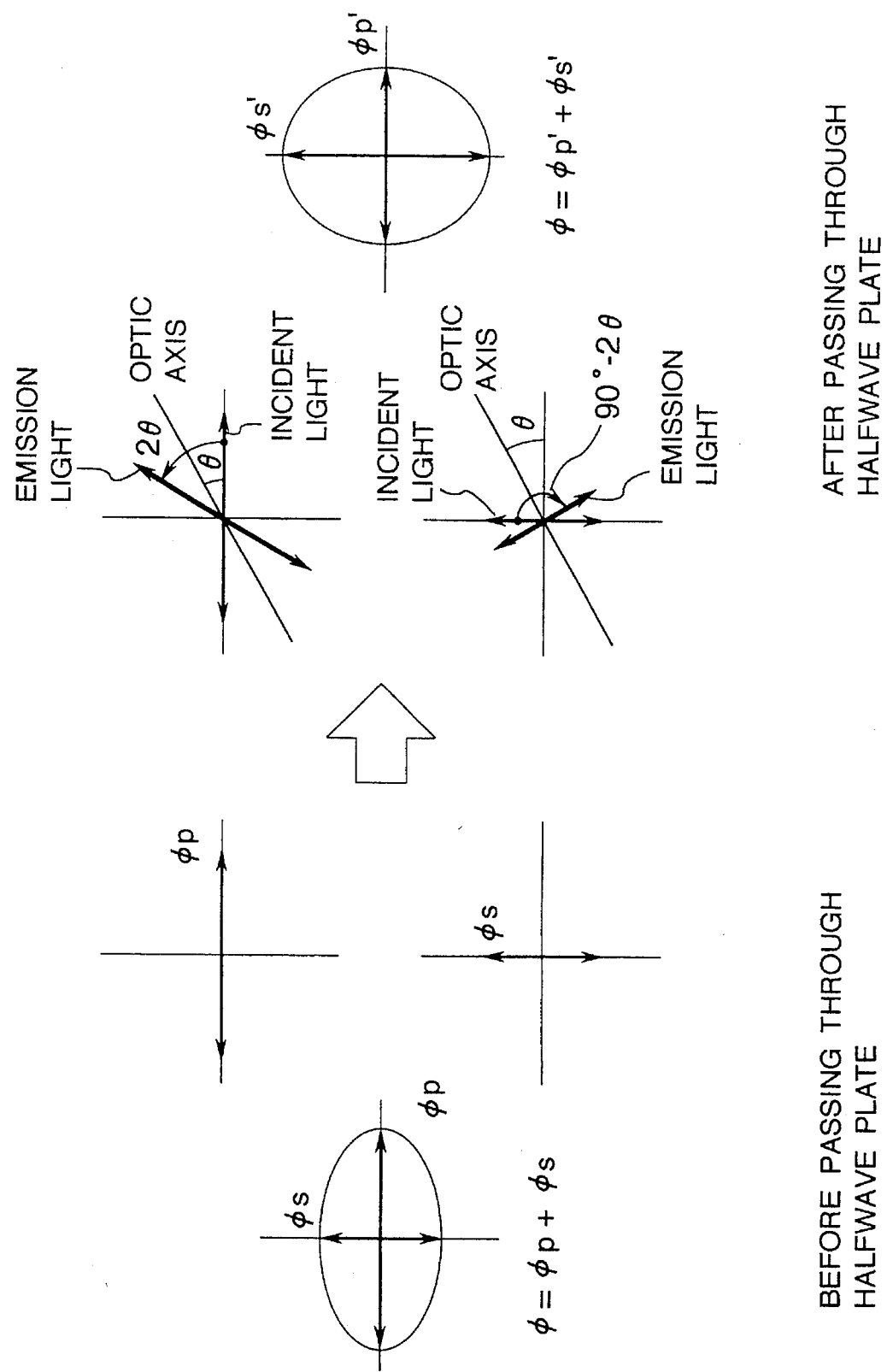
FIG. 44 through FIG. 46 are explanatory diagrams showing the function of the halfwave plate in FIG. 43.

If the halfwave plate is positioned so that the angle α formed by the p-polarized light and the s-polarized light with the optic axis 42 (shown in FIG. 22) is 45°, and light is caused to pass passing through the halfwave plate, the s-polarized light will be p-polarized, and the p-polarized light will be s-polarized. Further, no phase difference occurs when the angle α formed by the s-polarized light with the optical axis AX is 0°, that is to say, is coincident, so that even when the light passes through the halfwave plate, it does not function as a phase-shifting plate. If it is assumed that the angle α formed by the p-polarized light with the optical axis AX is φ, the p-polarized light component φ$_p$ and the s-polarized light component φ$_s$ of the incident light will, as shown in FIG. 44, become the p-polarized light component φ$_p$' and the s-polarized light component φ$_s$ of the synthesized light.

Figure 45:
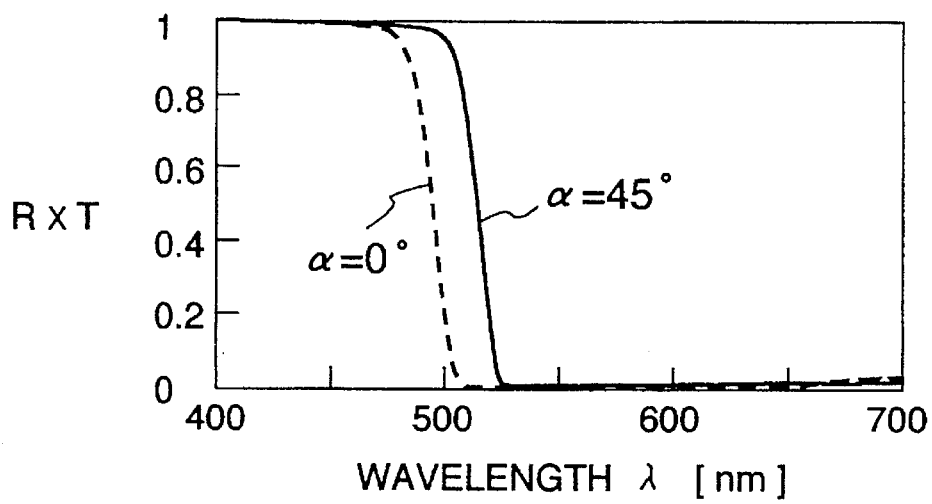
Figure 46:
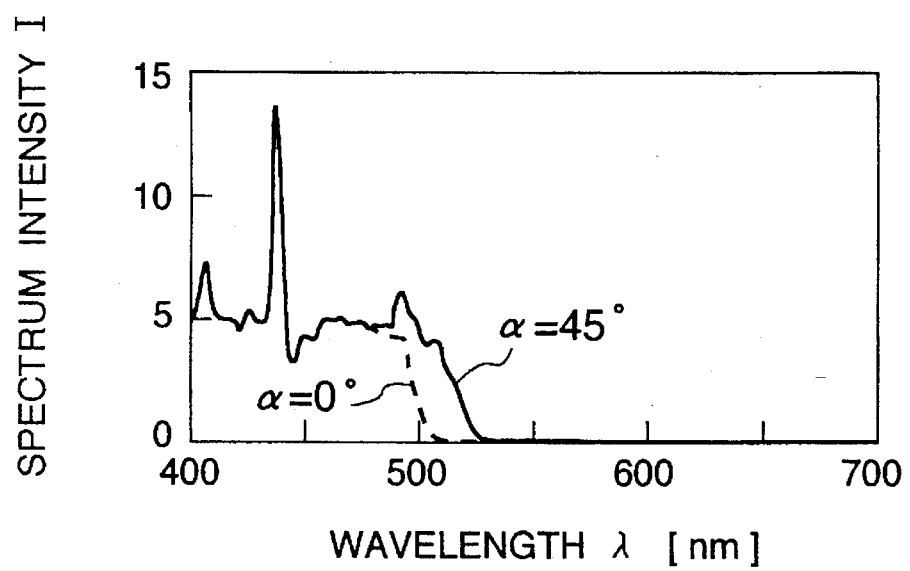

When the halfwave plate 91B is turned 45° (i.e., ⅛ turn), the integrated spectral characteristics obtained from the reflective characteristics of the dichroic mirror 85a and the transmittance characteristics of the dichroic mirror 85d will be as shown in FIG. 45, and the spectrum of the blue light will be as shown in FIG. 46. As the angle α increases from 0° (α≦45°), the wavelength band used widens toward the long-wavelength side and the spectral band becomes wider, and it will be understood that the hue of the blue light becomes paler.

By thus providing for the revolution of the halfwave plate around the optical axis AX, the polarization characteristics of the p-and s-polarized light components passing through the halfwave plate are changed, changing the luminous flux ratios of the red, green and blue homogeneous projected light and enabling white balance to be adjusted with ease.

Twelfth Embodiment

Figure 47:
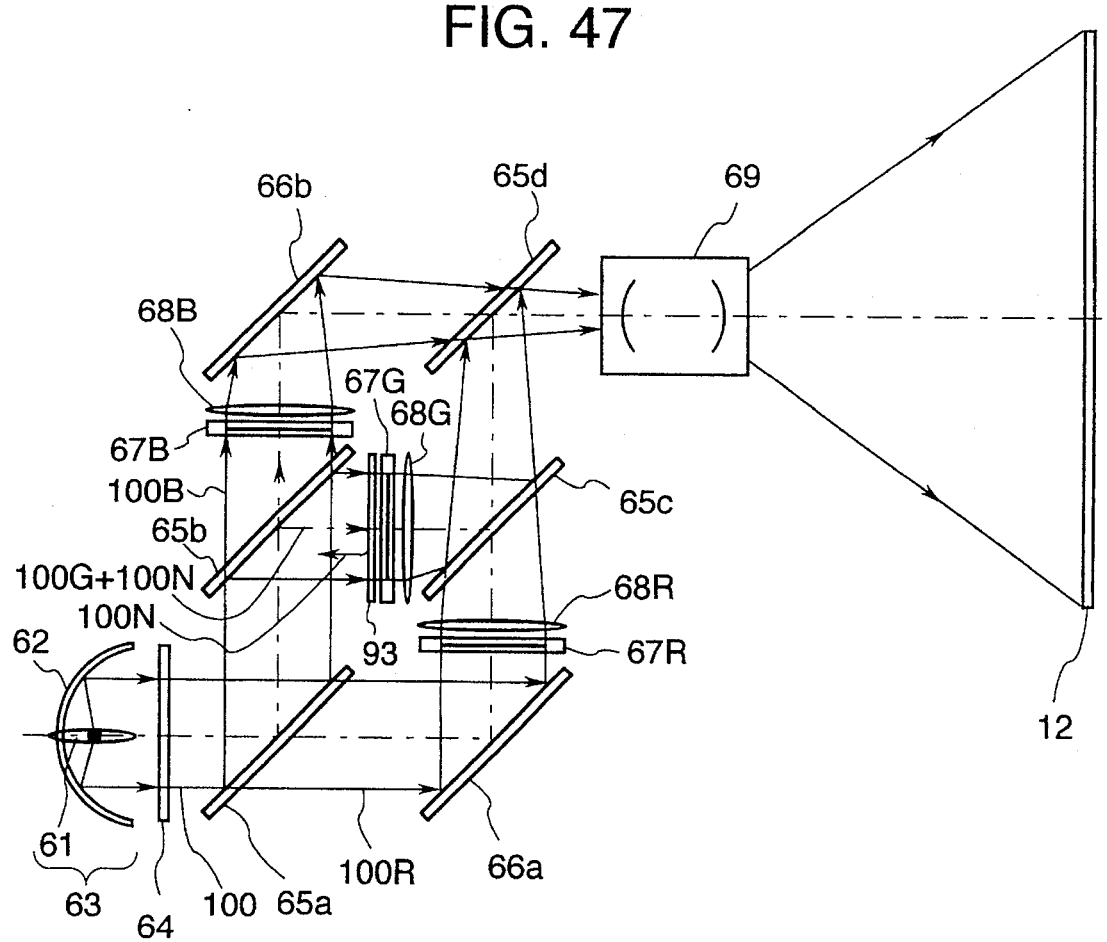
FIG. 47 is a structural diagram showing the optical system of a projection display device in accordance with the twelfth embodiment of this invention.
Figure 48:
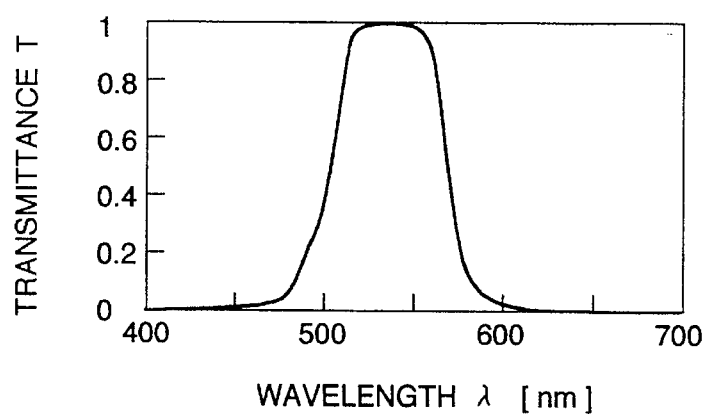
FIG. 48 is a graph showing the characteristics of the filter 93 in FIG. 47.

FIG. 47 shows the optical system of a projection display device in accordance with a twelfth embodiment of this invention. As is shown in FIG. 47, the projection display device of the twelfth embodiment differs from the device in the eighth embodiment shown in FIG. 32 solely in that it is provided, before the green-light liquid crystal light valve 67G with a dichroic filter 93 having the polarization transmittance characteristics shown in FIG. 48.

The spectrum of the light emitted from the metal halide lamp 61 has, as shown in FIG. 21, a strong peak in the vicinity of 580 [nm], but its inclusion in red or green homogeneous light results, respectively, in all orangish red light or a yellow-greenish green light. Thus the strong peak in the vicinity of 580 [nm] is an undesired spectral component, or undesired light, with regard to assuring satisfactory hue for each of the red, green and blue homogeneous light, that is to say, with regard to broadening the reproduction range of the projected light.

In this twelfth embodiment, that portion of the light emitted by the metal halide lamp 61 that is reflected by the parabolic mirror 62 becomes substantially parallel light 100 and impinges on the filter 64. The filter 64 allows the passage of visible light only, and reflects or absorbs undesired infrared or ultraviolet light.

After passing through the filter 64, illuminating light 100 impinges on the dichroic mirror 65a. The dichroic mirror 65a reflects green light 100G, blue light 100B and undesired light 100N, and transmits red light 100R. The path of red light 100R is bent by the reflecting mirror 66a so that it impinges on the liquid crystal light valve 67R. The green light 100G, blue light 100B and undesired light 100N, which were reflected by the dichroic mirror 65a, impinge on the dichroic mirror 65b. The dichroic mirror 65b reflects green light 100G and undesired light 100N, and transmits blue light 100B. The dichroic filter 93 removes the undesired light 100N from the light consisting of green light 100G and undesired light 100N, and green light 100G impinges on the liquid crystal light valve 67G. An analogous effect is obtained with respect to the other primary colors by disposing a dichroic filter in the light path of each. In accordance with this twelfth embodiment, light of undesired spectrum emitted from the light source is prevented from impinging on the color-synthesizing system, so that the hue can be made better. Note that the dichroic filter described above may also be incorporated into the device of the ninth embodiment.

Thirteenth Embodiment

Figure 49:
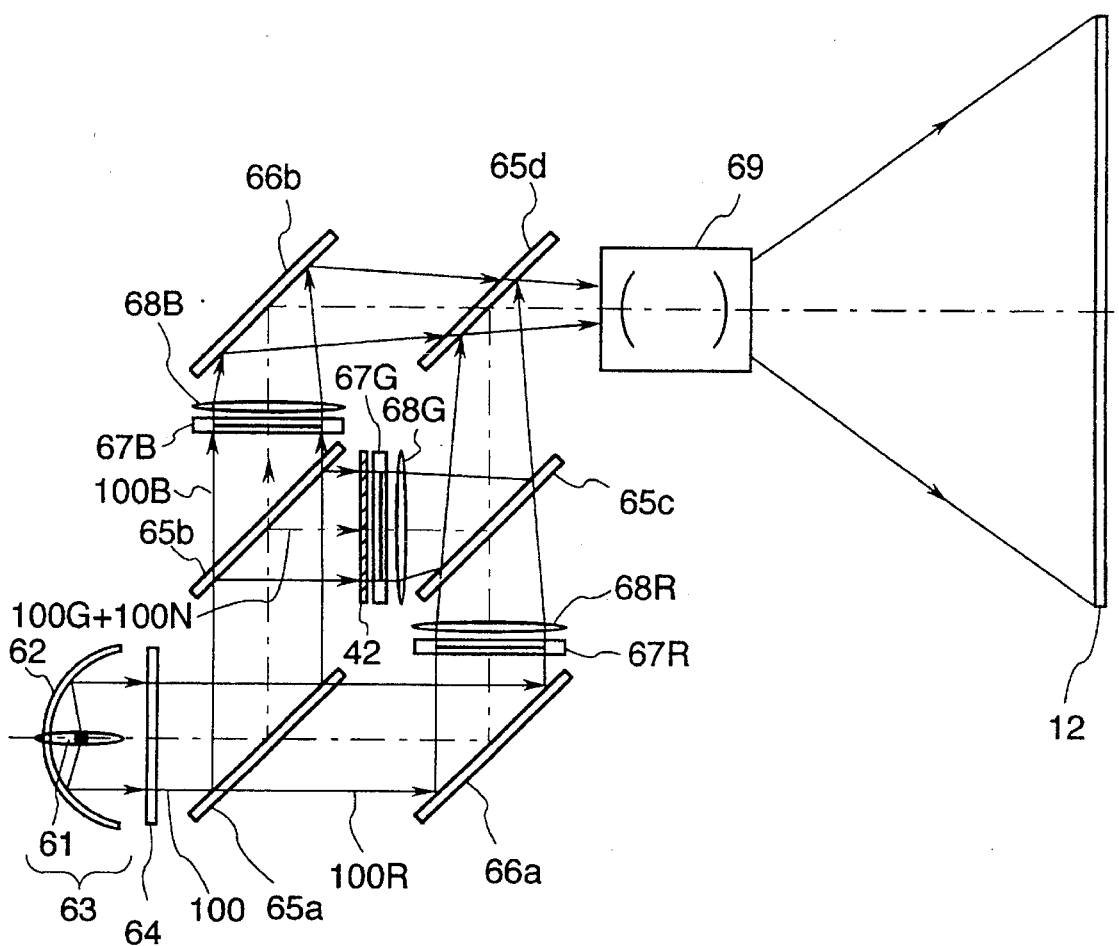
FIG. 49 is a structural diagram showing the optical system of a projection display device in accordance with the thirteenth embodiment of this invention.

FIG. 49 shows the optical system of a projection display device in accordance with a thirteenth embodiment of this invention. As is shown in FIG. 49, the projection display device of the thirteenth embodiment differs from the device in the eighth embodiment shown in FIG. 32 solely in that it is provided with neodymium glass 42 (e.g., V-10) disposed in front of the green-color liquid crystal light valve 67G. The neodymium glass 42 has spectral characteristics shown in FIG. 31, and has the property of selectively absorbing the spectrum in the vicinity of 580 [nm].

The neodymium glass 42 also absorbs other spectral light in the visible range (and particularly in the blue range), in addition to light in the vicinity of 580 [nm], but in this thirteenth embodiment the neodymium glass 42 is disposed in the path of the green light, so that it has no effect on the projected image and acts as a narrow-band green-transmitting filter, which passes light of 535–565 [nm], thereby rendering satisfactory the hue of the green light. Similarly, if the neodymium glass is placed in the path of the red light, a similar effect will be obtained.

In accordance with this thirteenth embodiment, undesired spectral light from the light source does not impinge on the color-synthesizing system, making it possible to minimize the return light, thereby decreasing the adverse effect on the operating characteristics of the liquid crystal light valve and rendering the hue satisfactory.

It should be noted that the neodymium glass described above may also be incorporated into the device of the ninth embodiment.

Fourteenth Embodiment

Figure 50:
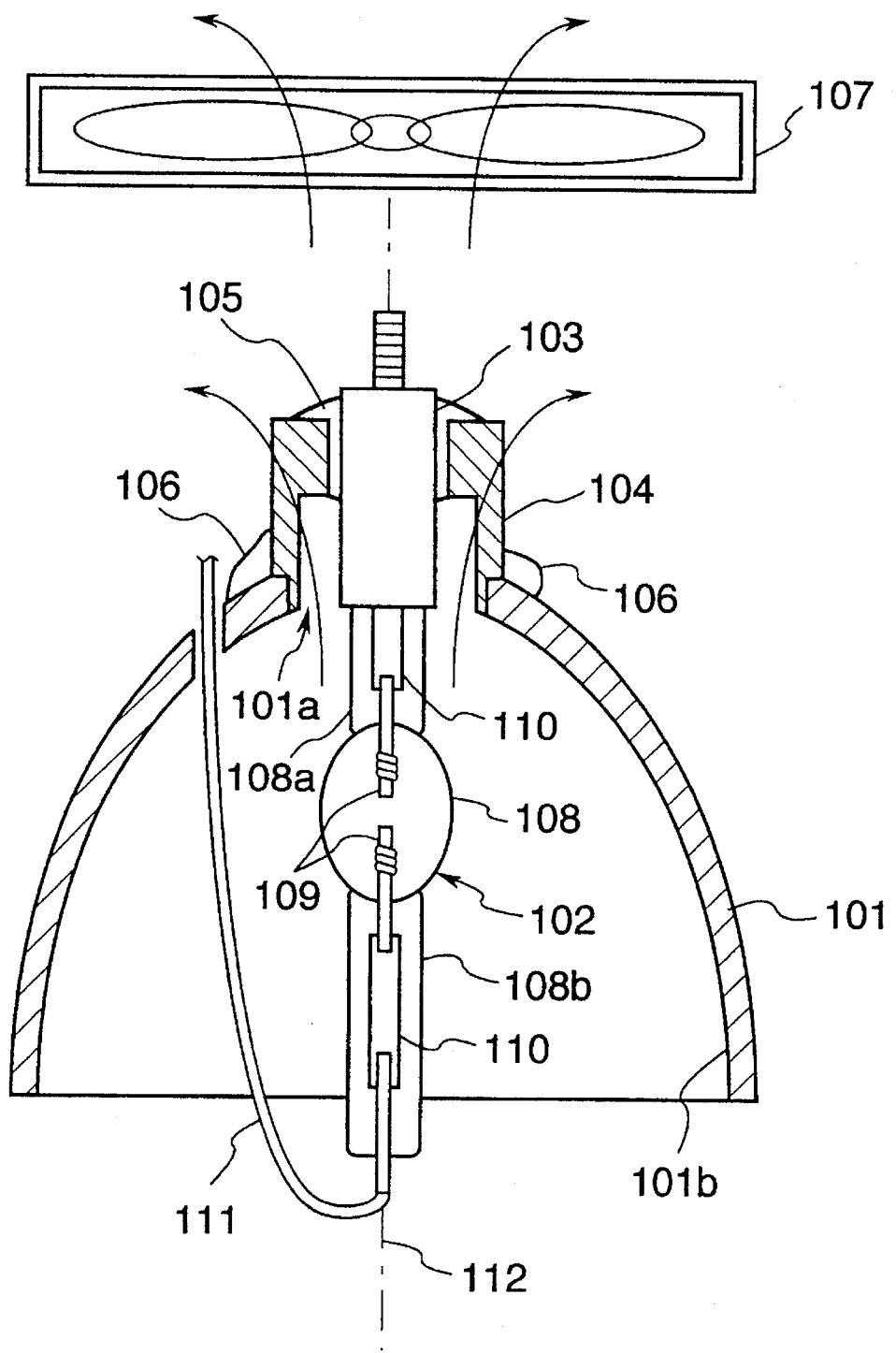
FIG. 50 is a cross-sectional diagram showing the configuration of a light source device in accordance with the fourteenth embodiment of this invention.
Figure 51:
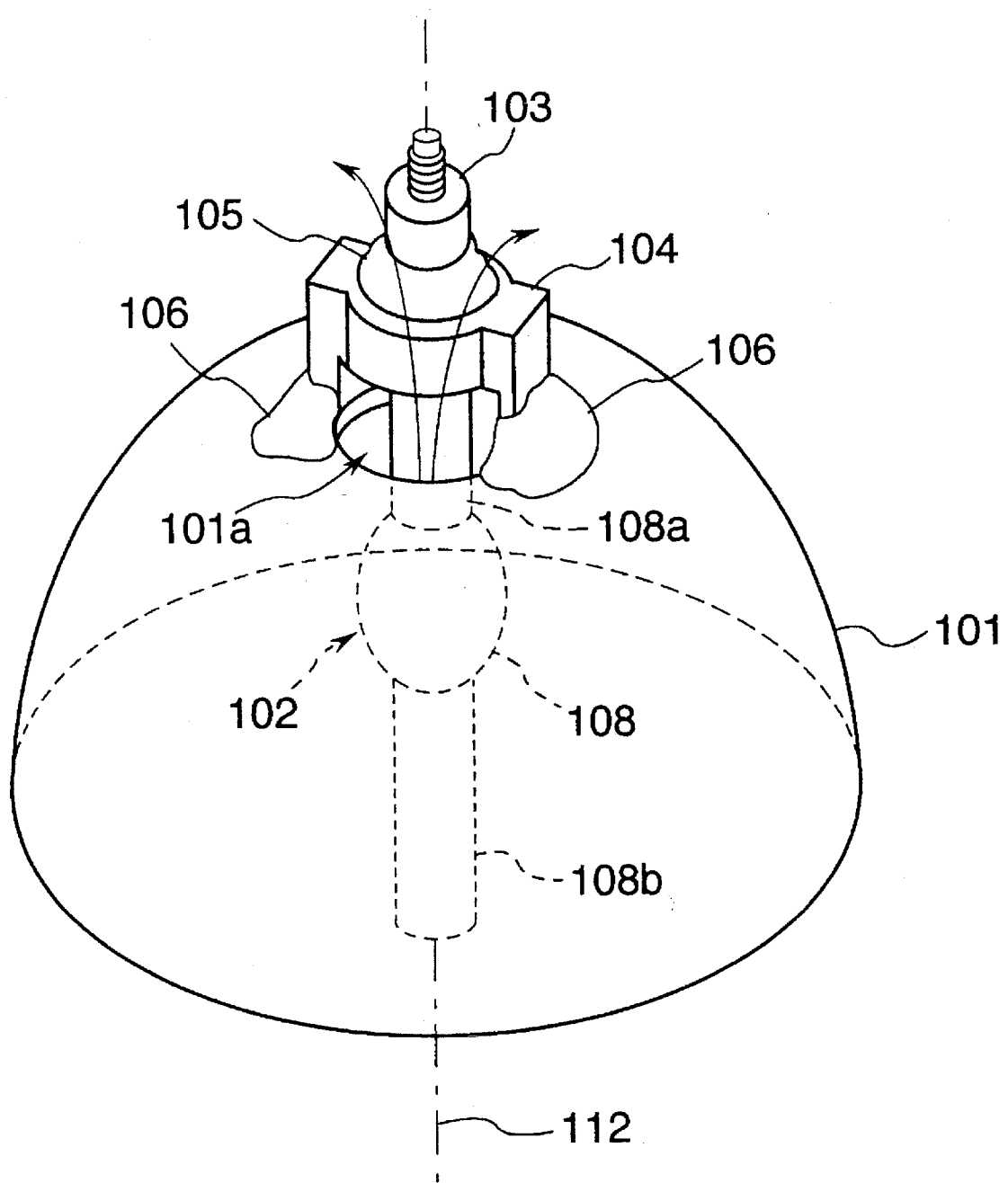
FIG. 51 is a perspective view of the device in FIG. 50.

FIG. 50 and FIG. 51 show the simplified configuration of a light source device in accordance with a fourteenth embodiment of this invention. FIG. 50 is a cross-sectional view and FIG. 51 is a perspective view.

This light source device comprises a reflecting mirror 101 consisting of a quadratic surface of revolution such as a spherical, parabolic, elliptical or other surface of revolution, a short-arc type metal halide lamp 102, a mouth piece 103 for holding the metal halide lamp 102, a holding piece 104 for holding the mouth piece 103, a heat-resistant inorganic bonding agent 105 for bonding the mouth peace 103 to the holding piece 104, a heat-resistant inorganic bonding agent 106 for bonding the holding piece 104 to the reflecting mirror 101, and a fan 107 for circulating air. As can clearly be seen in FIG. 51, a gap 101a is formed behind the reflecting mirror 101 so that by the operation of the fan 107 an air flow can be generated from within the reflecting mirror 101 through the gap 101a in the direction of the arrows.

The metal halide lamp 102 comprises a light-emitting tube 108 made of silica glass or the like and provided internally with a pair of discharge electrodes 109, molybdenum foil 110 joined to the discharge electrodes 109, and external lead 111 joined to the molybdenum foil 110. To achieve high radiant energy, the metal halide lamp 102 is a high-brightness and high discharge-energy lamp in which metallic halogen compounds are encapsulated within the light-emitting tube 108 and the atomic and molecular luminescence is utilized. The metal to be encapsulated is determined by spectral reaction curves. Indium, iron, gallium or the like is encapsulated to obtain light in the 300–500 [nm] range, and thallium, a mixture of thallium and sodium, or the like is encapsulated to obtain light in the 500–600 [nm] range. During the operation of the lamp, the metallic halogen compounds are either partially or wholly vaporized, reaching an equilibrium of dissociation and combination that depends on the temperature within the arc discharge so that at the center of an arc with a temperature of approximately 6000 [K], dissociation into metal atoms and halogen atoms is substantially total and light emission characteristic of metal atoms occurs. Molecular luminescence originates away from the center, where temperatures are somewhat lower.

By means of the configuration described above, the hot air within the reflecting mirror 101 is led into the gap 101a and exhausted to the rear of the reflecting mirror 101, thereby making it possible to produce a substantially uniform flow of cooling air in the vicinity of the light-emitting tube 102 and on the inner surface of the reflecting mirror 101.

In this fourteenth embodiment, a method is described for forced cooling using the axial-flow fan 107 to lead the high-temperature air within the reflecting mirror 101 to the rear of the reflecting mirror 101. But by making use of the rise of hot air due to natural convention, even more powerful cooling may be effected. For example, by configuring the device as a whole in such a way that axis 112 of revolution of the reflecting mirror 101 is substantially vertical, the cooling effect can be increased and the load on the axial-flow fan 107 can be reduced.

As described above, it is possible, by means of this fourteenth embodiment, to eliminate the inconveniences and the deterioration in the transparency of the walls of the tube when the silica glass composing light-emitting tube 108 of the metal halide lamp 102 exceeds approximately 930° C. Further, the uniform flow of air over the surfaces of the light-emitting tube 108 makes possible the uniform cooling of the surface, thereby preventing the blackening phenomenon that may occur when localized drops in surface temperature below approximately 750° C. occur.

A light source device having two gaps 101a revolving symmetrically with respect to the axis of revolution of the reflecting mirror in an aperture for the insertion of a light source, and two axial-flow fans 107 of differing rated inputs were prepared, and measurements were made of temperatures of the light-emitting tube 108 and the inner wall surface of the reflecting mirror 101. Measurements were made at three points. A first measured point is on the surface of the tube 108a, is near the gap 101a, and is considered to be good at the flow of the cooling air. A second measured point is on the surface of the tube 108b, is distant from the gap 101a and is considered to be poor at the flow of the cooling air. A third point is on the inner surface of the reflecting mirror 101 and is close to the gap 101a. The size of the region in which the holding piece 104 is blocking the aperture for the insertion of the lamp and the size of the gap 101a are substantially the same. The metal halide lamp 102 has a lamp power of 200 [W], and light-emitting tube 108 is made of silica glass. The reflecting mirror 101 is an elliptical mirror with an outer diameter of approximately 70 [mm], made of material that is approximately 2 [mm] thick, and is provided with an aperture approximately 15 [mm] in diameter for lamp insertion. Also, the holding piece 104 is so designed that the two minute gaps 101a is disposed symmetrically. The axial-flow fans used had rated inputs of 2.64 [W] and 1.92 [W], and measurements were made at an ambient temperature of 25° C.

Figure 52:
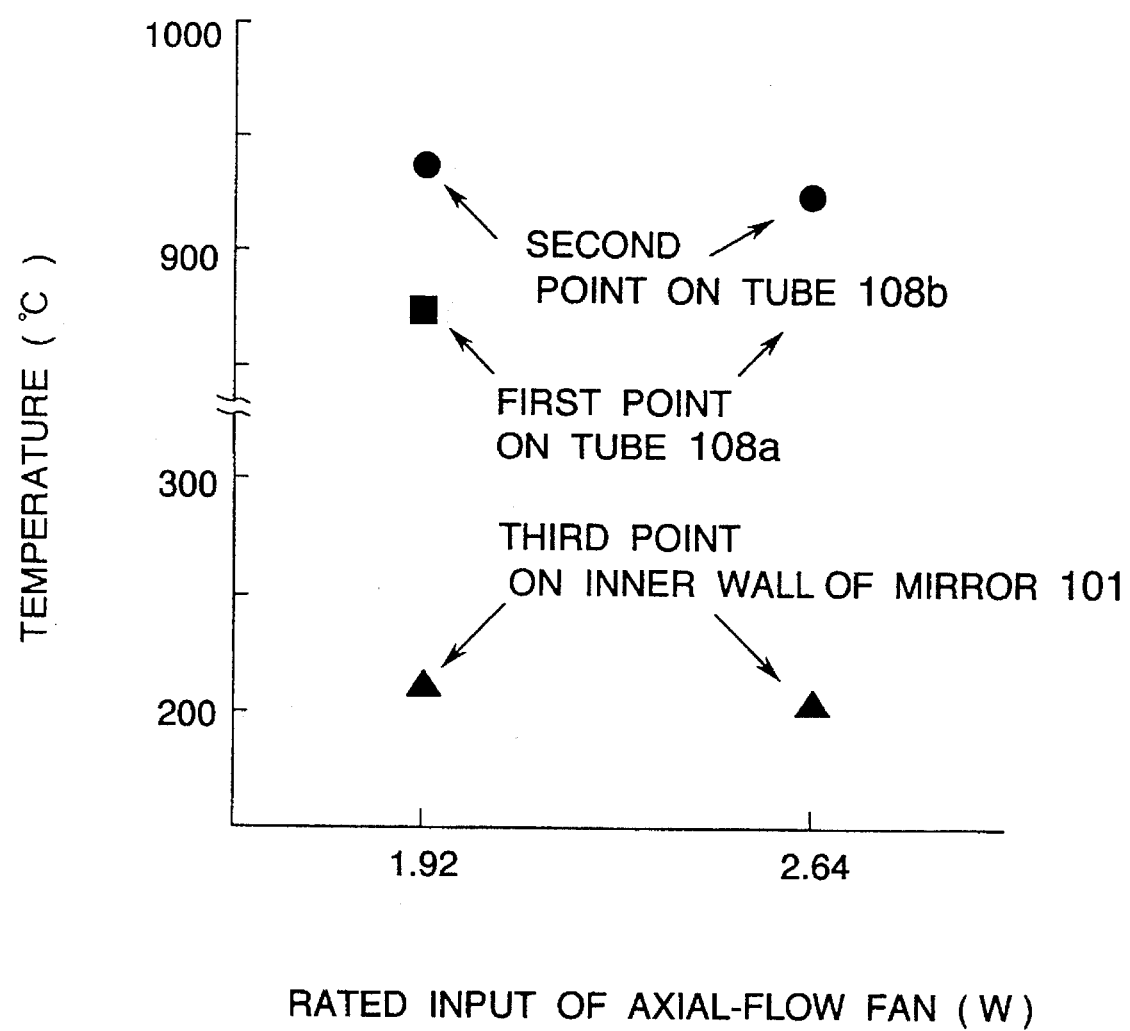
FIG. 52 is a graph showing the results of experiments on temperature distribution in the device in FIG. 50.

As shown in FIG. 52, it was confirmed that each point was approximately 875° C. for the first point on the tube 108a, approximately 925° C. for the second point 108b on the tube 108b, and approximately 210° C. for the inner wall of the reflecting mirror 101. It is possible to effect finer control of temperature by changing the size and shape of the gap 101a, and changing the specifications of axial-flow fan 107.

Figure 53:
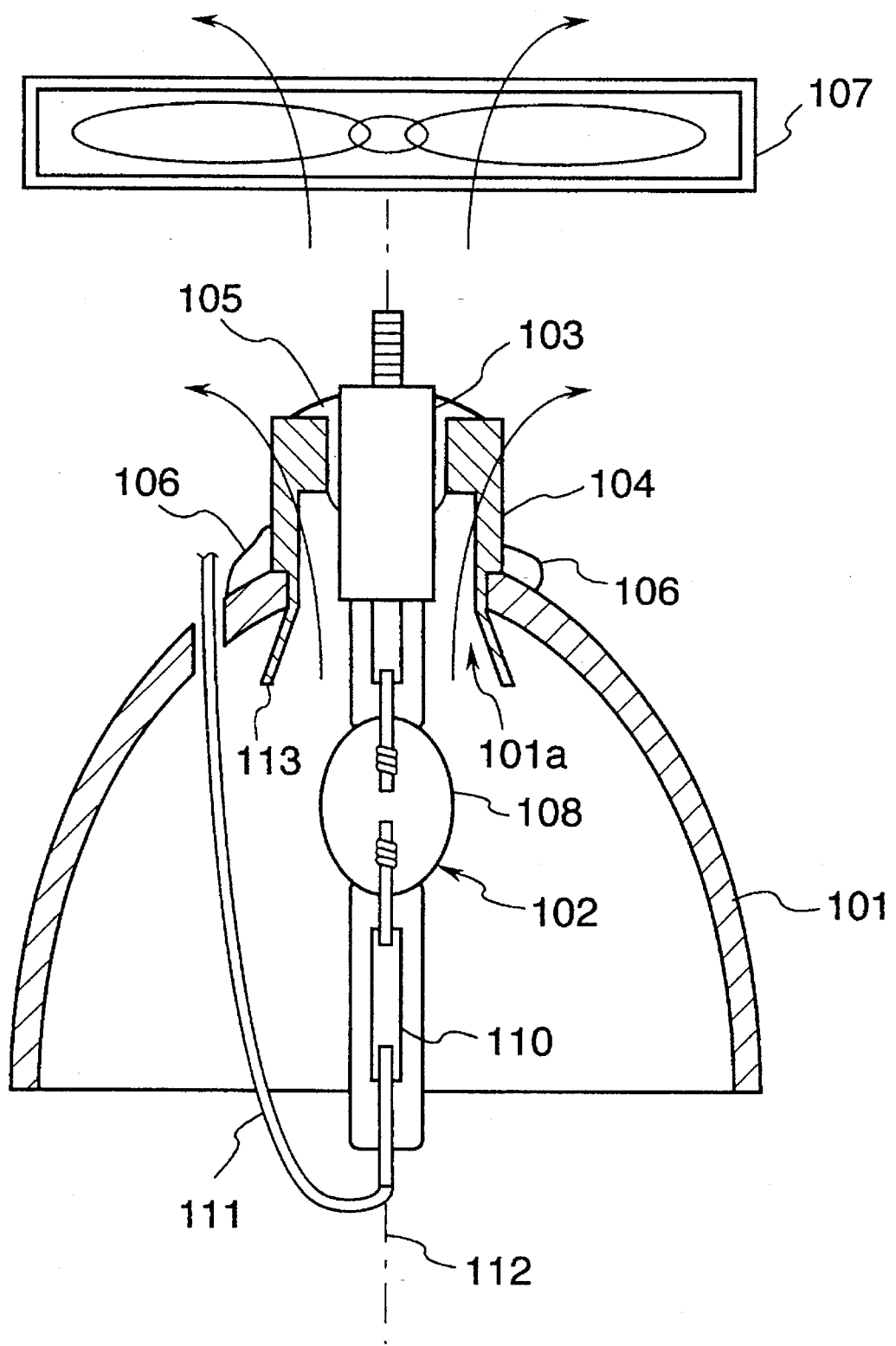
FIG. 53 is a cross-sectional diagram showing the configuration in FIG. 50 with the addition of a radiating fin 113

It is also possible, as shown in FIG. 53, to provide an air-flow straightening fin 113 at the tip of the light source holding piece 104 oriented toward the metal halide lamp 102, in which case the air surrounding the metal halide lamp 102 is exhausted more effectively.

Figure 54:
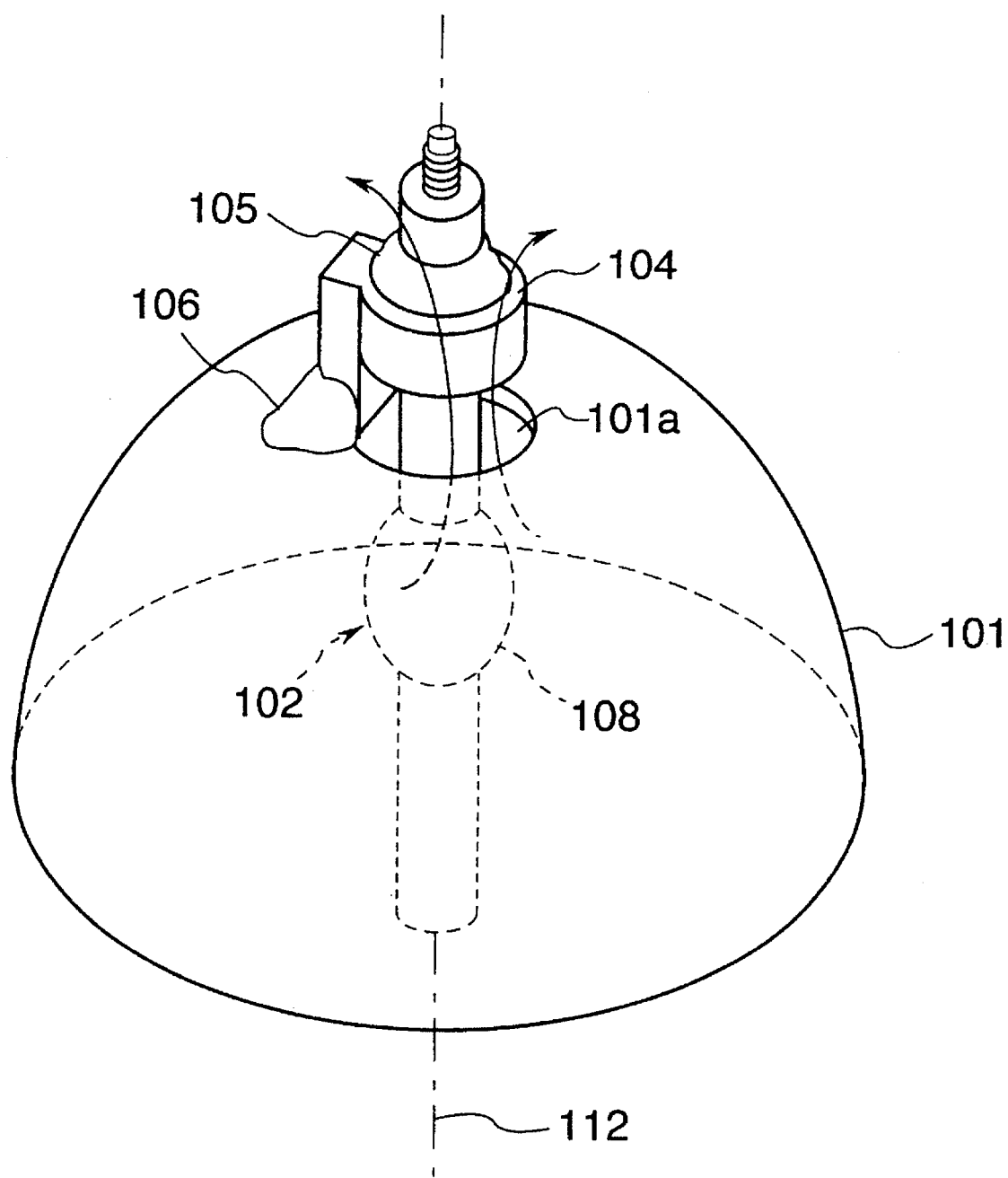
FIG. 54 is a perspective view showing another example of holding member 104 of the device in FIG. 50.

It is also possible, as shown in FIG. 54, to hold the light source holding piece 104 to the reflecting mirror 101 at a single point by means of bonding agent 106 so that the gap 101a is substantially C-shaped. In this case, the metal halide lamp 102 is operated in a substantially horizontal orientation so that as a result of natural convection, the upper part of light-emitting tube 108 is hotter than the lower part. But if the bonding agent 106 is applied to the lower part of the light-emitting tube 108, so that the flow of air at the upper part is greater than at the lower part, it is possible to increase the uniformity of the temperature distribution of the light-emitting tube 108.

Figure 55:
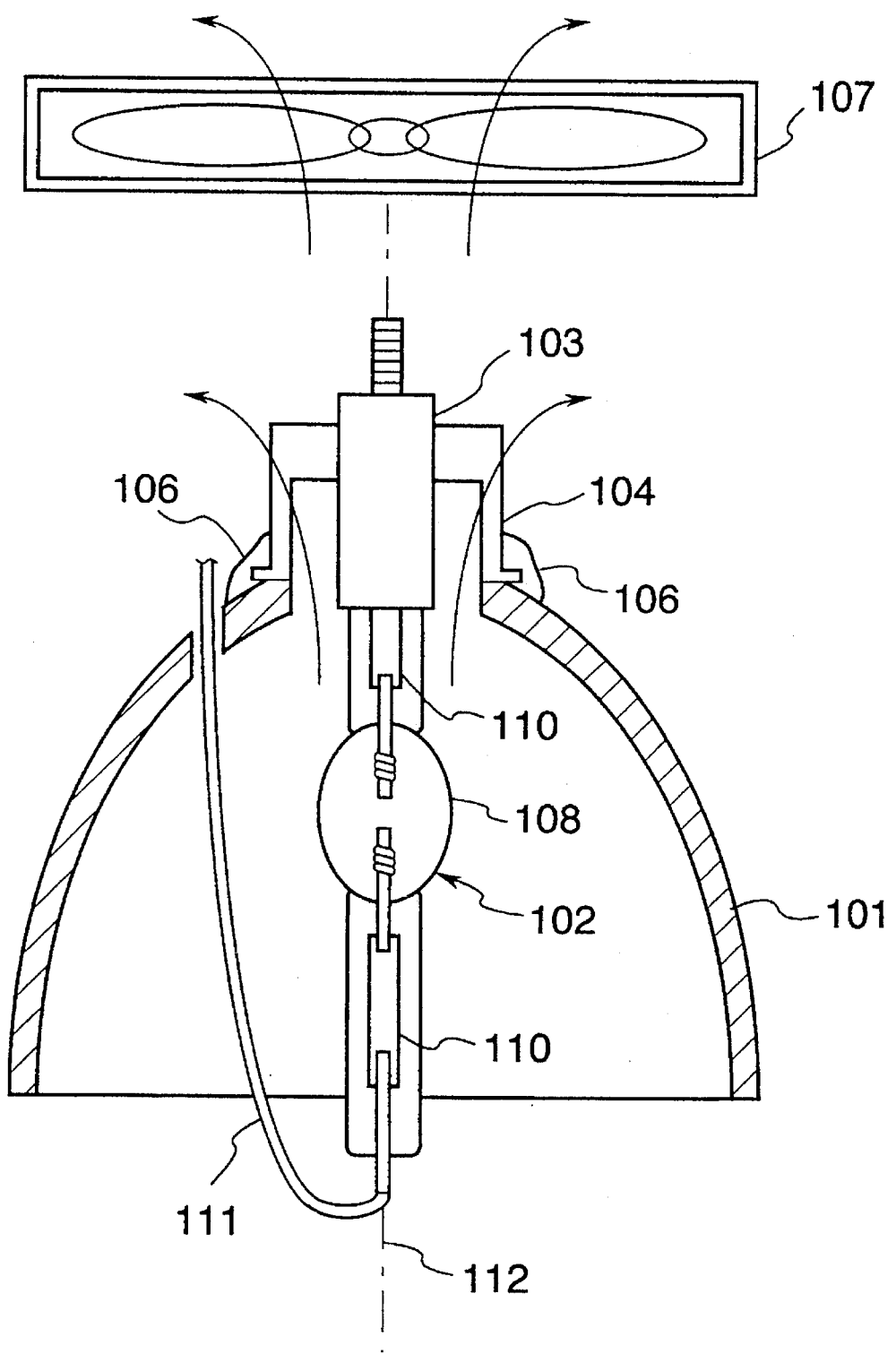
FIG. 55 is a perspective view showing yet another example of holding member 104 of the device in FIG. 50.

It is also possible, as shown in FIG. 55, to form the light source holding piece 104 and the mouth piece 103 into a single component.

Figure 56:
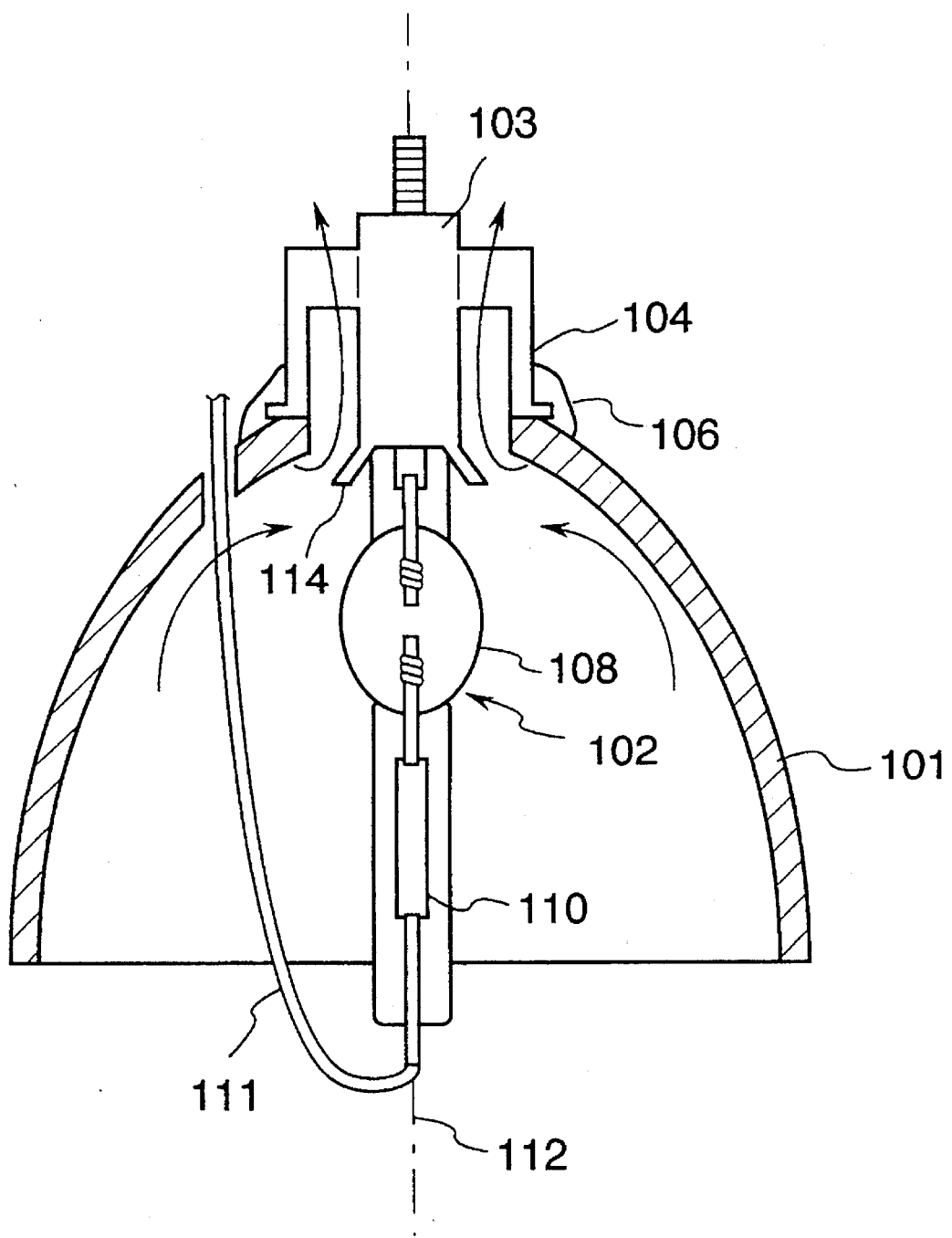
FIG. 56 is a cross-sectional diagram showing the configuration of the device in FIG. 55 with the addition of a radiating fin 114.

It is further possible, as shown in FIG. 56, to provide a straightening fin 114 at the tip of the mouth piece 103, in which case the air in the vicinity of the inner wall of the reflecting mirror 101 is exhausted more effectively.

Figure 57:
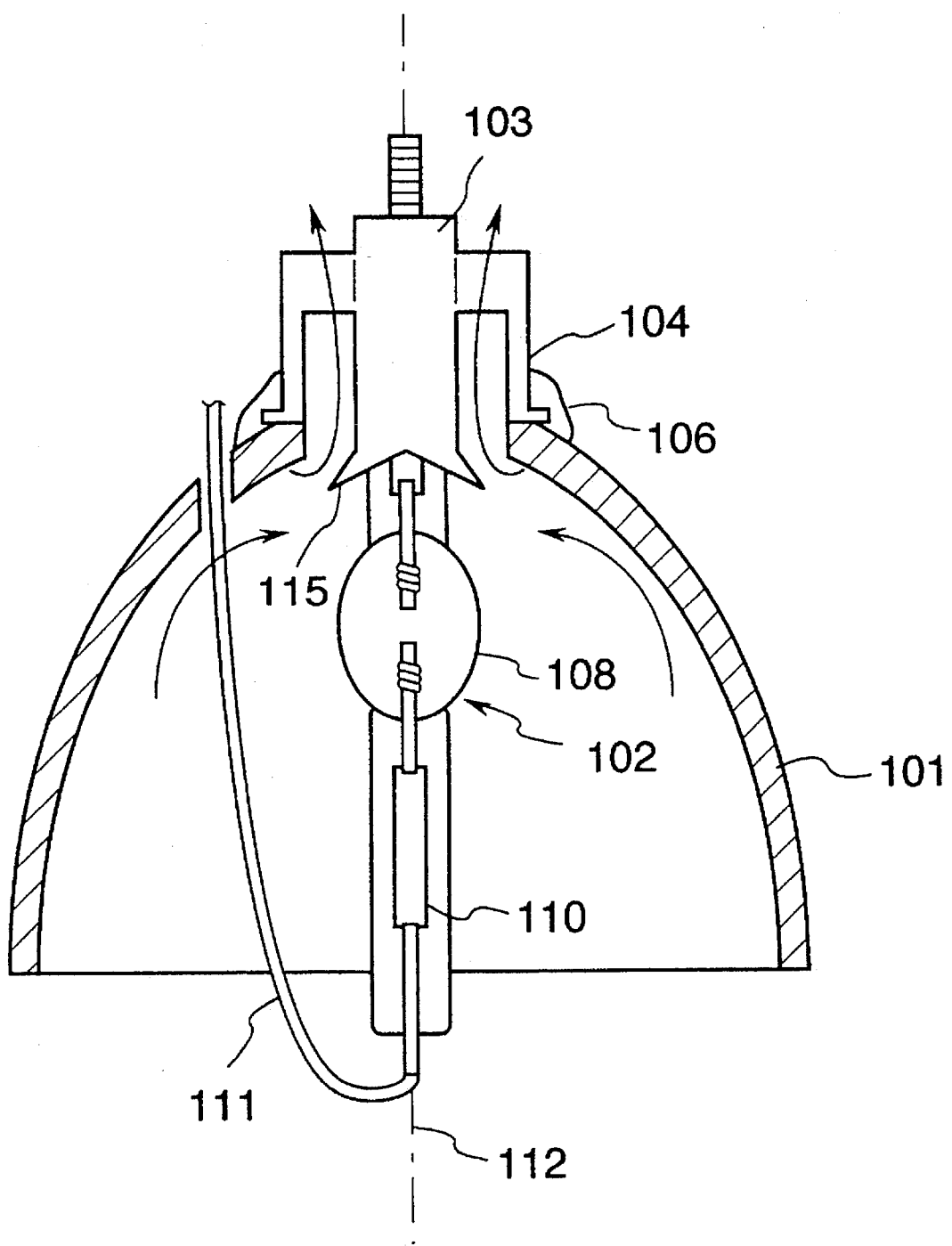
FIG. 57 is a cross-sectional diagram showing the configuration of the device in FIG. 55 with the addition of another radiating fin 115.

It is further possible, as shown in FIG. 57, to provide a straightening fin 115 at the tip of mouth piece 103, in which case the air in the vicinity of the inner wall of the reflecting mirror 101 is exhausted more effectively. Also, by making the inner surface of the straightening fin 115 into a light-reflecting mirror having a shape similar to that of the reflecting mirror 101, it is possible to utilize luminous flux directed toward the gap 101a as illumination.

Figure 58:
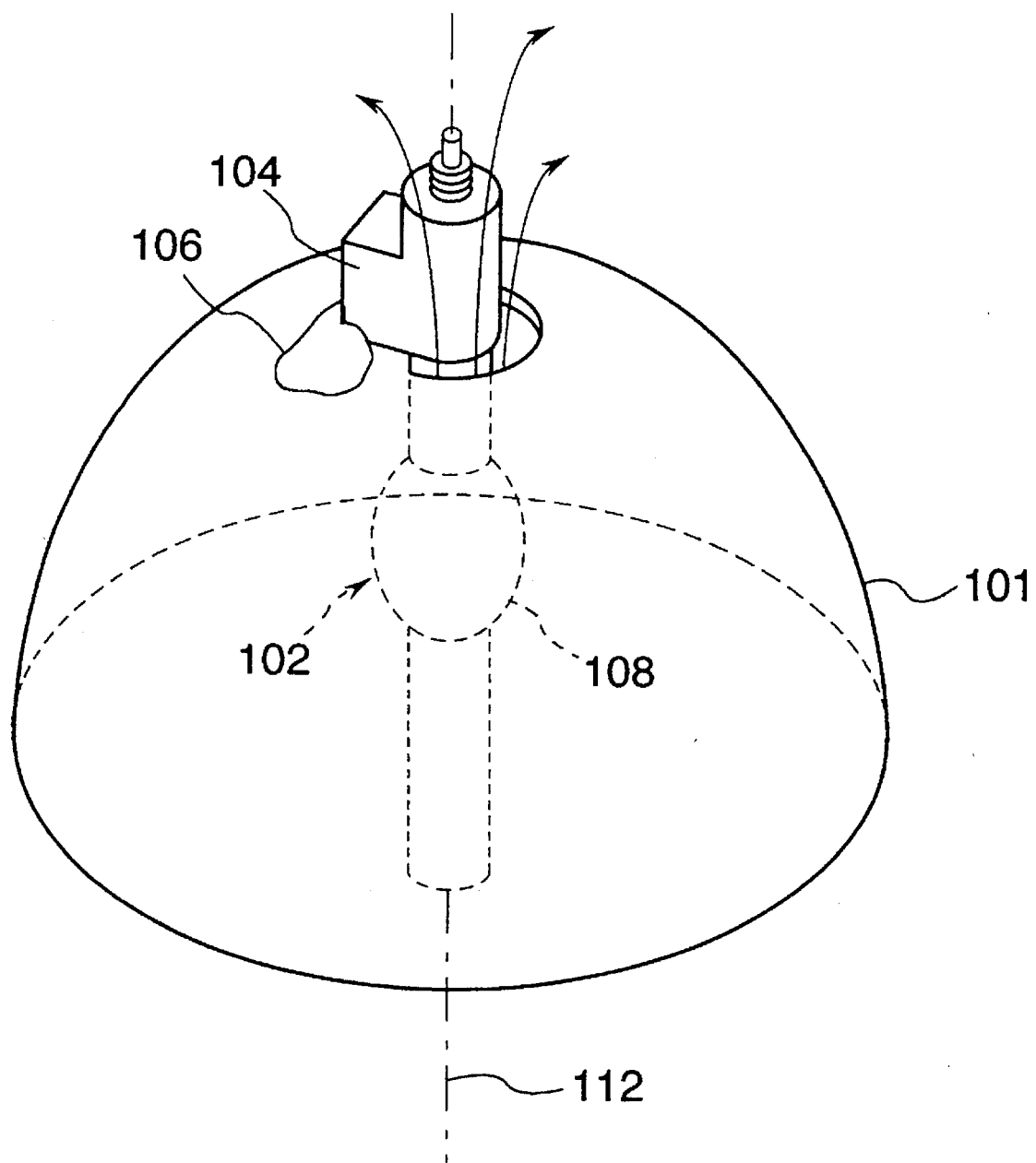
FIG. 58 is a perspective view showing another example of holding member 104 of the device in FIG. 55.

It is further possible, as shown in FIG. 58, to hold the light source holding piece 104 to the reflecting mirror 101 at a single point by means of bonding agent 106 so that the gap 101a is substantially C-shaped. In this case, the metal halide lamp 102 is operated in a substantially horizontal orientation so that as a result of natural convection, the upper part of the light-emitting tube 108 is hotter than the lower part. But if bonding agent 106 is applied to the lower part so that the flow of air at the upper part is greater than at the lower part, it is possible to increase the uniformity of the temperature distribution of light-emitting tube 108.

Figure 59:
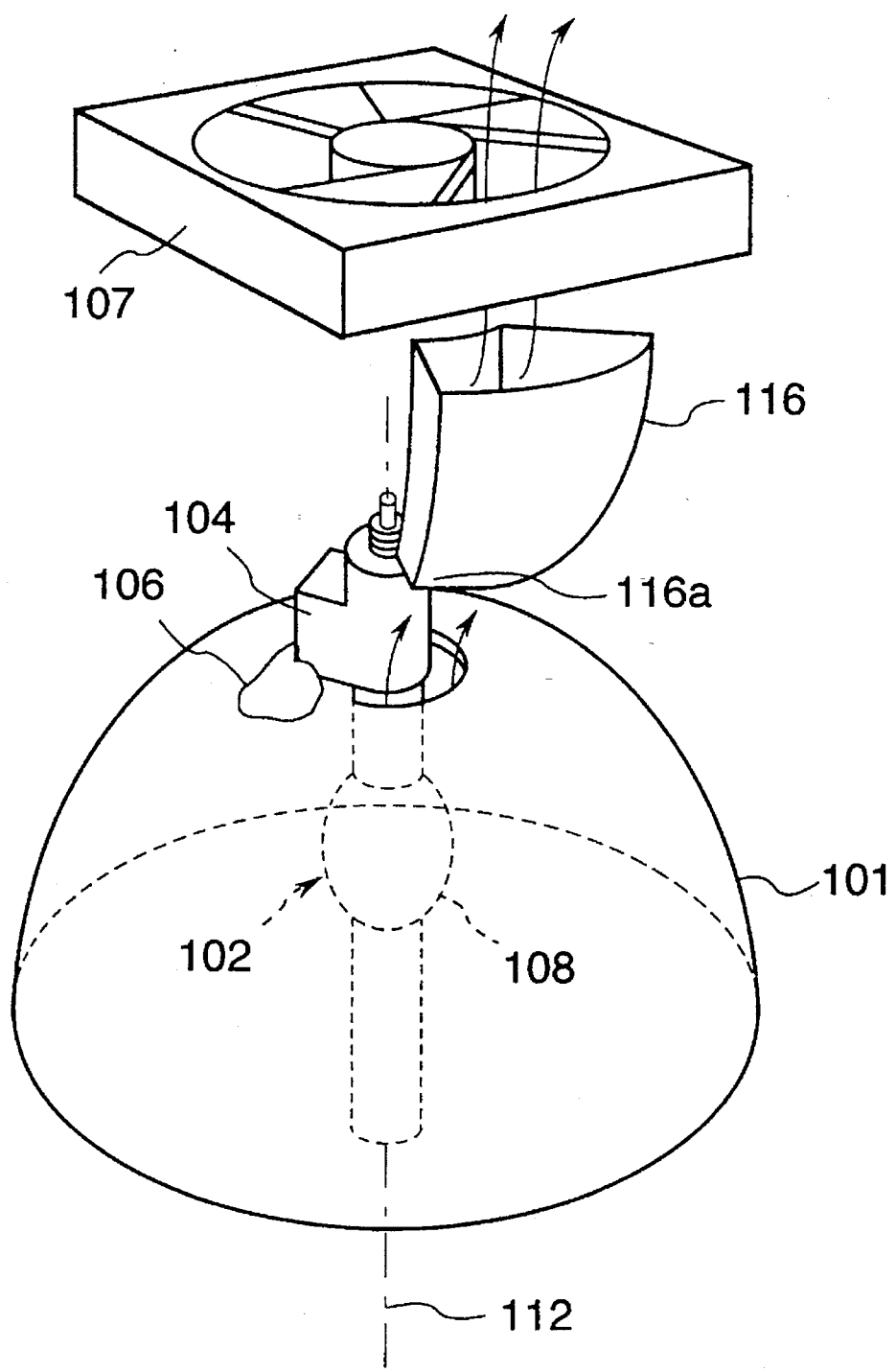
FIG. 59 is a perspective view showing the configuration of the device in FIG. 58 with the addition of an air duct 116.

It is further possible, as shown in FIG. 59, to dispose a duct 116 between the axial-flow fan 107 and the reflecting mirror 101, in which case the air-conducting effect of the axial-flow fan 107 is enhanced. And if a light-absorbing body 116a is mounted on the side surfaces of the duct 116, it is possible to block the leakage of luminous flux to the rear of the reflecting mirror 101, and thereby to suppress damage to the axial-flow fan 107 and structural elements disposed in its vicinity resulting from ultraviolet radiation and the like passing through the reflecting mirror 101.

What is claimed is:

1. A projection display device comprising:

a lamp for emitting white light;

a concave mirror for collecting the light emitted by said lamp;

a first diaphragm having an aperture through which the light emitted by said lamp passes and disposed in the vicinity of a focal point of the light collected by said concave mirror;

a collimation lens for rendering parallel the light passing through the aperture of said first diaphragm;

a scattering-type liquid crystal light valve for forming a transmitting-state region that transmits the light rendered parallel by said collimation lens and a scattering-state region that scatters the light rendered parallel by said collimation lens, thereby forming image on said liquid crystal light valve;

a field lens for converging the light rendered parallel by said collimation lens;

a projection lens having an entrance pupil disposed in the vicinity of a focal point of the light converged by said field lens, and magnifying and projecting the image on said liquid crystal light valve onto a screen;

a second diaphragm having an aperture and provided in said projection lens;

a first means for varying the aperture diameter of said first diaphragm; and a second means for varying the aperture diameter of said second diaphragm, thereby varying the diameter of an entrance pupil of said projection lens.

2. The projection display device of claim 1, further comprising a control means for controlling said first means and said second means such that a predetermined relationship is established between the aperture diameter of said first diaphragm and the diameter of the entrance pupil.

3. The projection display device of claim 1, wherein a following condition is satisfied:

$$D_a = D_b \cdot (f_1/f_2)$$

where $D_a$ is the aperture diameter of said first diaphragm, $D_b$ is the diameter of the entrance pupil, $f_1$ is a focal length of said collimation lens and $f_2$ is a focal length of said field lens.

4. The projection display device of claim 1, wherein a following condition is satisfied:

$$D_a \geq D_b \cdot (f_1/f_2)$$

where $D_a$ is the aperture diameter of said first diaphragm, $D_b$ is the diameter of the entrance pupil, $f_1$ is a focal length of said collimation lens and $f_2$ is a focal length of said field lens.

5. The projection display device of claim 1, further comprising a conical or pyramidal lens disposed on the focal point of the light reflected from said concave mirror, thereby increasing the quantity of the light in the vicinity of an optical axis of said concave mirror.

6. The projection display device of claim 1, further comprising:

a detection means for detecting brightness on the screen onto which images are projected by said projection lens and outputting brightness data; and a determining means for determining, on the basis of said brightness data, a scattered light reception angle which is a maximum angle between a direction of the light rendered parallel by said collimation lens and a direction of the light which is scattered at the scattering-state region of said liquid crystal light valve and is able to pass through the entrance pupil of said projection lens;

wherein said first means varies the aperture diameter of said first diaphragm in accordance with the scattered light reception angle obtained from said determining means, and said second means varies the aperture diameter of said second diaphragm in accordance with the scattered light reception angle obtained from said determining means.

7. The projection display device of claim 6, wherein said detection means detects a dark-level brightness $L_s$ of an area on said screen in which the image is not projected; and said determining means determines the scattered light reception angle θ in such a way that a white-level brightness $L_t'(\theta)$ when the dark-level brightness $L_s$ is not equal to 0 and a contrast CR'(θ) when the dark-level brightness $L_s$ is not equal to 0 are maximized, the white-level brightness $L_t'(\theta)$ and the contrast CR'(θ) being expressed by the following equations, $$L_t'(\theta) = L_t(\theta) + L_s$$

$$CR'(\theta) = \{L_t(\theta) + L_s\} / \{L_d(\theta) + L_s\}$$

where $L_t(\theta)$ is a white-level brightness of an area on said screen in which the image is projected when the dark-level brightness $L_s$ is equal to 0, and $L_d(\theta)$ is a black-level brightness of an area on said screen in which the image is projected when the dark-level brightness $L_s$ is equal to 0.

8. The projection display device of claim 7, wherein said detection means detects brightness of a monochrome projected image on said screen and outputs brightness data of the monochrome data, and said determining means determines the scattered light reception angle θ at which the contrast CR'(θ) and the white-level brightness $L_t'(\theta)$ are maximized on the basis of the brightness data of the monochrome data.

9. The projection display device of claim 1, wherein said concave mirror is an elliptical mirror.

\* \* \* \* \*